United States Patent [19]
Fujimoto

[11] Patent Number: 5,920,648
[45] Date of Patent: Jul. 6, 1999

[54] IMAGE PROCESSING METHOD AND APPARATUS WHICH REPLACE HORIZONTAL AND VERTICAL VECTORS WITH AN INCLINED VECTOR

[75] Inventor: Hiroki Fujimoto, Kyoto, Japan

[73] Assignee: Dainippon Screen Mfg. Co., Ltd., Japan

[21] Appl. No.: 08/551,860

[22] Filed: Nov. 7, 1995

[30] Foreign Application Priority Data

Nov. 14, 1994 [JP] Japan ................................. 6-305387

[51] Int. Cl.$^6$ ........................................................ G06K 9/48
[52] U.S. Cl. .................................... 382/197; 382/269
[58] Field of Search ............................ 382/199, 197, 382/299, 260, 266, 269, 301, 270, 200, 198, 267, 268; 395/128, 133, 141; 345/136, 137, 428, 433, 441

[56] References Cited

U.S. PATENT DOCUMENTS

| | | | |
|---|---|---|---|
| 4,124,871 | 11/1978 | Morrin, II | 358/287 |
| 4,375,654 | 3/1983 | Evans et al. | 358/260 |
| 4,674,058 | 6/1987 | Lindbloom et al. | 364/518 |
| 4,853,971 | 8/1989 | Nonura | 382/241 |
| 4,979,228 | 12/1990 | Rzeszewski | 382/254 |
| 5,007,098 | 4/1991 | Kumagai | 382/197 |
| 5,048,099 | 9/1991 | Lee | 382/197 |
| 5,197,108 | 3/1993 | Watanabe | 382/300 |
| 5,214,754 | 5/1993 | Okamoto | 345/442 |
| 5,231,519 | 7/1993 | Koike | 358/456 |
| 5,379,350 | 1/1995 | Shimazu et al. | 382/197 |
| 5,566,003 | 10/1996 | Hara et al. | 358/448 |

OTHER PUBLICATIONS

Foley, Van Dam, Feiner, Hughes, "Computer Graphics: Principles and Practice", Addison–Wesley Pub. Co. pp. 1083–1084, 1992.

Shih, Frank Y. and Mitchell, Owen R., "Threshold Decomposition of Gray–Scale Morphology into Binary Morphology", IEEE Transactions on Pattern Analysis And Machine Intelligence. vol. 1, No. 1, Jan. 1989.

D.F. Rogers, "Procedural Elements for Computer Graphics", pp. 40–43 and 46–51, and English abstract.

Foley, Van Dam, Feiner and Hughes, "Computer Graphics", pp. 74–79.

Ono and Takiyama, "On Calculations of Curvature of Sampled Curves", pp. 7–14, and English abstract.

Yamaguchi, Fujio, "Image Processing Technology Through Computer Display", Nikkan Kogyo Shinbunsha, 1981, pp. 54–56, and English abstract.

*Primary Examiner*—Jon Chang
*Attorney, Agent, or Firm*—Ostrolenk, Faber, Gerb & Soffen, LLP

[57] ABSTRACT

At step 1 in the flowchart of FIG. 1, multi-valued image data representing an image are read. After the image data are sliced at luminance values of 0 through 255 at step 2, boundary contours are extracted from the image data at step 3. Each boundary contour is converted to an inclined vector contour through an inclined vector process, which is executed according to predetermined conditions at step 4. The inclined vector contour undergoes a desired transformation of coordinates at step 5 before an orthogonal process, which is executed at step 6 to re-convert the inclined vector contours having transformed coordinates to outer and inner boundary contours. At step 7, the CPU (110) fills between the outer boundary contour and the inner boundary contour to generate image data of a closed figure, and combines a plurality of image data in the order of luminance values to generate multi-valued image data. A resulting image is then recorded at step 8 based on the multi-valued image data. The image processing method of the invention allows the resolution of a processed image after transformation of coordinates to be independent of the resolution of an input device and to be maintained at substantially the same level as the resolution of an original image.

52 Claims, 46 Drawing Sheets

Fig. 8(a)

| POINTS | COORDINATES |
|---|---|
| 0 | (1,0) |
| 1 | (3,0) |
| 2 | (3,2) |
| 3 | (4,2) |
| 4 | (4,1) |
| 5 | (5,1) |
| 6 | (5,0) |
| 7 | (6,0) |
| 8 | (6,6) |
| 9 | (4,6) |
| 10 | (4,5) |
| 11 | (3,5) |
| 12 | (3,6) |
| 13 | (1,6) |
| 14 | (1,5) |
| 15 | (0,5) |
| 16 | (0,2) |
| 17 | (1,2) |
| 0' | (2,3) |
| 1' | (2,4) |
| 2' | (4,4) |
| 3' | (4,3) |

Fig. 8(b)

| COORDINATES | POINTS |
|---|---|
| (1,0) | 0 |
| (3,2) | 1 |
| (4,2) | 2 |
| (6,0) | 3 |
| (6,6) | 4 |
| (4,5) | 5 |
| (3,5) | 6 |
| (1,6) | 7 |
| (1,5) | 8 |
| (0,2) | 9 |
| (1,2) | 10 |
| (2,3) | 0' |
| (2,4) | 1' |
| (4,4) | 2' |
| (4,3) | 3' |

Fig.10(a)

| POINTS | COORDINATES |
|---|---|
| 0 | (1,0) |
| 1 | (3,2) |
| 2 | (4,2) |
| 3 | (6,0) |
| 4 | (6,6) |
| 5 | (4,5) |
| 6 | (3,5) |
| 7 | (1,6) |
| 8 | (1,5) |
| 9 | (0,2) |
| 10 | (1,2) |
| 0' | (2,3) |
| 1' | (2,4) |
| 2' | (4,4) |
| 3' | (4,3) |

Fig.10(b)

| COORDINATES | POINTS |
|---|---|
| (2,0) | 0 |
| (6,4) | 1 |
| (8,4) | 2 |
| (12,0) | 3 |
| (12,12) | 4 |
| (8,10) | 5 |
| (6,10) | 6 |
| (2,12) | 7 |
| (2,10) | 8 |
| (0,4) | 9 |
| (2,4) | 10 |
| (4,6) | 0' |
| (4,8) | 1' |
| (8,8) | 2' |
| (8,6) | 3' |

Fig. 12(a)

| POINTS | COORDINATES |
|---|---|
| 0 | (2,0) |
| 1 | (6,4) |
| 2 | (8,4) |
| 3 | (12,0) |
| 4 | (12,12) |
| 5 | (8,10) |
| 6 | (6,10) |
| 7 | (2,12) |
| 8 | (2,10) |
| 9 | (0,4) |
| 10 | (2,4) |
| 0' | (4,6) |
| 1' | (4,8) |
| 2' | (8,8) |
| 3' | (8,6) |

Fig. 12(b)

| COORDINATES | POINTS |
|---|---|
| (2,0) | 0 |
| (3,0) | 1 |
| (3,1) | 2 |
| (4,1) | 3 |
| (4,2) | 4 |
| (5,2) | 5 |
| (5,3) | 6 |
| (6,3) | 7 |
| (6,4) | 8 |
| (8,4) | 9 |
| (8,3) | 10 |
| (9,3) | 11 |
| (9,2) | 12 |
| (10,2) | 13 |
| (10,1) | 14 |
| (11,1) | 15 |
| (11,0) | 16 |
| (12,0) | 17 |
| (12,12) | 18 |
| (10,12) | 19 |
| (10,11) | 20 |
| (8,11) | 21 |
| (8,10) | 22 |
| (6,10) | 23 |
| (6,11) | 24 |
| (4,11) | 25 |
| (4,12) | 26 |
| (2,12) | 27 |
| (2,10) | 28 |
| (1,10) | 29 |
| (1,7) | 30 |
| (0,7) | 31 |
| (0,4) | 32 |
| (2,4) | 33 |
| (4,6) | 0' |
| (4,8) | 1' |
| (8,8) | 2' |
| (8,6) | 3' |

| POINTS | COORDI-NATES |
|---|---|
| 0 | $(x_0, y_0)$ |
| 1 | $(x_1, y_1)$ |
| ⋮ | ⋮ |
| p | $(x_p, y_p)$ |
| p+1 | $(x_{p+1}, y_{p+1})$ |
| p+2 | $(x_{p+2}, y_{p+2})$ |
| ⋮ | ⋮ |
| i-2 | $(x_{i-2}, y_{i-2})$ |
| i-1 | $(x_{i-2}, y_{i-2})$ |

CURRENT STARTING POINT → p

NEXT STARTING POINT → p+2

| COORDI-NATES | POINTS |
|---|---|
| $(x_0, y_0)$ | 0 |
| ⋮ | ⋮ |
| $(x_p, y_p)$ | v |
| $(x_{p+2}, y_{p+2})$ | v+1 |
|  |  |
|  |  |

NOT REGISTERED

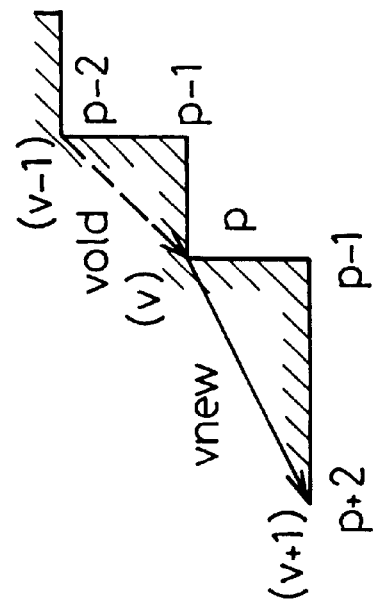

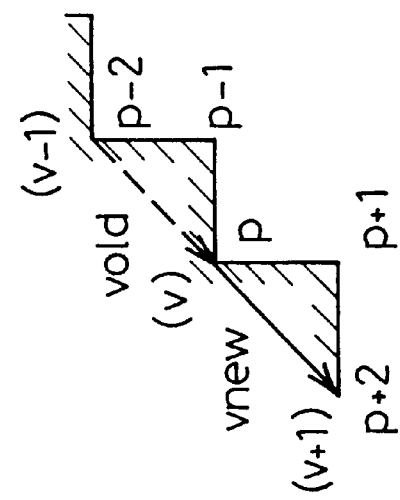

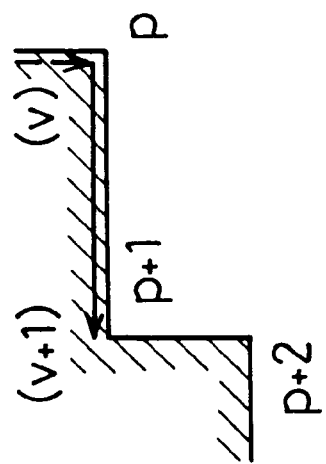

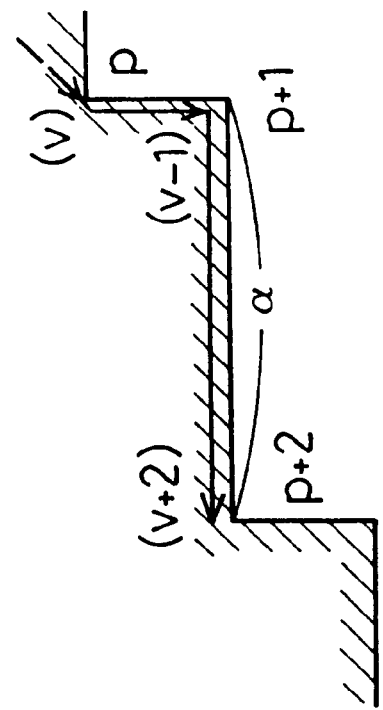

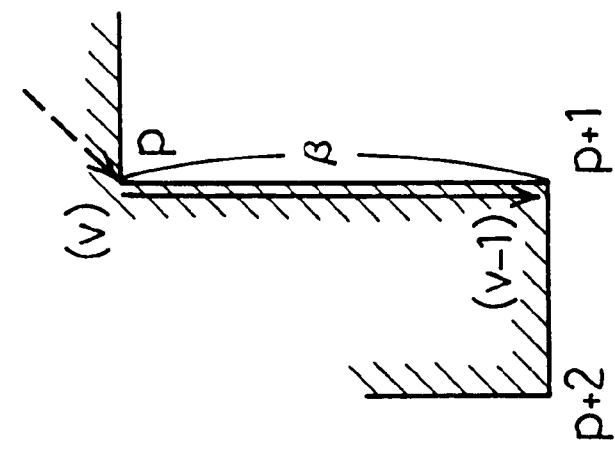

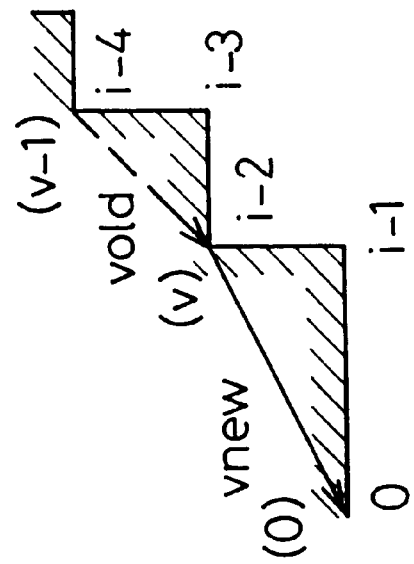

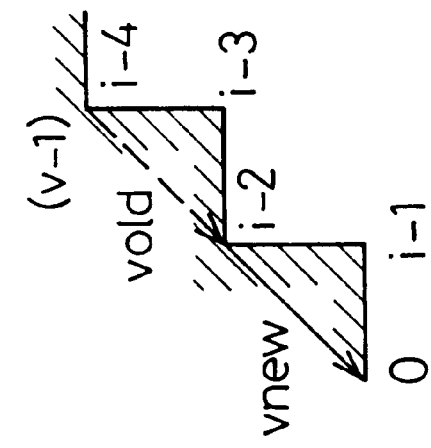
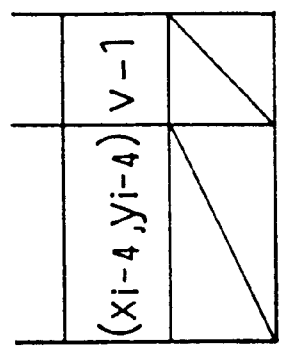
Fig. 25(a)
Fig. 25(b)
Fig. 25(c)

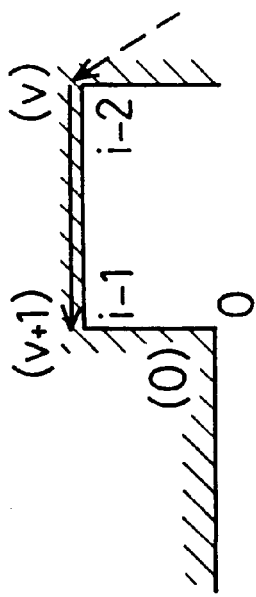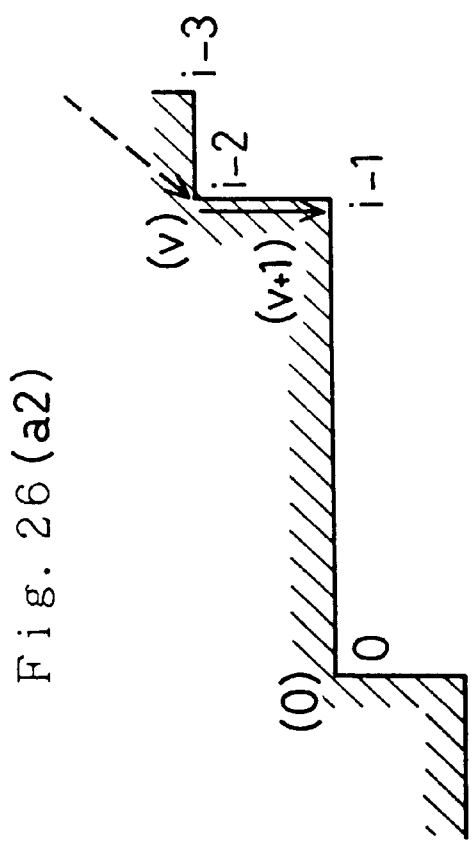
Fig. 26(a1)
Fig. 26(a2)
Fig. 26(b)
Fig. 26(c)

Fig. 28(a)
Fig. 28(b)
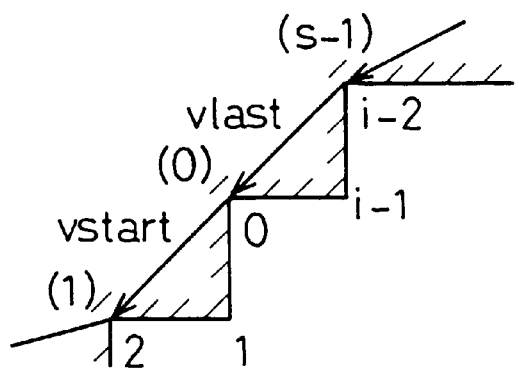
| COORDI-NATES | Pt. |
|---|---|
| (x0,y0) | 0 |
| (x1,y1) | 1 |
| ⋮ | ⋮ |
| (xs-2,ys-2) | s-2 |
| (xs-1,ys-1) | s-1 |
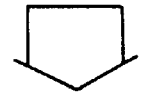
| COORDI-NATES | Pt. |
|---|---|
| (xs-1,ys-1) | 0 |
| (x1,y1) | 1 |
| ⋮ | ⋮ |
| (xs-2,ys-2) | s-2 |
| | |

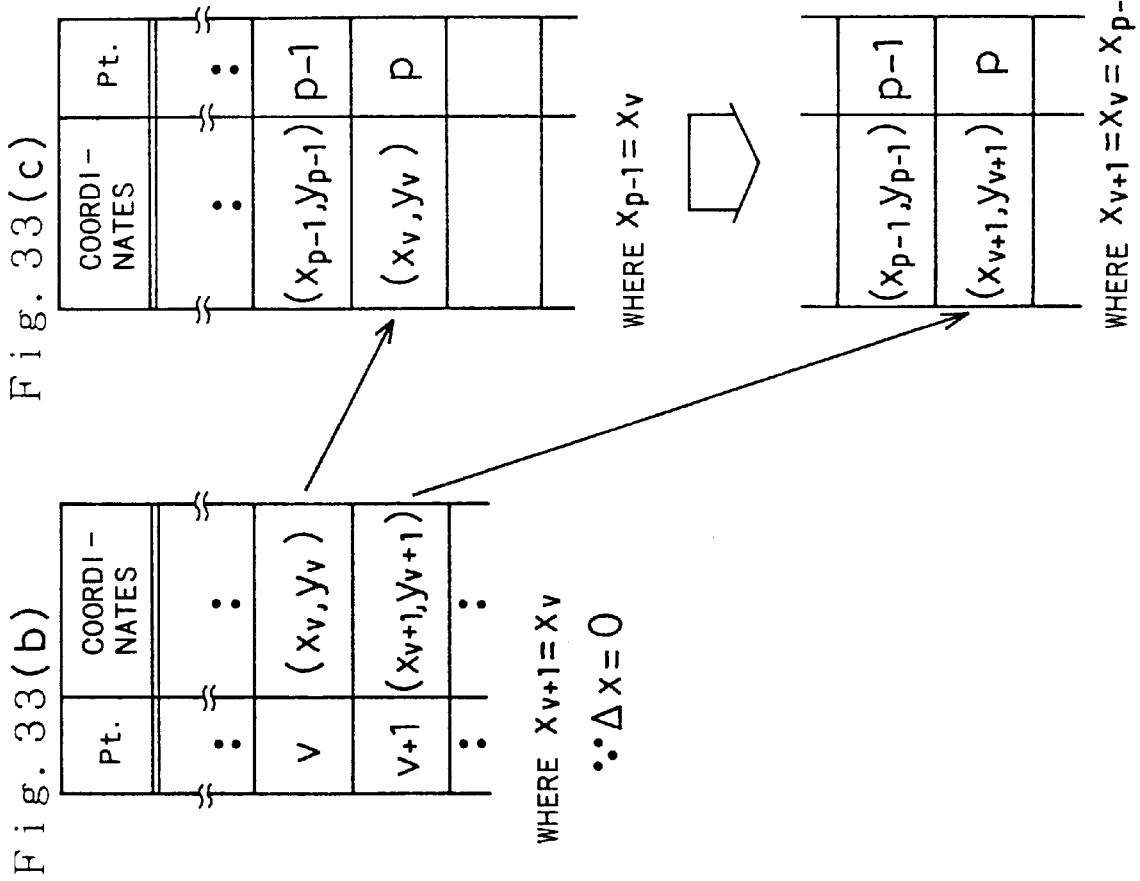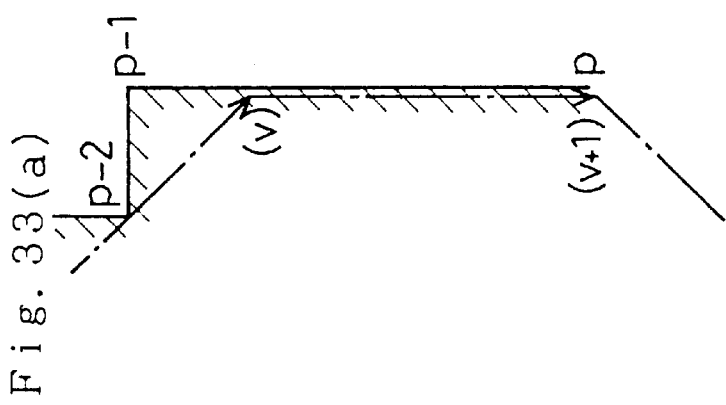

| VARIOUS INCLINED VECTORS | SIGN OF $\Delta y / \Delta x$ | DIRECTION OF FIRST EXTENDING CONTOUR LINE |
|---|---|---|
| A | — | Y DIRECTION |
| B | + | X DIRECTION |
| C | + | X DIRECTION |
| D | — | Y DIRECTION |

| Pt. | COORDI-NATES |
|---|---|
| ⋮ | ⋮ |
| v | $(x_v, y_v)$ |
| v+1 | $(x_{v+1}, y_{v+1})$ |
| ⋮ | ⋮ |

WHERE $|x_{v+1} - x_v| = |y_{v+1} - y_v|$

∴ $|\Delta x| = |\Delta y|$

| COORDI-NATES | Pt. |
|---|---|
| ⋮ | ⋮ |
| $(x_v, y_v)$ | p |
| | |

⇩

| | |
|---|---|
| $(x_v, y_v)$ | p |
| $(x_{v+1}, y_v)$ | p+1 |
| | |

⇩

| | |
|---|---|
| $(x_v, y_v)$ | p |
| $(x_{v+1}, y_v)$ | p+1 |
| $(x_{v+1}, y_v+1)$ | p+2 |
| | |

⇩

| | |
|---|---|
| $(x_v, y_v)$ | p |
| $(x_{v+1}, y_v)$ | p+1 |
| $(x_{v+1}, y_v+1)$ | p+2 |
| $(x_v+2, y_v+1)$ | p+3 |
| | |

⇦

| | |
|---|---|
| $(x_v, y_v)$ | p |
| $(x_{v+1}, y_v)$ | p+1 |
| $(x_{v+1}, y_v+1)$ | p+2 |
| $(x_v+2, y_v+1)$ | p+3 |
| $(x_v+2, y_v+2)$ | p+4 |
| | |

WHERE $x_{v+2} = x_{v+1}$
$y_{v+2} = y_{v+1}$

Fig. 39(a)
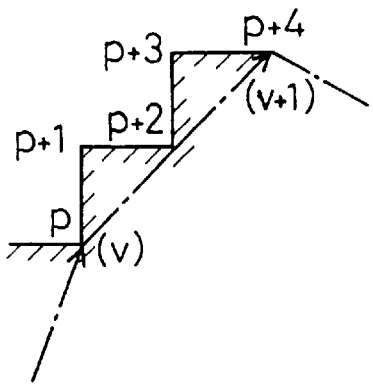
Fig. 39(b)
| Pt. | COORDI-NATES |
|---|---|
| ⋮ | ⋮ |
| v | $(x_v, y_v)$ |
| v+1 | $(x_{v+1}, y_{v+1})$ |
| ⋮ | ⋮ |
WHERE $|x_{v+1} - x_v| = |y_{v+1} - y_v|$
∴ $|\Delta x| = |\Delta y|$
Fig. 39(c)
| COORDI-NATES | Pt. |
|---|---|
| ⋮ | ⋮ |
| $(x_v, y_v)$ | p |
| | |
| COORDI-NATES | Pt. |
|---|---|
| $(x_v, y_v)$ | p |
| $(x_v, y_v-1)$ | p+1 |
| | |
| COORDI-NATES | Pt. |
|---|---|
| $(x_v, y_v)$ | p |
| $(x_v, y_v-1)$ | p+1 |
| $(x_v+1, y_v-1)$ | p+2 |
| | |
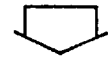
| COORDI-NATES | Pt. |
|---|---|
| $(x_v, y_v)$ | p |
| $(x_v, y_v-1)$ | p+1 |
| $(x_v+1, y_v-1)$ | p+2 |
| $(x_v+1, y_v-2)$ | p+3 |
| | |
WHERE $x_{v+2} = x_v+1$
$y_v-2 = y_{v+1}$
| COORDI-NATES | Pt. |
|---|---|
| $(x_v, y_v)$ | p |
| $(x_v, y_v-1)$ | p+1 |
| $(x_v+1, y_v-1)$ | p+2 |
| $(x_v+1, y_v-2)$ | p+3 |
| $(x_v+2, y_v-2)$ | p+4 |
| | |

Fig. 40

| VARIOUS INCLINED VECTORS | SIGN OF $\Delta x$ AND $\Delta y$ | ADDITION OR SUBTRACTION FOR x AND y |
|---|---|---|
| A | $\Delta x : +$ | ADDITION FOR x |
|   | $\Delta y : -$ | SUBTRACTION FOR y |
| B | $\Delta x : +$ | ADDITION FOR x |
|   | $\Delta y : +$ | ADDITION FOR y |
| C | $\Delta x : -$ | SUBTRACTION FOR x |
|   | $\Delta y : -$ | SUBTRACTION FOR y |
| D | $\Delta x : -$ | SUBTRACTION FOR x |
|   | $\Delta y : +$ | ADDITION FOR y |

| Pt. | COORDI-NATES |
|---|---|
| v | $(x_v, y_v)$ |
| v+1 | $(x_{v+1}, y_{v+1})$ |

| COORDI-NATES | Pt. |
|---|---|
| $(x_v, y_v)$ | p |
| $(x_v+1, y_v)$ | p+1 |
| $(x_v+1, y_v+1)$ | p+2 |
| $(x_v+3, y_v+1)$ | p+3 |
| $(x_v+3, y_v+2)$ | p+4 |
| $(x_v+4, y_v+2)$ | p+5 |
| $(x_v+4, y_v+3)$ | p+6 |
| $(x_v+6, y_v+3)$ | p+7 |
| $(x_v+6, y_v+4)$ | p+8 |
| $(x_v+7, y_v+4)$ | p+9 |
| $(x_v+7, y_v+5)$ | p+10 |
| $(x_v+9, y_v+5)$ | p+11 |
| $(x_v+9, y_v+6)$ | p+12 |
|  |  |

WHERE
$x_v+9 = x_{v+1}$
$y_v+6 = y_{v+1}$

| VARIOUS INCLINED VECTORS | SIGN OF $\Delta y/\Delta x$ | DIRECTION OF FIRST EXTENDING CONTOUR LINE |
|---|---|---|
| A | − | X DIRECTION |
| B | + | Y DIRECTION |
| C | + | Y DIRECTION |
| D | − | X DIRECTION |

IMAGE PROCESSING METHOD AND APPARATUS WHICH REPLACE HORIZONTAL AND VERTICAL VECTORS WITH AN INCLINED VECTOR

BACKGROUND OF THE INVENTION

1. Field of the Invention

The present invention relates to a method of processing images by expanding, contracting, rotating, or the like, and also to an apparatus for the same.

2. Description of the Related Art

A typical procedure applied for recording a desired image includes the steps of: inputting an original image with an input device such as an input scanner; expanding, contracting, or rotating the original image with an image processing apparatus; and outputting the processed image with an output device such as a printer.

When an image of 1,000 pixels in length by 1,000 pixels in width captured by an input device is to be output as an image of 100 mm in length by 100 mm in width with an output device having an output resolution of 20 pixels per mm, it is required to expand the image of 1,000 ×1,000 pixels to an image of 2,000×2,000 pixels with an image processing apparatus. Pixel-by-pixel interpolation is a conventional technique applied for such expansion of images.

Typical methods of pixel interpolation include a nearest neighbor method for interpolating from a nearest pixel to a target point of interpolation, and a linear interpolation method for linearly interpolating from four pixels near to a target point of interpolation.

The conventional method of pixel-by-pixel image processing, like expansion, contraction, or rotation of an original image may lower the resolution of a resulting image than that of the original image.

In expansion of images by pixel interpolation, for example, not only the resolution of an original image but the resolution of an expanded image depends upon the resolution of an input device. The pixel interpolation may accordingly cause a blur in the resulting image (especially, in linear interpolation method) or cause jaggy portions in curved or inclined straight lines of the obtained image (especially, in nearest neighbor method), thereby deteriorating the image.

SUMMARY OF THE INVENTION

The object of the present invention is thus to provide a method of processing images while maintaining the resolution of a processed image substantially at the same level as that of an original input image, and also to provide an apparatus for the same.

The above and other related objects are realized by a method of processing an image, which includes the steps of:

(a) preparing an image to be processed;

(b) extracting a first boundary contour vector from the image, the first boundary contour vector expressing a contour of the image by pixels and being composed of closed loop vectors comprising a plurality of horizontal vectors extending in a horizontal direction and a plurality of vertical vectors extending in a vertical direction; and (c) replacing a sequence of a horizontal vector and a vertical vector of the first boundary contour vector with an inclined vector extending obliquely if a predetermined condition is satisfied, so as to yield an inclined contour vector.

This method converts the extracted first boundary contour vector to an inclined contour vector, in order to process the image in the state of vectors not only in the horizontal and vertical directions but in the oblique directions. The image processing like expansion, contraction, or rotation is implemented by transformation of coordinates of the vectors. The method of the invention allows the resolution of the processed image to be independent of the resolution of the input device. This effectively prevents the processed image after transformation of coordinates from being undesirably out-of-focus and reduces the occurrence of jaggy portions in curved or inclined straight lines of the obtained image, thereby protecting the image from deterioration.

In accordance with another preferable application, the method further includes the step of:

(d) executing an affine transformation on the inclined contour vector.

According to still another preferable application, the method further includes the step of;

(e) replacing the transformed inclined vectors with horizontal vectors and vertical vectors to generate a second boundary contour vector.

This process re-converts the transformed inclined contour vector to a boundary contour vector (that is, the second boundary contour vector).

The invention is also directed to a method of processing an image, which includes the steps of:

(a) preparing multi-valued image data representing the image to be processed;

(b) binary-coding the multi-valued image data by a plurality of threshold values to generate a plurality of binary image data representing a plurality of first binary images;

(c) extracting a plurality of first boundary contour vectors from the plurality of first binary images, each the first boundary contour vector expressing a contour of the first binary image by pixels and being composed of closed loop vectors comprising a plurality of horizontal vectors extending in a horizontal direction and a plurality of vertical vectors extending in a vertical direction;

(d) replacing a sequence of a horizontal vector and a vertical vector of the each first boundary contour vector with an inclined vector extending obliquely if a predetermined condition is satisfied, so as to yield an inclined contour vector.

In the method of the invention, the prepared image represented by multi-valued image data is sliced at a plurality of threshold values to yield a plurality of binary image data, and a plurality of first boundary contour vectors are extracted from the plurality of binary image data.

According to still another preferable application, the method further includes the steps of:

(e) executing an affine transformation on the inclined contour vector;

(f) replacing the transformed inclined vectors with horizontal vectors and vertical vectors to generate a second boundary contour vector;

(g) filling a selected area among two areas divided by the second boundary contour vector, so as to generate a second image represented by binary image data; and (h) combining a plurality of the second images to give an image represented by multi-valued image data.

This method carries out the inclined vector process for boundary contours prior to the image processing, such as enlargement, contraction, or rotation, so as to allow a processed image to be defined by inclined vectors as well as vectors in the horizontal and vertical directions. Since the image processing is implemented by transformation of coordinates of vectors, the resolution of the processed image is kept substantially at the same level as the resolution of the original input image.

An alternative structure may include, instead of the above steps (f) and (g), the step of filling a selected area among two areas divided by the second boundary contour vector, so as to generate a second image represented by binary image data. This method of directly obtaining a binary image from the inclined contour vector does not require the orthogonal process, thereby shortening the time required for the whole processing.

According to a preferable application, the method further includes the steps of: approximating each curved portion of the first boundary contour vector by parametric function data; executing an affine transformation on the parametric function data; and converting the transformed parametric function data to vectors. This structure divides the extracted boundary contour into a straight line portion and a curved portion, and converts the straight line portion to inclined vectors while replacing the curved portion with approximate curves. This allows the image to be processed in the state of vectors and approximate curves. The portion replaced with approximate curves includes a less number of coordinates than that of the portion converted to inclined vectors. This results in effective data compression and maintains the smooth contour even if the image is expanded by a high magnification.

These and other objects, features, aspects, and advantages of the present invention will become more apparent from the following detailed description of the preferred embodiments with the accompanying drawings.

BRIEF DESCRIPTION OF THE DRAWINGS

FIGS. 8(a) and 8(b) show coordinates of vectors constituting the boundary contours of FIG. 6 and coordinates of vectors constituting the inclined vector contours of FIG. 7, respectively;

FIGS. 10(a) and 10(b) show coordinates of vectors constituting the inclined vector contours of FIG. 7 and coordinates of vectors constituting the twice enlarged-inclined vector contours of FIG. 9, respectively;

FIGS. 12(a) and 12(b) show coordinates of vectors constituting the twice enlarged-inclined vector contours of FIG. 9 and coordinates of vectors constituting the boundary contours of FIG. 11, respectively;

FIGS. 19(a) through 19(c) show an example wherein the inclined vector process is performed at the intermediate stage;

FIGS. 20(a) through 20(c) show an example wherein the inclined vector process is performed at the intermediate stage;

FIGS. 21(a) through 21(c) show an example to wherein the inclined vector process is not performed at the intermediate stage;

FIGS. 22(a) through 22(c) show an example to wherein the inclined vector process is not performed at the intermediate stage;

FIGS. 23(a) through 23(c) show an example to wherein the inclined vector process is not performed at the intermediate stage;

FIGS. 24(a) through 24(c) show an example wherein the inclined vector process is performed at the final stage;

FIGS. 25(a) through 25(c) show an example wherein the inclined vector process is performed at the final stage;

FIGS. 26(a1), 26(a2), 26(b), and 26(c) show an example wherein the inclined vector process is not performed at the final stage;

FIGS. 28(a) and 28(b) show an example where the final pattern check gives a result of identical patterns;

FIGS. 33(a) through 33(c) show the processing according to the subroutine RA of FIG. 31;

FIGS. 39(a) through 39(c) show the processing according to the subroutine RC of FIG. 35;

FIG. 40 is a table showing rules of addition and subtraction with respect to X,Y coordinates;

DESCRIPTION OF THE PREFERRED EMBODIMENT

1. First Embodiment

A. Outline of Image Processing

Figure 1:
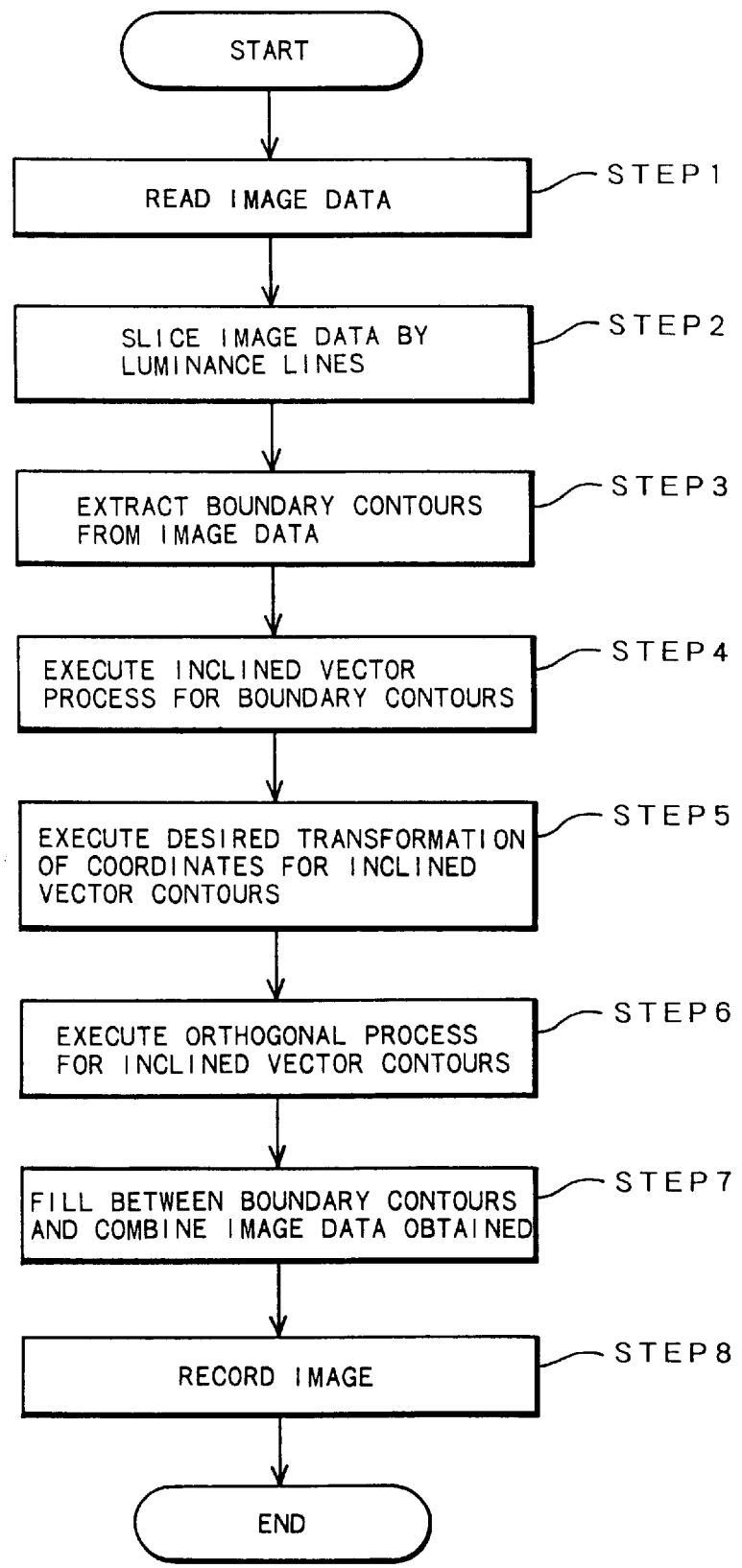
FIG. 1 is a flowchart showing an image processing routine executed in a first embodiment according to the present invention.
Figure 2:
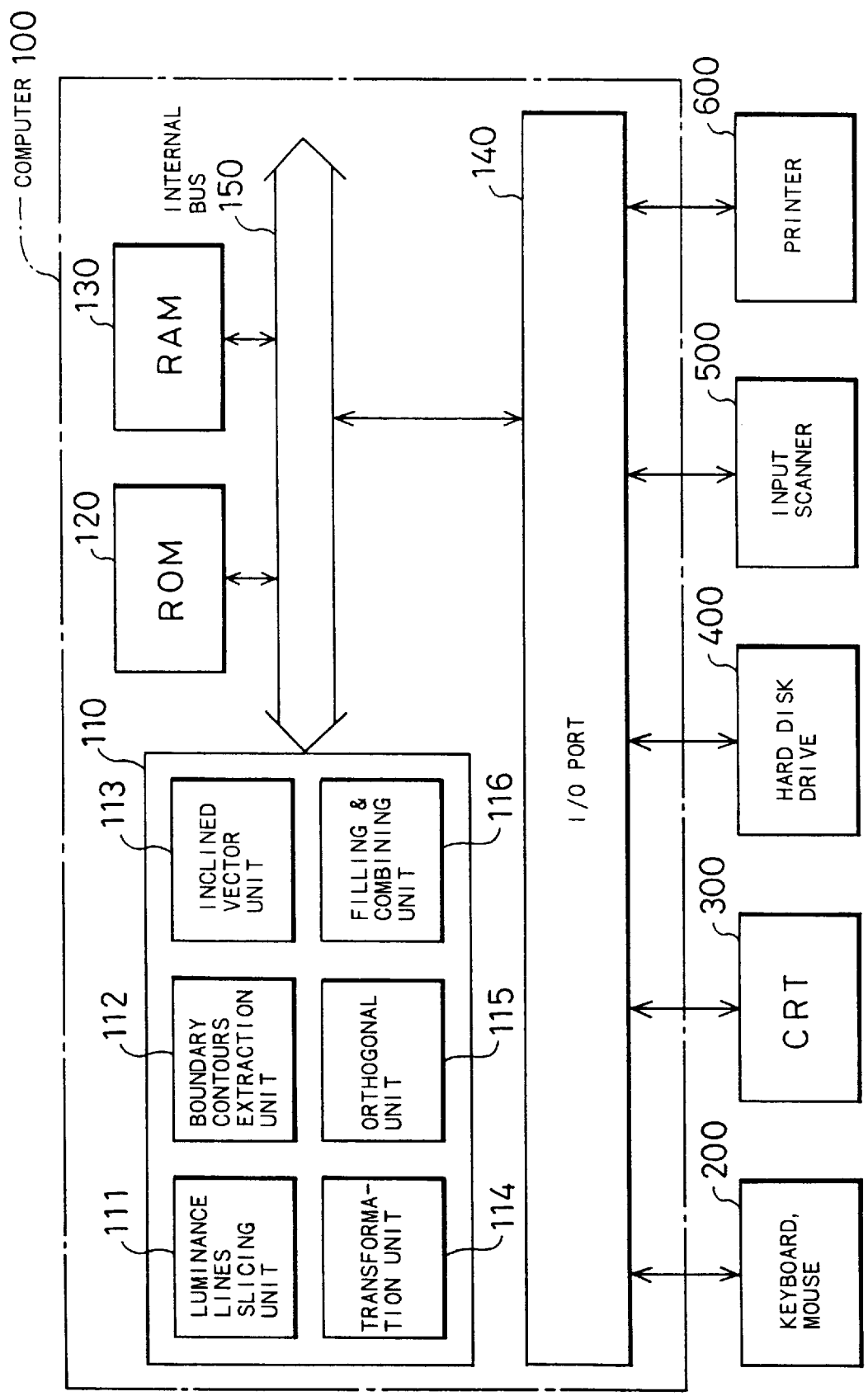
FIG. 2 is a block diagram illustrating an image processing system applied for realizing the image processing routine shown in FIG. 1.

FIG. 1 is a flowchart showing an image processing routine executed in a first embodiment according to the present invention, and FIG. 2 is a block diagram illustrating an image processing system applied for realizing the image processing routine shown in FIG. 1.

The image processing system shown in FIG. 2 has a computer 100 and its peripheral devices. The computer 100 includes a CPU (central processing unit) 110, a ROM (read only memory) 120, a RAM (random access memory) 130, and an I/O port 140, which are interconnected by an internal bus 150. The CPU 110 functions as a luminance lines slicing unit 111, a boundary contours extraction unit 112, an inclined vector unit 113, a transformation unit 114, an orthogonal unit 115, and a filling & combining unit 116, based on programs stored in the ROM 120.

The peripheral devices of the computer 100 include a keyboard and a mouse 200, a CRT (cathode ray tube) 300, a hard disk drive 400, an input scanner 500, and a printer 600, which are respectively connected to the I/O port 140.

Outline of the image processing routine executed in the first embodiment is described according to the flowchart of FIG. 1.

At step 1, image data representing an image on an original are read with the input scanner 500 and stored in the hard disk drive 400. The image data obtained are multi-valued image data including respective color components of R (red), G (green), and B (blue). The image data stored in the hard disk drive 400 are then read out and written into the RAM 130 via the I/O port 140 and the internal bus 150.

Figure 3:
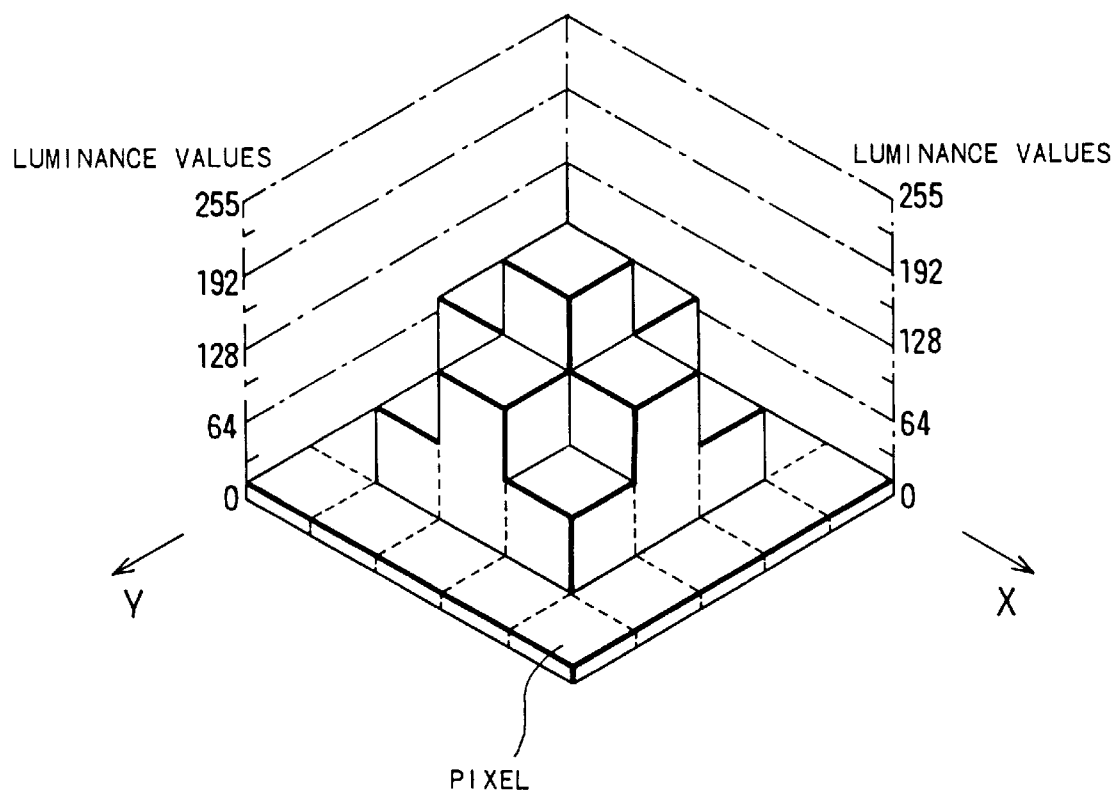
FIG. 3 shows an example of image data written in the RAM 130 of FIG. 2.

FIG. 3 shows an example of image data written in the RAM 130 of FIG. 2. The image data stored in the RAM 130 are expressed as luminance data representing luminance of each pixel for the respective colors, R, G, and B.

At step 2 in the flowchart of FIG. 1, the CPU 110 receives the image data read out of the RAM 130 and activates the luminance lines slicing unit 111 to execute slicing by luminance lines. The luminance lines slicing unit 111 sets luminance values 0 through 255 as thresholds and allocates the value '0' to a pixel if the image data of the pixel is less than each threshold, and allocates the value '1' if it is equal to or greater than each threshold. This binary-coding process slices the image data by each of the luminance values 0 through 255. The image data transferred to the CPU 110 are accordingly divided into a total of 256 binary image data respectively corresponding to the luminance values 0 through 255. Such luminance lines slicing process is carried out for the respective colors R, G, and B. Binary-coding with the luminance value 0 as the threshold results in allocating the value '1' to all the image data, and is thereby not necessary. According to a simpler application, image data are sliced not by every value from 0 through 255 but by appropriately selected luminance values. The tone levels of the image data may be other than the 256 tones corresponding to the luminance values of 0 through 255.

Figure 4:
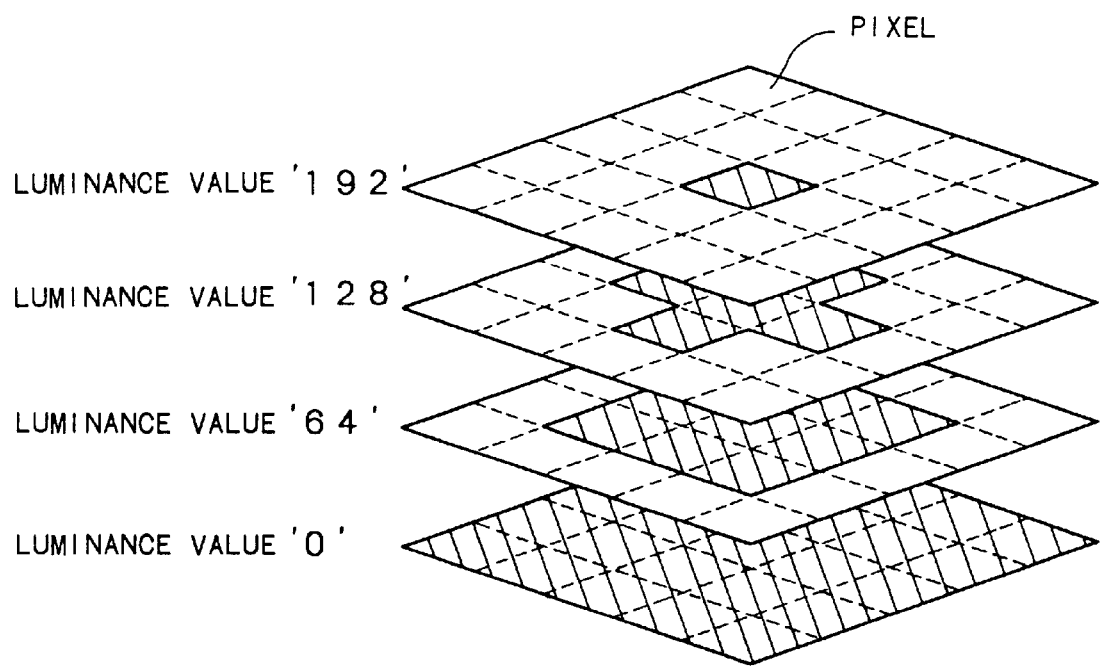
FIG. 4 shows an example of image data obtained as a result of luminance lines slicing process executed by the luminance lines slicing unit 111 of FIG. 2.

FIG. 4 shows an example of image data obtained as a result of luminance lines slicing process executed by the luminance lines slicing unit 111 of FIG. 2.

Image data shown in FIG. 4 are obtained by slicing the image data shown in FIG. 3 at the luminance values of 0, 64, 128, and 192, respectively. In the drawing, hatched portions represent pixels having the value '1' whereas non-hatched portions denote pixels having the value '0'.

At step 3 in the flowchart of FIG. 1, the boundary contours extraction unit 112 extracts boundary contours from the binary image data obtained by the luminance lines slicing process.

Figure 5:
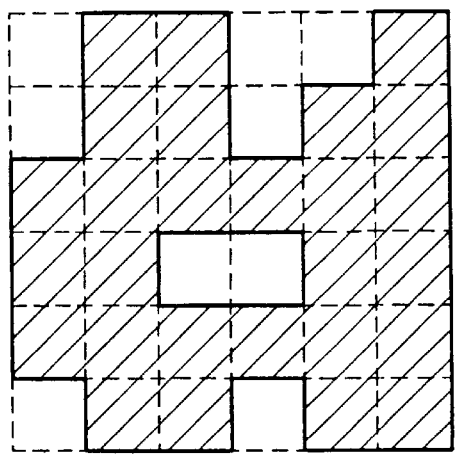
FIG. 5 shows an example of image data obtained by the luminance lines slicing process.
Figure 6:
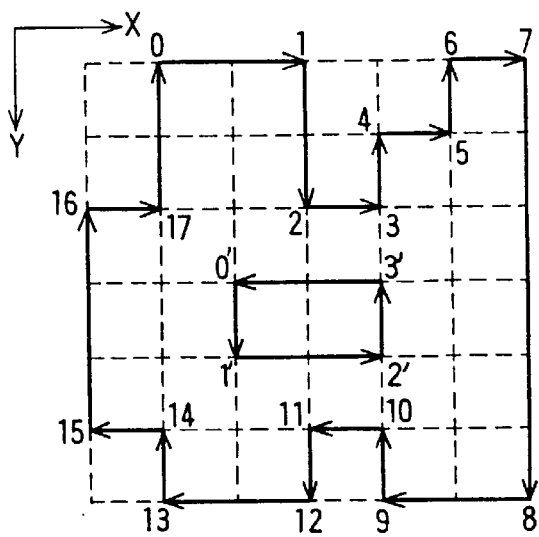
FIG. 6 shows boundary contours extracted from the image data of FIG. 5.

FIG. 5 shows an example of binary image data obtained by the luminance lines slicing process, and FIG. 6 shows boundary contours extracted from the binary image data of FIG. 5.

The boundary contours extraction unit 112 extracts, for example, the boundary contours as shown in FIG. 6 from the binary image data of FIG. 5 according to a known boundary contours extraction method as disclosed in U.S. Pat. No. 5,379,350, the disclosure of which is incorporated herein by reference. The boundary contours represent boundary lines between pixels having the value '1' (hatched portions in FIG. 5) and pixels having the value '0' (non-hatched portions). The boundary contours extracted are expressed as vectors starting from or terminating at respective vertices of the boundary lines (that is, respective corner points) as shown in FIG. 6. In this embodiment, either coordinates of a starting point of each vector or those of a terminal point are applied as vector data representing a contour line. It is possible, of course, to apply both the coordinates of a starting point of each vector and those of a terminal point. But since the coordinates of a starting point of each vector are identical with the coordinates of a terminal point of the preceding vector, application of only one set of coordinates reduces the total amount of data and is thereby more practical and efficient. The boundary contours are composed of vectors extending in an X direction (horizontal direction) and a Y direction (vertical direction) as shown in FIG. 6.

In this embodiment, all the vectors constituting the boundary contour indicate that the pixels having the value '1' exist on the right side of the vectors as seen in FIG. 6. In the description below, the clockwise boundary contour is referred to as 'outer boundary contour' while the counterclockwise boundary contour is referred to as 'inner boundary contour'. In the drawing of FIG. 6, the outer boundary contour is defined by a set of 18 points arranged clockwise from the point 0 to the point 17, whereas the inner boundary contour is defined by a set of 4 points arranged counterclockwise from the point 0' to the point 3'. The contour lines of image data obtained by the luminance lines slicing process always form a closed figure as shown in FIG. 5, and therefore both the outer boundary contour and the inner boundary contour necessarily form closed curves as shown in FIG. 6.

The extraction of boundary contours is carried out for all the binary image data obtained by the luminance lines slicing process (that is, a total of 256 binary image data respectively corresponding to the luminance values 0 through 255) for the respective colors R, G, and B. Subsequent processes described below are also carried out for all the binary image data obtained by the luminance lines slicing process for the respective colors R, G, and B.

At step 4 in the flowchart of FIG. 1, the inclined vector unit 113 of the CPU 110 executes an inclined vector process for the extracted boundary contours according to specified conditions. Contours obtained as a result of the inclined vector process are hereinafter referred to as inclined vector contours. The inclined vector process will be described later in detail.

Figure 7:
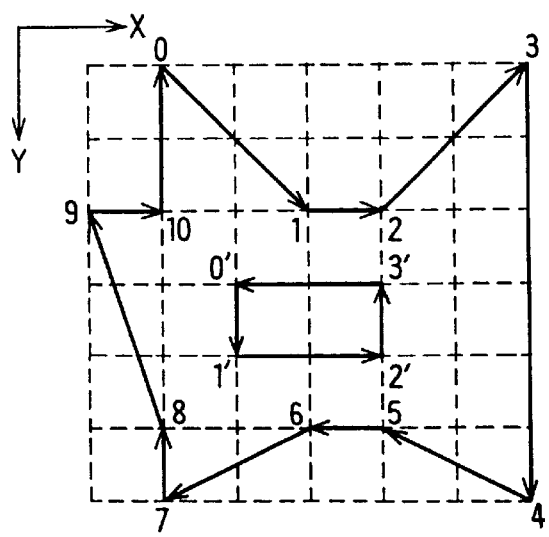
FIG. 7 shows inclined vector contours obtained by executing an inclined vector process for the extracted boundary contours shown in FIG. 6.

FIG. 7 shows inclined vector contours obtained by executing the inclined vector process for the extracted boundary contours shown in FIG. 6.

The inclined vector unit 113 replaces specific corners of the boundary contours shown in FIG. 6, which satisfy the specified conditions, with inclined vectors as shown in FIG. 7 so as to give inclined vector contours. This inclined vector process allows the outer boundary contour to be composed of a total of 11 vectors from the point 0 to the point 10, while maintaining the inner boundary contour.

FIGS. 8(a) and 8(b) show coordinates of vectors constituting the boundary contours of FIG. 6 and coordinates of vectors constituting the inclined vector contours of FIG. 7, respectively. More concretely, FIG. 8(a) shows coordinates (that is, X, Y coordinates) of each point where an upper left corner of an upper left-most pixel in FIG. 6 is chosen as origin. FIG. 8(b) shows coordinates of each point where an upper left corner of an upper left-most pixel in FIG. 7 is chosen as origin. The inclined vector process executed by the inclined vector unit 113 changes the vectors constituting the contours from the state of FIG. 8(a) to the state of FIG. 8(b).

At step 5 in the flowchart of FIG. 1, the transformation unit 114 of the CPU 110 executes a desirable transformation of coordinates (for example, affine transformation) to expand, contract, or rotate the inclined vector contours obtained through the inclined vector process. In the expanding transformation, for example, coordinates of all the vectors constituting the inclined vector contours are multiplied by a desired magnification. In other transformations, coordinates are transformed for all the vectors constituting the inclined vector contours.

Figure 9:
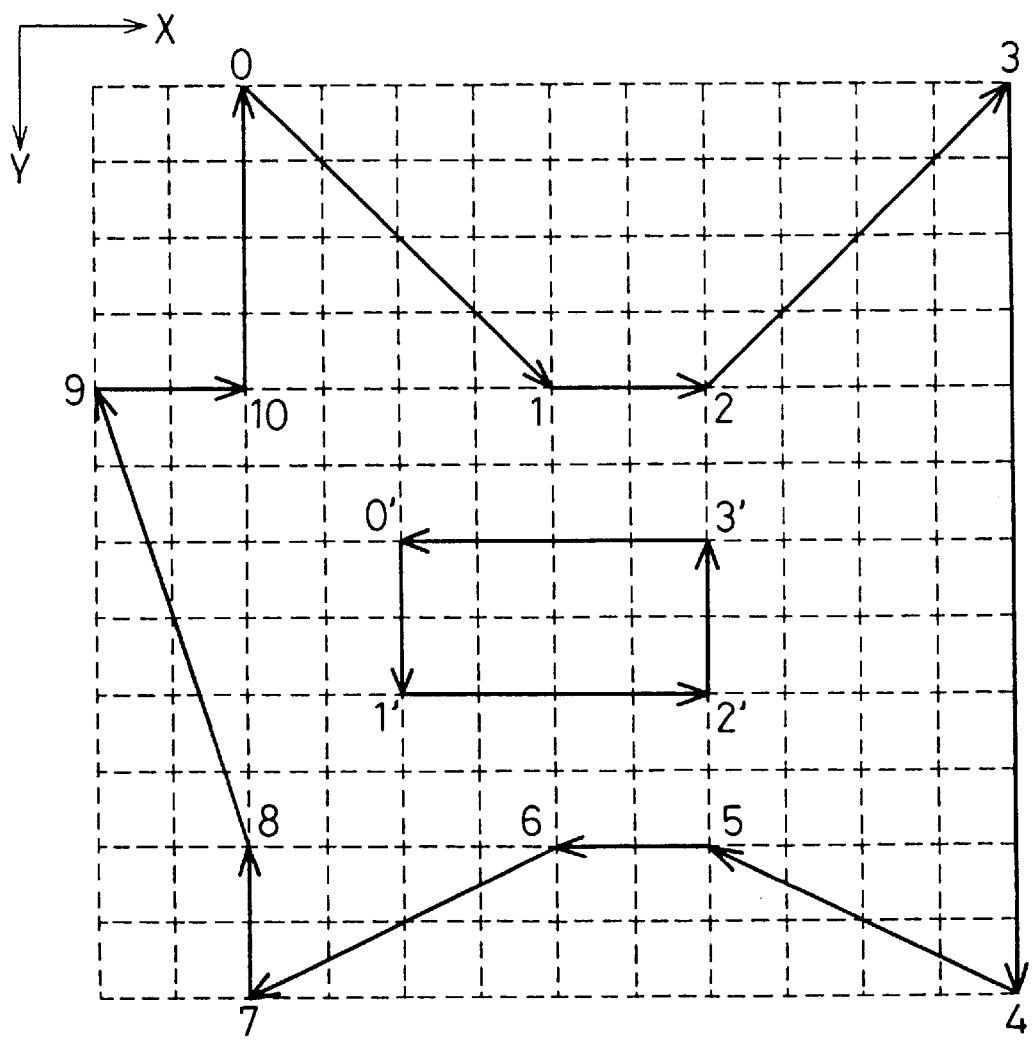
FIG. 9 shows a result of twice enlarging the inclined vector contours of FIG. 7.

FIG. 9 shows a result of twice enlarging the inclined vector contours of FIG. 7, where coordinates of each point are twice as large as coordinates of the same point of FIG. 7 as shown in FIG. 10 described below.

In the transformation of twice enlargement, the coordinates are multiplied by two for all the vectors constituting the inclined vector contours shown in FIG. 7. This multiplication gives the twice enlarged-inclined vector contours as shown in FIG. 9.

FIGS. 10(a) and 10(b) show coordinates of vectors constituting the inclined vector contours of FIG. 7 and coordinates of vectors constituting the twice enlarged-inclined vector contours of FIG. 9, respectively.

More concretely, FIG. 10(a) shows coordinates of each point where an upper left corner of an upper left-most pixel in FIG. 7 is chosen as origin. FIG. 10(b) shows coordinates of each point where an upper left corner of an upper left-most pixel in FIG. 9 is chosen as origin. All the coordinates of vectors shown in FIG. 10(b) are twice as large as the coordinates of vectors shown in FIG. 10(a).

At step 6 in the flowchart of FIG. 1, the orthogonal unit 115 of the CPU 110 executes a predetermined orthogonal process for the inclined vector contours previously undergoing the desirable transformation of coordinates. This orthogonal process re-converts the inclined vector contours to boundary contours.

Figure 11:
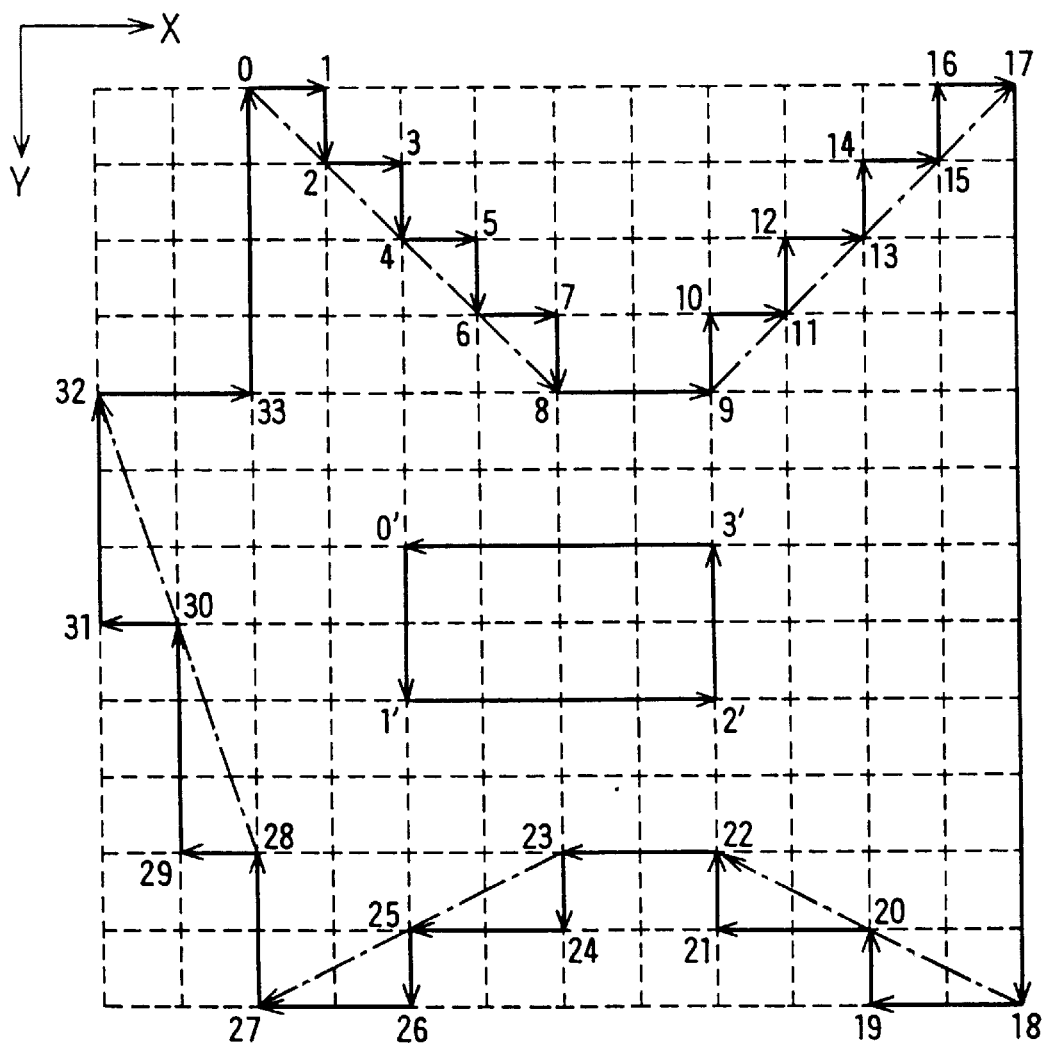
FIG. 11 shows boundary contours obtained by executing an orthogonal process for the twice enlarged-inclined vector contours of FIG. 9.

FIG. 11 shows boundary contours obtained by executing the orthogonal process for the twice enlarged-inclined vector contours of FIG. 9.

The orthogonal unit 115 converts the inclined vectors among the inclined vector contours shown in FIG. 9 to contours extending in the X and Y directions as shown in FIG. 11 so as to give boundary contours. The minimum lengths in the X and Y directions are defined by an output resolution of a selected output device, such as the printer 600. When the output resolution of the selected output device is 100 dots/cm, for example, the minimum lengths in the X and Y directions correspond to 0.01 cm in actual output.

This orthogonal process allows the outer inclined vector contour to be composed of a total of 34 vectors from the point 0 to the point 33, while allowing the inner inclined vector contour to be made of 4 vectors from the point 0' to the point 3'.

FIGS. 12(a) and 12(b) show coordinates of vectors constituting the twice enlarged-inclined vector contours of FIG. 9 and coordinates of vectors constituting the boundary contours of FIG. 11, respectively. More concretely, FIG. 12(a) shows coordinates of each point where an upper left corner of an upper left-most pixel in FIG. 9 is chosen as origin. FIG. 12(b) shows coordinates of each point where an upper left corner of an upper left-most pixel in FIG. 11 is chosen as origin. The orthogonal process executed by the orthogonal unit 115 changes the vectors constituting the contours from the state of FIG. 12(a) to the state of FIG. 12(b).

At step 7 in the flowchart of FIG. 1, the filling & combining unit 116 of the CPU 110 fills between the outer boundary contour and the inner boundary contour to give binary image data.

Figure 13:
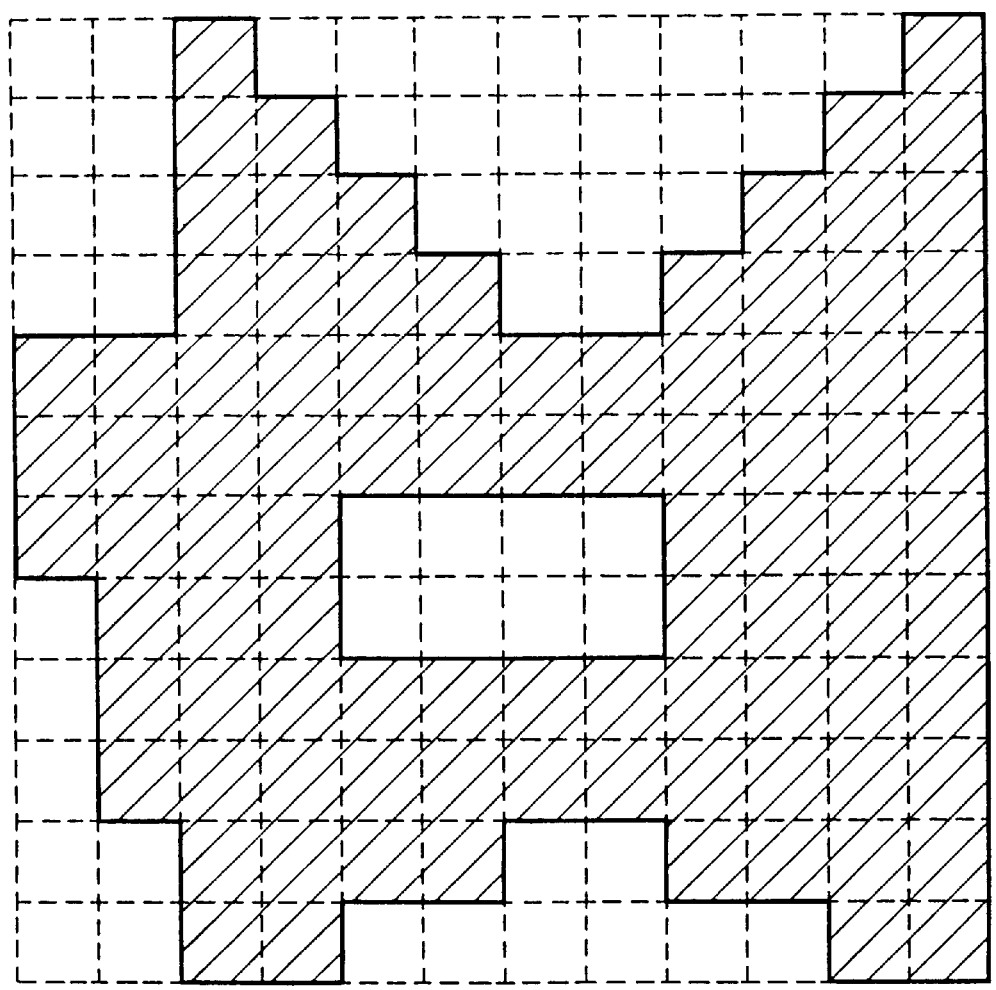
FIG. 13 shows binary image data obtained by filling between the outer boundary contour and the inner boundary contour of FIG. 11.

FIG. 13 shows binary image data obtained by filling between the outer boundary contour and the inner boundary contour of FIG. 11.

The filling & combining unit 116 allocates the value '1' to the pixels positioned between the outer boundary contour and the inner boundary contour and the value 0 to the pixels positioned outside the outer boundary contour or inside the inner boundary contour, so as to give binary image data as shown in FIG. 13. As described previously, the outer boundary contour is defined by clockwise vectors, whereas the inner boundary contour is specified by counterclockwise vectors. When a specific area is divided into two sections by a certain boundary contour, the right-side section along the vectors constituting the certain boundary contour is defined as the 'effective area' of the certain boundary contour. Namely the filling process described above fills the 'effective areas' of both the outer boundary contour and the inner boundary contour. When a boundary contour does not include any inner boundary contour, the whole inside area of the boundary contour corresponds to the 'effective area' and is accordingly filled out.

As described previously, these processes are carried out for all the image data obtained by the luminance lines slicing process for the respective colors R, G, and B. Namely the above processing gives 256 image data of closed figures as shown in FIG. 13 for the respective colors R. G. and B.

Figure 14:
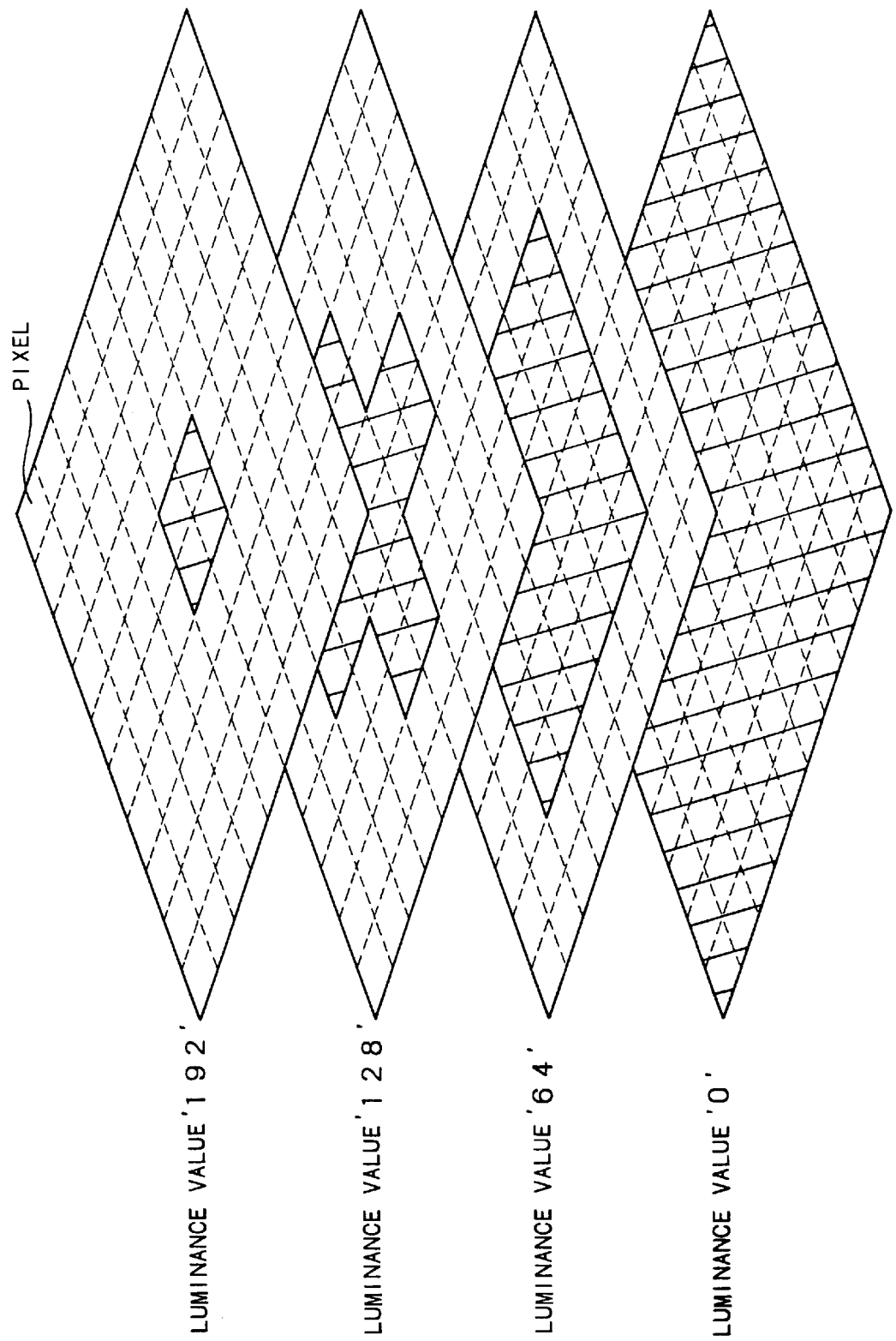
FIG. 14 shows an example of image data obtained by a filling process executed by the filling & combining unit 116 of FIG. 2.

FIG. 14 shows an example of image data obtained by the filling process executed by the filling & combining unit 116 of FIG. 2.

Image data shown in FIG. 14 are obtained through the filling process for the luminance values 0, 64, 128, and 192, where hatched portions represent pixels having the value '1' and non-hatched portion represent pixels having the value '0'.

The filling & combining unit 116 of the CPU 110 combines the 256 image data, which are obtained as a result of the filling process and respectively correspond to the luminance values 0 through 255, in the order of the luminance values, so as to give multi-valued image data. This combining process is carried out for the respective colors R, G, and B.

Figure 15:
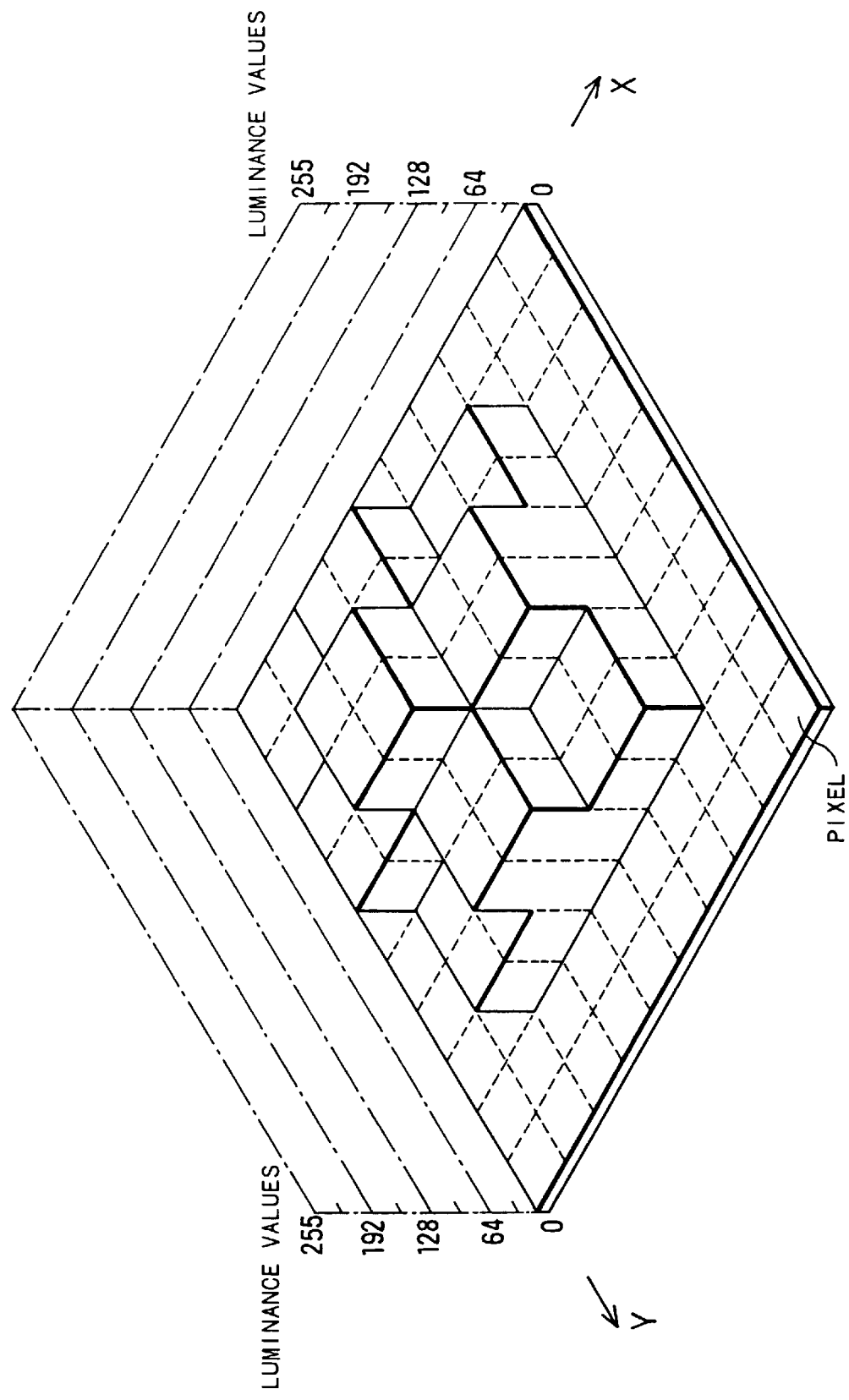
FIG. 15 shows an example of image data obtained by a combining process.

FIG. 15 shows an example of image data obtained by the combining process.

The filling & combining unit 116 combines a total of 256 image data, which correspond to the respective luminance values 0, 64, 128, and 192 shown in FIG. 14 and are otherwise obtained by further filling procedures, in the order of luminance values from 0 to 255, so that multi-valued image data as shown in FIG. 15 are generated on the RAM 130. According to concrete steps, the luminance value '1' is accumulated in pixels included in the 'effective area' of each image data obtained through the filling process, so as to give final luminance values of the pixels. Like the image data shown in FIG. 3, the image data of FIG. 15 are expressed as luminance data representing luminance of each pixel.

At step 8 in the flowchart of FIG. 1, the image data thus obtained are transferred from the RAM 130 to the printer 600 via the internal bus 150 and the I/O port 140, and a resulting image corresponding to the transferred image data is recorded by the printer 600.

As described above, the system of the first embodiment carries out the inclined vector process for boundary contours prior to the image processing, such as enlargement, contraction, or rotation, so as to allow a processed image to be defined by inclined vectors as well as vectors in the horizontal and vertical directions (that is, X and Y directions). The image composed of such inclined, horizontal, and vertical vectors is then processed by transformation of coordinates of these vectors. The system of the embodiment accordingly allows the resolution of an image after transformation of coordinates to be independent of the resolution of an input device, that is, the input scanner 500. This effectively prevents the processed image from being undesirably out-of-focus and reduces the occurrence of jaggy portions in curved or inclined straight lines of the obtained image, thereby protecting the image from deterioration. The orthogonal unit 115 sets the minimum lengths of contours extending in the X and Y directions in response to the output resolution of a selected output device, such as the printer 600. This effectively prevents the occurrence of jaggy portions having roughness below the capacity of the output device.

B. Inclined Vector Process

B-1) Outline of Inclined Vector Process

Figures 16A, 16B, 16C:
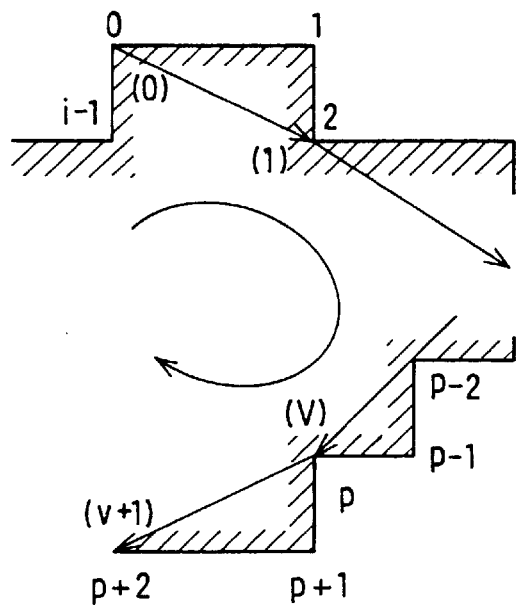
FIGS. 16(a) through 16(c) schematically show the inclined vector process executed in the first embodiment.

FIGS. 16(a) through 16(c) schematically show the inclined vector process executed in the first embodiment. More concretely, FIG. 16(a) illustrates the inclined vector process for converting a boundary contour to an inclined vector contour; FIG. 16(b) shows coordinates of vectors constituting the boundary contour of FIG. 16(a); and FIG. 16(c) shows coordinates of vectors constituting the inclined vector contour obtained by the inclined vector process of FIG. 16(a).

As clearly seen in FIGS. 16(b) and 16(c), the inclined vector process executed in this embodiment newly registers vectors constituting an inclined vector contour in succession, based on the vectors constituting a boundary contour. Alternatively, the contents of vectors constituting the boundary contour may be changed directly to give vectors constituting the inclined vector contour.

It is assumed that the boundary contour is composed of a total of 'i' vectors from the point '0' to the point 'i-1', and 'p' represents a current starting point (that is, a starting point of currently noted vector, from which an X-directional, Y-directional, or inclined vector starts). The inclined vector contour obtained through the inclined vector process is composed of vectors starting from the point '0', and 'v' represents a newest point among the currently registered points.

The boundary contour shown in FIG. 16(a) represents an outer boundary contour, where points of vectors constituting the boundary contour are expressed by numerals without parentheses and those constituting the inclined vector contour are given by numerals with parentheses. In the description below, the point 'p', for example, represents the point having a numeral 'p'.

The current starting point 'p' functioning as a reference point and subsequent points 'p+1' and 'p+2' among the vectors constituting the boundary contour are used for determining whether the inclined vector process is to be carried out or not. It is accordingly determined whether an inclined vector extending from the current starting point 'p' in the inclined direction should be set to substitute for a horizontal or vertical vector extending in the horizontal or vertical direction (X or Y direction). The inclined vector process is executed when a given triangle defined by the current starting point 'p' and the subsequent points 'p+1' and 'p+2' satisfies both the conditions (1) and (2) given below.

Condition (1): the area S of the triangle defined by Equation (1) is positive:

$$S=\{(x_p-x_{p+2})(y_{p+1}-y_{p+2})-(x_{p+1}-x_{p+2})(y_p-y_{p+2})\}/2 \quad (1)$$

where $x_p$ and $y_p$ respectively represent X and Y coordinates of the point 'p'; $x_{p+1}$ and $y_{p+1}$ those of the point 'p+1' and $x_{p+2}$ and $y_{p+2}$ those of the point 'p+2'. The area S can be negative according to Equation (1).

Condition (2): the absolute value of the area S of the given triangle is not greater than 3 (that is, when $|S| \leq 3$), or the absolute value of a displacement $\Delta x$ in the X direction from the point 'p' to the point 'p+1' or from the point 'p+1' to the point 'p+2' of the given triangle or the absolute value of a displacement $\Delta y$ in the Y direction is equal to 1; that is, when $|\Delta x|=1$ or $|\Delta y|=1$.

According to the condition (1) the inclined vector process is executed for an outer boundary contour, inclined vectors generated should run inside the outer boundary contour. When the inclined vector process is executed for an inner boundary contour, on the contrary, inclined vectors generated should run outside the inner boundary contour (see FIGS. 6 and 7).

The condition (2) assures to re-convert the inclined vectors to horizontal and vertical vectors; that is, if the inclined vector process were carried out while the given triangle does not satisfy the condition (2), the subsequent orthogonal process would not unequivocally re-convert the inclined vectors to horizontal and vertical vectors, thereby resulting in incomplete restoration of original boundary contour.

Figure 17A:
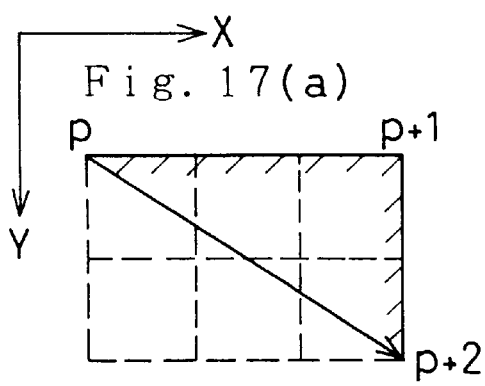
FIGS. 17(a) through 17(c) show examples subject to and non-subject to the inclined vector process.
Figure 17B:
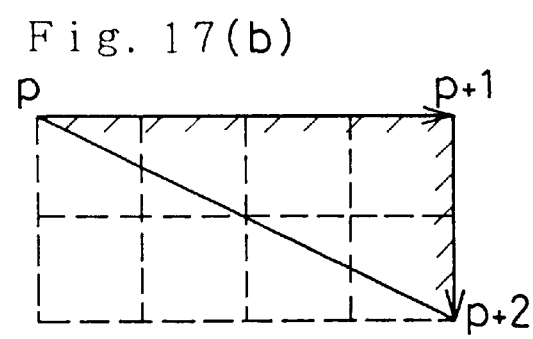
Figure 17C:
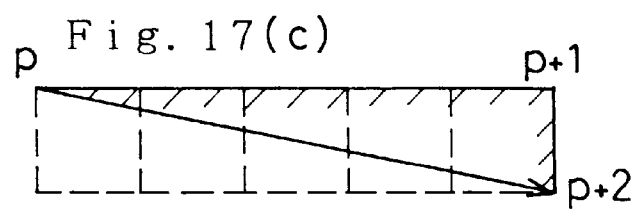

FIGS. 17(a) through 17(c) show examples subject to and non-subject to the inclined vector process, where a horizontal vector from the point 'p' to the point 'p+1' and a vertical vector from the point 'p+1' to the point 'p+2' exist as a boundary contour.

In the example of FIG. 17(a), S=3, $\Delta x$=3, and $\Delta y$=2. Since S>0 and $|S| \leq 3$, the inclined vector process is carried out to substitute the horizontal and vertical vectors by an inclined vector from the point 'p' to the point 'p+2'. In the example of FIG. 17(b), S=4, $\Delta x$=4, and $\Delta y$=2. Since S>3, $|\Delta x| \neq 1$, and $|\Delta y| \neq 1$, though S>0, the inclined vector process is not carried out and the horizontal and vertical vectors are maintained. In the example of FIG. 17(c), S=2.5, 66 x=5, and $\Delta y$=1. Since S>0 and $|\Delta y|$=1, the inclined vector process is carried out to substitute the horizontal and vertical vectors by an inclined vector from the point 'p' to the point 'p+2'.

B-2) Steps of Inclined Vector Process

Figure 18:
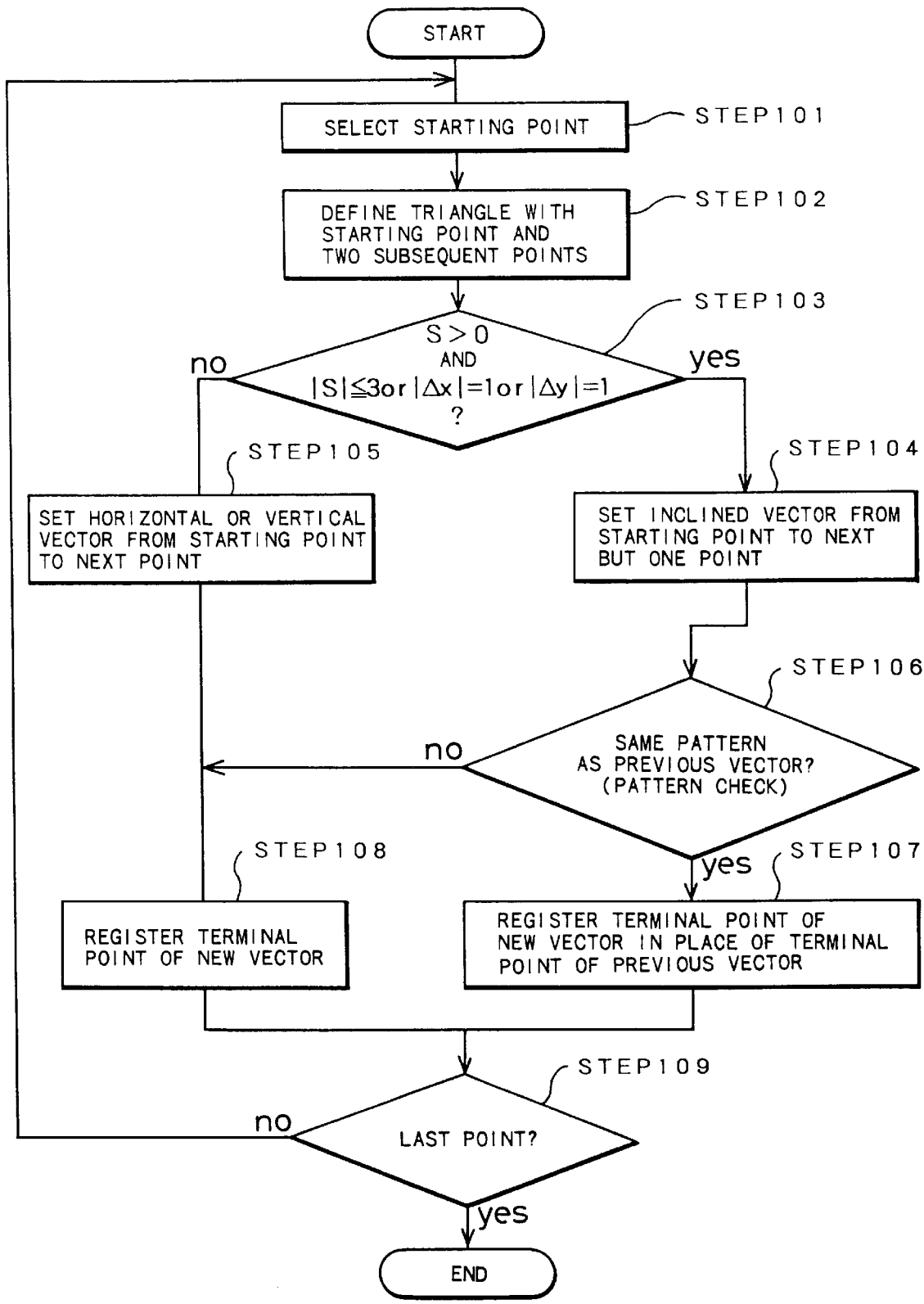
FIG. 18 is a flowchart showing steps of the inclined vector process.

FIG. 18 is a flowchart showing steps of the inclined vector process. When the program enters the routine shown in FIG. 18, a starting point 'p' is first selected among vectors constituting the boundary contour at step 101. The program then proceeds to step 102 at which a given triangle is defined by the starting point 'p' and subsequent points 'P+1' and 'p+2'.

At step 103, it is determined whether both the above conditions (1) and (2) are satisfied; that is, whether the area S of the given triangle is greater than zero (S>0) and $|S| \leq 3$, $|\Delta x|$=1 or $|\Delta y|$=1. When the answer is affirmative at step 103, the program proceeds to step 104 at which an inclined vector is set from the starting point 'p' to the next but one point 'p+2'. When the answer is negative at step 103, on the contrary, the program proceeds to step 105 at which a horizontal or vertical vector is set from the starting point 'p' to the next point 'p+1'.

After an inclined vector is set at step 104, the program goes to step 106 at which the inclined vector (new vector) is compared with a preceding vector immediately before the inclined vector and checked as to whether the new vector has an identical pattern to that of the preceding vector (pattern check). The pattern check will be described later in detail. When the answer is affirmative at step 106, that is, when the pattern check gives identical results, the program goes to step 107 at which the terminal point of the new vector is registered in place of the terminal point of the preceding vector, which is previously registered and identical with the starting point of the new vector. When the answer is negative at step 106, that is, when the pattern check gives non-identical results, on the other hand, the program goes to step 108 at which the terminal point of the new vector is directly registered.

After a horizontal or vertical vector is set at step 105, the program skips the pattern check of step 106 but directly proceeds to step 108 at which the terminal point of the horizontal or vertical vector (new vector) is registered.

After either the processing at step 107 or step 108, the program goes to step 109 at which it is determined whether the registered terminal point of the new vector coincides with an end point or last point 'i−1' of vectors constituting the boundary contour. When the answer is affirmative at step 109, that is, when the registered terminal point coincides with the end point, the program exits from this routine. When the answer is negative at step 109, that is, when the registered terminal point does not coincide with the end point, the program returns to step 101 to repeat the processes described above.

B-3) Details of Inclined Vector Process

The inclined vector process is described more in detail about its initial, intermediate, and final stages.

At the initial stage, no vectors exist before a first vector undergoing the inclined vector process, and the starting point and the terminal point of the first vector are accordingly registered directly without any pattern check.

At the intermediate stage, an inclined vector can be set from the point 'p' to the point 'p+2' when the above conditions (1) and (2) are satisfied.

FIGS. 19(a) through 19(c) and 20(a) through 20(c) respectively show examples to allow the inclined vector process at the intermediate stage. In these drawings, FIG. (a) shows an inclined vector contour set with respect to an outer boundary contour; FIG. (b) shows coordinates of vectors constituting the outer boundary contour of FIG. (a); and FIG. (c) shows coordinates of vectors constituting the inclined vector contour of FIG. (a). These specifications are also applied to the subsequent drawings of FIGS. 21 through 28.

The inclined vector process is carried out when a given triangle defined by the points 'p', 'p+1', and 'p+2' has the area S greater than zero (S>0) and satisfies $|S| \leq 3$, $|\Delta x|$=1 or $|\Delta y|$=1 as described previously. The pattern check executed as above under such conditions gives either a non-identical result as shown in FIG. 19 or an identical result as shown in FIG. 20. The non-identical result means that a preceding vector (vold) and a new vector (vnew) are different in size or direction (vold≠vnew), whereas the identical result means the preceding vector and the new vector are identical with each other both in size and direction (vold=vnew).

When the preceding vector and the new vector have different patterns as shown in FIG. 19, the X,Y coordinates of the next but one point 'p+2' to the starting point 'p' are registered as a component point 'v+1' of vectors constituting an inclined vector contour, whereby the terminal point of the new vector (vnew) is registered.

When the preceding vector and the new vector have identical patterns as shown in FIG. 20, on the contrary, the preceding vector (vold) and the new vector (vnew) have the same direction and these two vectors can thus be replaced by one vector. This replacement vector is set from a point 'p−2', which is the starting point of the preceding vector (vold), to a point 'p+2', which is the terminal point of the new vector (vnew). In this case, prior registration of the coordinates of the point 'p' as a component point 'v' of vectors constituting the inclined vector contour is canceled, and the coordinates of the point 'p+2' are newly registered as the component point 'v'. This allows the terminal point of the new vector (vnew) to be registered in place of the terminal point of the preceding vector (vold). In both the examples of FIGS. 19 and 20, the registered point 'p+2' is chosen as a starting point of a next vector.

At the intermediate stage, an inclined vector can not be set from the point 'p' to the point 'p+2' when the above conditions (1) and (2) are not fulfilled.

FIGS. 21(a) through 21(c), 22(a) through 22(c), and 23(a) through 23(c) respectively show examples wherein the inclined vector process is not performed at the intermediate stage. The inclined vector process is not carried out when a given triangle defined by the points 'p', 'p+1', and 'p+2' has the area S equal to or less than zero (S$\leq$0) or satisfies $|S|$>3 and the displacement $|\Delta x|$ and $|\Delta y|$ are not equal to one. FIG. 21 shows an example of fulfilling $S \leq 0$, and FIGS. 22 and 23 show examples of satisfying $|S|>3$, $|\Delta x| \neq 1$, and $|\Delta y| \neq 1$.

When $S \leq 0$ as shown in FIG. 21, coordinates of the next point 'p+1' to the starting point 'p' are registered as a component point 'v+1' of vectors constituting an inclined vector contour, so that the terminal point of a new vector is registered. In the example of FIG. 21, the registered point 'p+1' is chosen as a starting point of a next vector.

When $|S|>3$, $|\Delta x| \neq 1$, and $|\Delta y| \neq 1$ and a length α between the points 'p+1' and 'p+2' is greater than 3 as shown in FIG. 22, a vertical vector is set from the point 'p' to the point 'p+1' and a horizontal vector is subsequently set from the point 'p+1' to the point 'p+2'. Since the length α between the points 'p+1' and 'p+2' is greater than 3 and the absolute value of the area S of a given triangle defined by the points 'p+1', 'p+2', and 'p+3' (not shown) is greater than 3 ($|S|>3$), it is impossible to set an inclined vector from the starting point 'p+1', which is next to the point 'p', to the point 'p+3'. The horizontal vector is thus set from the point 'p+1' to the point 'p+2'. In this case, coordinates of the point 'p+1' and those of the point 'p+2' are successively registered as component points 'v+1' and 'v+2' of vectors constituting an inclined vector contour, so that the terminal points of two new vectors are registered. In the example of FIG. 22, the last registered point 'p+2' is chosen as a starting point of a next vector.

When $|S|>3$, $|\Delta x| \neq 1$, and $|\Delta y| \neq 1$ and a length β between the points 'p' and 'p+1' is greater than 3 as shown in FIG. 23, it may be possible, unlike in the case of FIG. 22, to set an inclined vector from the point 'p+1' to a point 'p+3' (not shown). Under such conditions, only a vertical vector is set from the point 'p' to the point 'p+1'. In this case, coordinates of the point 'p+1' are registered as a component point 'v+1' of vectors constituting an inclined vector contour, so that the terminal point of a new vector is registered. In the example of FIG. 23, the registered point 'p+1' is chosen as a starting point of a next vector.

When the inclined vector process can not be carried out, any one of the above processes is applied.

As clearly seen in FIGS. 21(b), 21(c), 22(b), 22(c), 23(b), and 23(c), these alternative processes are equivalent to a process of not changing vectors constituting a boundary contour.

At the final stage of the inclined vector process, there are two possible cases; that is, the starting point 'p' of the last vector to be processed is the end point or the last point 'i−1' of vectors constituting a boundary contour in one case, and it is the pre-end point 'i−2' immediately before the end point in the other.

If the starting point 'p' of the last vector is the pre-end point 'i−2' immediately before the end point, an inclined vector can be set from the starting point 'p' or 'i−2' to the point 'p+2' or '0' (the starting point or first point of vectors constituting the boundary contour), when the above conditions (1) and (2) are satisfied.

FIGS. 24(a) through 24(c) and 25(a) through 25(c) respectively show examples wherein the inclined vector process is performed at the final stage. The inclined vector process is carried out when a given triangle defined by the points 'i−2', 'i−1', and '0' has the area S greater than zero (S>0) and satisfies $|S| \leq 3$, $|\Delta x|=1$ or $|\Delta y|=1$. The pattern check executed under such conditions gives either a non-identical result as shown in FIG. 24 or an identical result as shown in FIG. 25. The non-identical result means that a preceding vector (vold) and a new vector (vnew) have different patterns (vold≠vnew), whereas the identical result means the preceding vector and the new vector have identical patterns (vold=vnew).

When the preceding vector and the new vector have different patterns as shown in FIG. 24, it is impossible to replace the preceding vector (vold) and the new vector (vnew) by one vector. The coordinates of the point 'i−2', that is, the starting point of the new vector (vnew), and those of the point '0', that is, the terminal point of the new vector (vnew), have already been registered as component points 'v' and '0' of vectors constituting an inclined vector contour, respectively. The process is accordingly concluded without any registration.

When the preceding vector and the new vector have identical patterns as shown in FIG. 25, on the contrary, the preceding vector (vold) and the new vector (vnew) have the same directions and these two vectors can thus be replaced by one vector in the same manner as the example of FIG. 20. This replacement vector is set from a point 'i−4', which is the starting point 'p−2' of the preceding vector (vold), to a point '0', which is the terminal point 'p+2' of the new vector (vnew). Since the coordinates of the point '0' functioning as the terminal point of the replacement vector have already been registered as a component point '0' of vectors constituting an inclined vector contour, preceding registration of the coordinates of the point 'i−2' as a component point 'v' of vectors constituting the inclined vector contour is canceled prior to the conclusion of processing.

When the starting point 'p' of a vector is the pre-end point 'i−2' immediately before the end point, an inclined vector can not be set from the starting point 'p' or 'i−2' to the point 'p+2' or '0' when the above conditions (1) and (2) are not fulfilled.

FIGS. 26(a1) through 26(c) show an example wherein the inclined vector process is not performed at the final stage. The inclined vector process is not carried out when a given triangle defined by the points 'i−2', 'i−1', and '0' has the area S equal to or less than zero (S≤0) or satisfies $|S|>3$, $|\Delta x| \neq 1$ and $|\Delta y| \neq 1$. FIG. 26(a1) shows an example of fulfilling S≤0, and FIG. 26(a2) shows an example of satisfying $|S|>3$, $|\Delta x| \neq 1$, and $|\Delta y| \neq 1$.

In either case, the coordinates of the point 'i−1' next to the point 'i−2' are registered as a component point 'v+1' of vectors constituting an inclined vector contour, so that the terminal point of a new vector is registered.

Figures 27A, 27B, 27C:
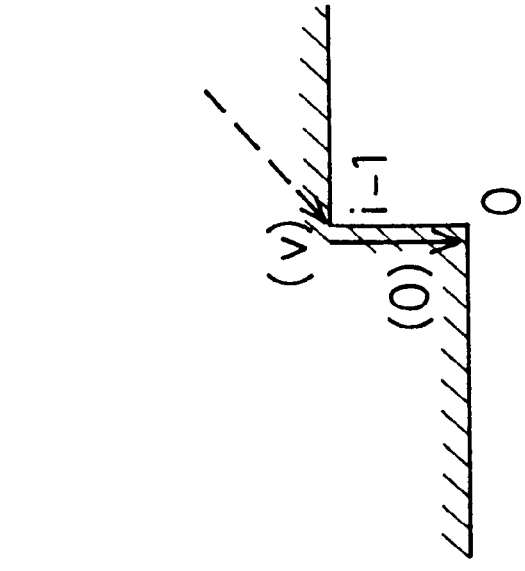
FIGS. 27(a) through 27(c) show an example where the starting point 'p' coincides with the end point 'i−1' at the final stage of the inclined vector process.

FIGS. 27(a) through 27(c) show an example where the starting point 'p' of a vector is the end point 'i−1' at the final stage of the inclined vector process. When the starting point 'p' of a vector is the end point 'i−1', the vector necessarily terminates at the point '0'. Since the coordinates of the point '0' have already been registered as a component point '0' of vectors constituting an inclined vector contour, the process is concluded without any registration.

At the time when the final stage of the inclined vector process is concluded, a total of 's' pieces of vectors from the point '0' to the point 's−1' have been registered as vectors constituting an inclined vector contour.

The final pattern check is executed on the completion of the final stage. In the final pattern check, the last vector of the inclined vector contour is compared with the starting vector and checked whether to have an identical pattern to that of the starting vector. When the last vector and the starting vector have identical patterns, the following process is carried out.

FIGS. 28(a) and 28(b) show an example where the final pattern check gives a result of identical patterns. More concretely, FIG. 28(a) shows an inclined vector contour set with respect to a boundary contour, and FIG. 28(b) shows coordinates of vectors constituting the inclined vector contour of FIG. 28(a).

When the last vector (vlast) and the starting vector (vstart) have identical patterns as shown in FIG. 28, the last vector (vlast) and the starting vector (vstart) have the same directions and these two vectors can thus be replaced by one vector in the same manner as the examples of FIGS. 20 and 25. This replacement vector is set from a point 's–1', which is the starting point of the last vector (vlast), to a point '1' (a component point '1' of vectors constituting an inclined vector contour), which is the terminal point of the starting vector (vstart). Preceding registration of the coordinates of component points '0' and 's–1' of vectors constituting the inclined vector contour is canceled, and the coordinates of the canceled point 's–1' are newly registered as the component point '0'.

When the final pattern check gives a result of different patterns, no further processing is required.

In the inclined vector process described above, the preceding vector is checked every time whether to have an identical pattern to that of the new vector (pattern check) at step 106 in the flowchart of FIG. 18. Alternatively, the processing of step 106 may be omitted not to execute the pattern check every time. In this case, the pattern check is carried out after the total 's' pieces of vectors from the point '0' to the point 's–1' have all been registered as vectors constituting an inclined vector contour. At the stage of the final pattern check, the comprehensive pattern check is executed to check whether any adjusting two vectors, that is, any pair of preceding vector and new vector, among all the registered vectors from the point '0' to the point 's–1', have identical patterns, other than the starting vector and the last vector. Cancellation of prior registration and new registration may also be carried out with the comprehensive pattern check.

C. Orthogonal Process

C-1) Outline of Orthogonal Process

Figures 29A, 29B, 29C:
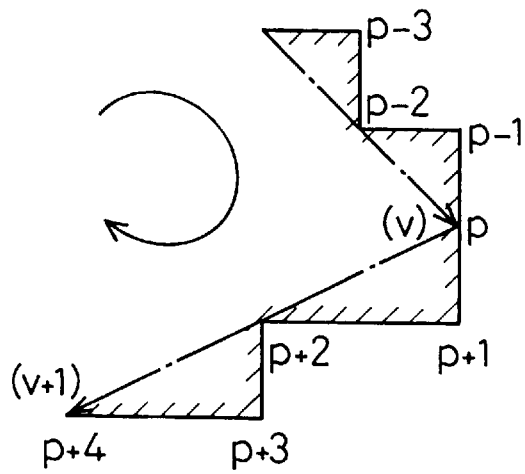
FIGS. 29(a) through 29(c) schematically show the orthogonal process.

FIGS. 29(a) through 29(c) schematically show the orthogonal process. More concretely, FIG. 29(a) shows an orthogonal process executed for an inclined vector contour; FIG. 29(b) shows coordinates of vectors constituting the inclined vector contour of FIG. 29(a); and FIG. 29(c) shows coordinates of vectors constituting a boundary contour obtained by the orthogonal process of FIG. 29(a).

In this embodiment, the orthogonal process newly registers vectors constituting a boundary contour in succession, based on vectors constituting an inclined vector contour.

It is assumed that the inclined vector contour is composed of a total of 's' pieces of vectors from the point '0' to the point 's–1', where 'v' represents a current starting point (that is, a starting point of a currently noted vector) and 'v+1' shows a current terminal point (that is, a terminal point of the currently noted vector). The boundary contour obtained through the orthogonal process is composed of vectors starting from the point '0', where 'p' represents a newest point among the currently registered points.

The inclined vector contour shown in FIG. 29(a) represents an outer inclined vector contour, where points of vectors constituting the inclined vector contour are given by numerals with parentheses, and those constituting the boundary contour obtained through the orthogonal process are expressed by numerals without parentheses.

The method of orthogonal process, that is, how contour lines should be extended in the horizontal and vertical directions (x and Y directions), is determined, based on the starting point 'v' and the terminal point 'v+1' of the currently noted vector among the vectors constituting the inclined vector contour. In the description hereinafter, contour lines extending in the horizontal or direction are referred to as horizontal contour lines, and those extending in the vertical or Y direction are as vertical contour lines.

When the orthogonal process is executed for an outer inclined vector contour, horizontal and vertical contour lines generated should run outside the outer inclined vector contour. When the orthogonal process is executed for an inner inclined vector contour, on the contrary, horizontal and vertical contour lines generated should run inside the inner inclined vector contour (see FIG. 11).

When $(x_v,y_v)$ and $(x_{v+1},y_{v+1})$ represent the X, Y coordinates of the starting point 'v' of the currently noted vector and those of the terminal point 'v+1', a displacement $\Delta x$ in the X direction from the starting point 'v' to the terminal point 'v+1' and a displacement $\Delta y$ in the Y direction (displacement determined by considering plus and minus signs) are respectively given by:

$$\Delta x = x_{v+1} - x_v \qquad (2)$$

$$\Delta y = y_{v+1} - y_v \qquad (3)$$

C-2) Steps of Orthogonal Process

Figure 30:
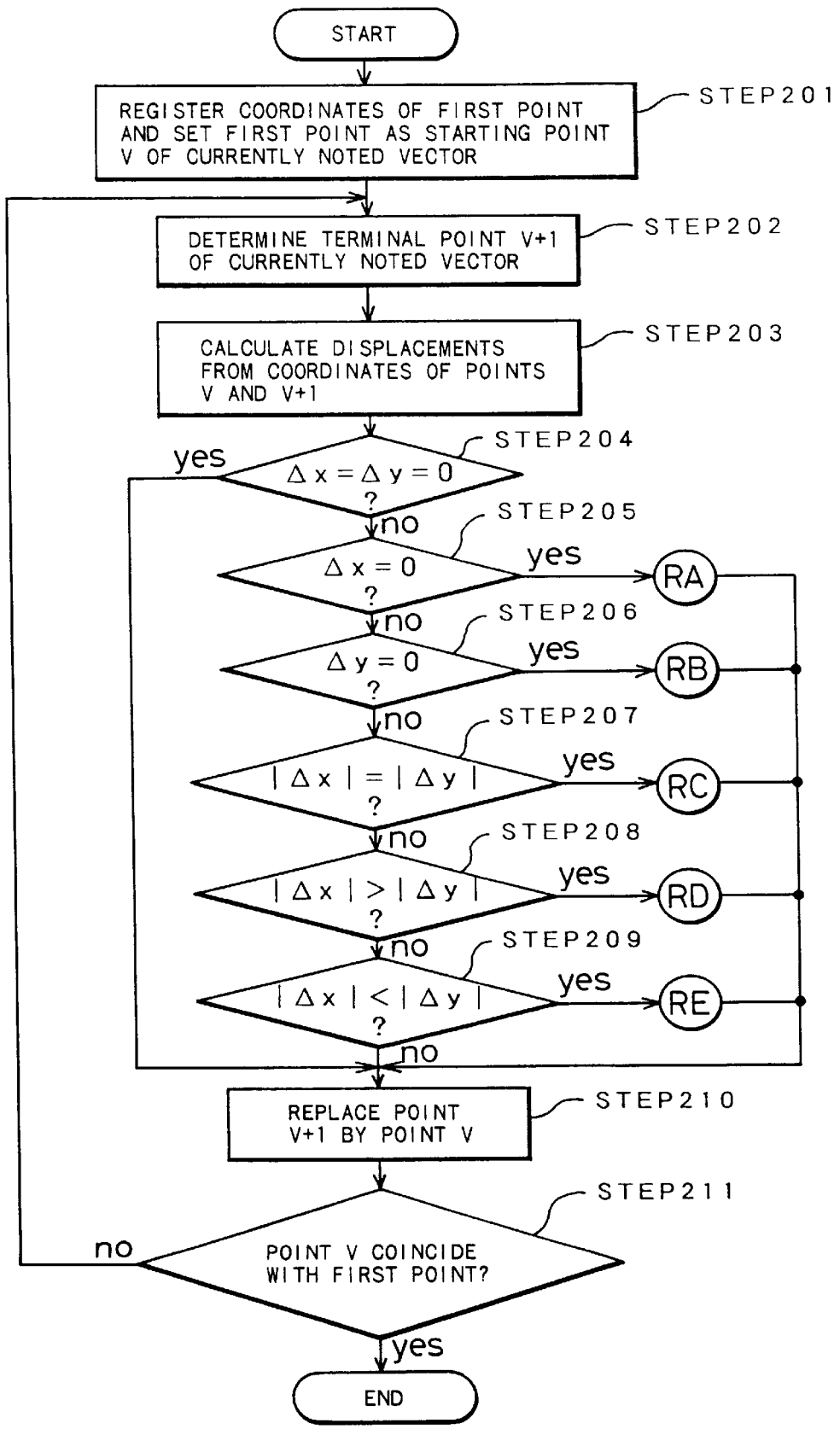
FIG. 30 is a flowchart showing steps of the orthogonal process.

FIG. 30 is a flowchart showing steps of the orthogonal process. At step 201, coordinates of a first point or starting point '0' of vectors constituting an inclined vector contour are registered as a first point or starting point '0' of vectors constituting an orthogonal boundary contour and set as a starting point 'v' of a currently noted vector. The program then proceeds to step 202, at which a terminal point 'v+1' of the currently noted vector is determined.

At step 203, a displacement $\Delta x$ in the X direction from the starting point 'v' to the terminal point 'v+1' and a displacement $\Delta y$ in the Y direction are calculated from the X, Y coordinates $(x_v,y_v)$ of the starting point 'v' and the X, Y coordinates $(x_{v+1},y_{v+1})$ of the terminal point 'v+1' according to Equations (2) and (3) given above.

The program proceeds to one of steps 204 through 209 according to the displacements $\Delta x$ and $\Delta y$ obtained at step 203. When the displacement of the currently noted vector is equal to zero, that is, $\Delta x = \Delta y = 0$, at step 204, the program goes to step 210. When the currently noted vector is a vertical vector, that is, $\Delta x = 0$, at step 205, the program goes to a subroutine RA. When the currently noted vector is a horizontal vector, that is, $\Delta y = 0$, at step 206, on the other hand, the program goes to a subroutine RB. When the currently noted vector is an inclined vector having a gradient of 45 degrees, that is, $|\Delta x|=|\Delta y|\neq 0$, at step 207, the program goes to a subroutine RC. When the currently noted vector is an inclined vector having a gradient of other than 45 degrees, the program proceeds according to the relation between the absolute values of the displacements in the X and Y directions. When $|\Delta x|>|\Delta y|$ at step 208, the program goes to a subroutine RD. When $|\Delta x|<|\Delta y|$ at step 209, on the contrary, the program goes to a subroutine RE. Although $\Delta x=\Delta y=0$ is not theoretically available, the processing of step 204 is set in this embodiment to prevent operation failures due to bugs in programs.

At step 210, the terminal point 'v+1' of the currently noted vector is replaced by and set as a starting point 'v' of a next noted vector.

At step 211, it is determined whether the point 'v' replaced at step 210 coincides with the starting point '0' of vectors constituting the inclined vector contour. When the point 'v' is identical with the point '0' (affirmative answer), the program exits from the routine. When the point 'v' is different from the point '0' (negative answer), on the contrary, the program returns to step 202.

C-3) Details of Subroutines of Orthogonal Process

Figure 31:
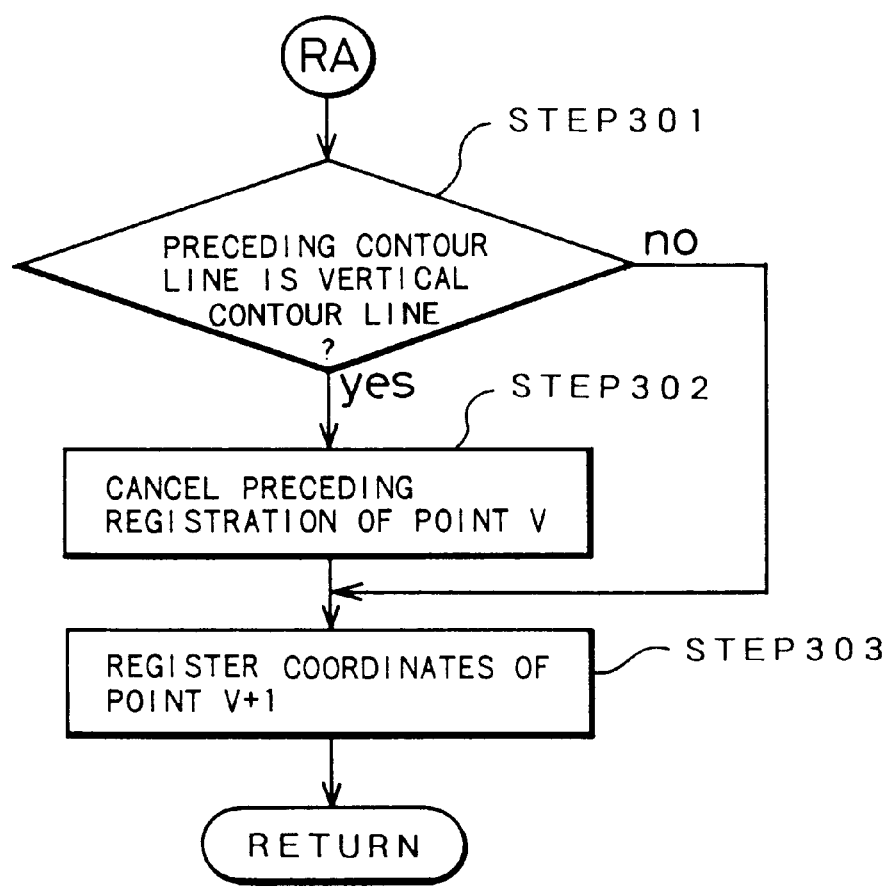
FIG. 31 is a flowchart showing details of the subroutine RA in the flowchart of FIG. 30.
Figures 32A, 32B, 32C:
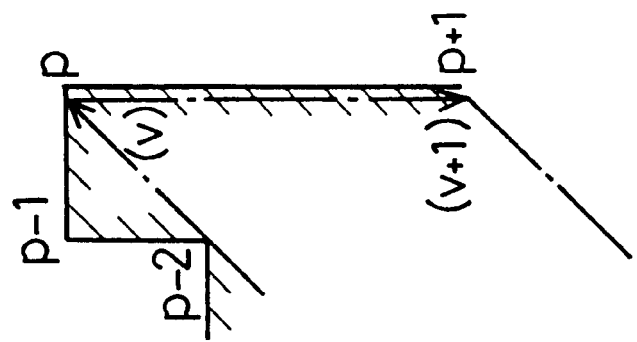
FIGS. 32(a) through 32(c) show the processing according to the subroutine RA of FIG. 31.

The detailed processes of the subroutines RA through RE are described below. FIG. 31 is a flowchart showing details of the subroutine RA in the flowchart of FIG. 30. At step 301 in the flowchart of FIG. 31, it is determined whether a preceding contour line drawn between a point 'p' registered immediately before as a component point of a boundary contour and a point 'p−1' registered before the point 'p' is a vertical contour line. The negative answer leads the program to step 303, whereas the affirmative answer allows the program to go to step 302.

Figures 38A, 38B, 38C:
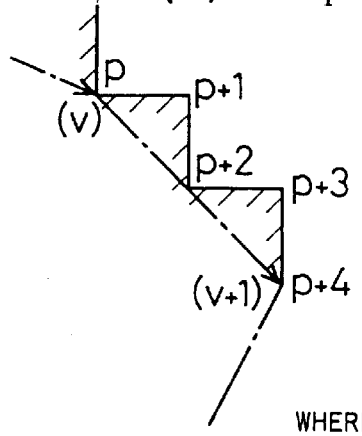
FIGS. 38(a) through 38(c) show the processing according to the subroutine RC of FIG. 35.

FIGS. 32(a) through 32(c) and 33(a) through 33(c) show the processing according to the subroutine RA of FIG. 31. More concretely, FIG. 32 shows the process when the preceding contour line is not a vertical contour line, and FIG. 33 shows the process when the preceding contour line is a vertical contour line. In these drawings, FIG. (a) shows the orthogonal process executed with respect to an outer inclined vector contour; FIG. (b) shows coordinates of vectors constituting the outer inclined vector contour of FIG. (a); and FIG. (c) shows coordinates of vectors constituting a boundary contour obtained through the orthogonal process of FIG. (a). These specifications are also applied to the subsequent drawings of FIGS. 38, 39, and 43.

When the preceding contour line is determined not to be a vertical contour line at step 301 as shown in FIG. 32, the program goes to step 303 in the flowchart of FIG. 31, at which the coordinates of the terminal point 'v+1' of the currently noted vertical vector are registered as a component point 'p+1' of vectors constituting the boundary contour.

When the preceding contour line is determined to be a vertical contour line at step 301 as shown in FIG. 33, since the preceding contour line and the newly extending contour line (that is, the currently noted vector) have the same directions, these two contour lines can be replaced by one contour line. The replacement contour line is set from the starting point 'p−1' of the preceding contour line to the terminal point 'v+1' of the newly extending contour line or currently noted vector. Under such conditions, prior registration of the coordinates of the point 'v' as a component point 'p' of vectors constituting the boundary contour is canceled at step 302 in the flowchart of FIG. 31, and the coordinates of the point 'v+1' are newly registered as the component point 'p' at step 303.

Figure 34:
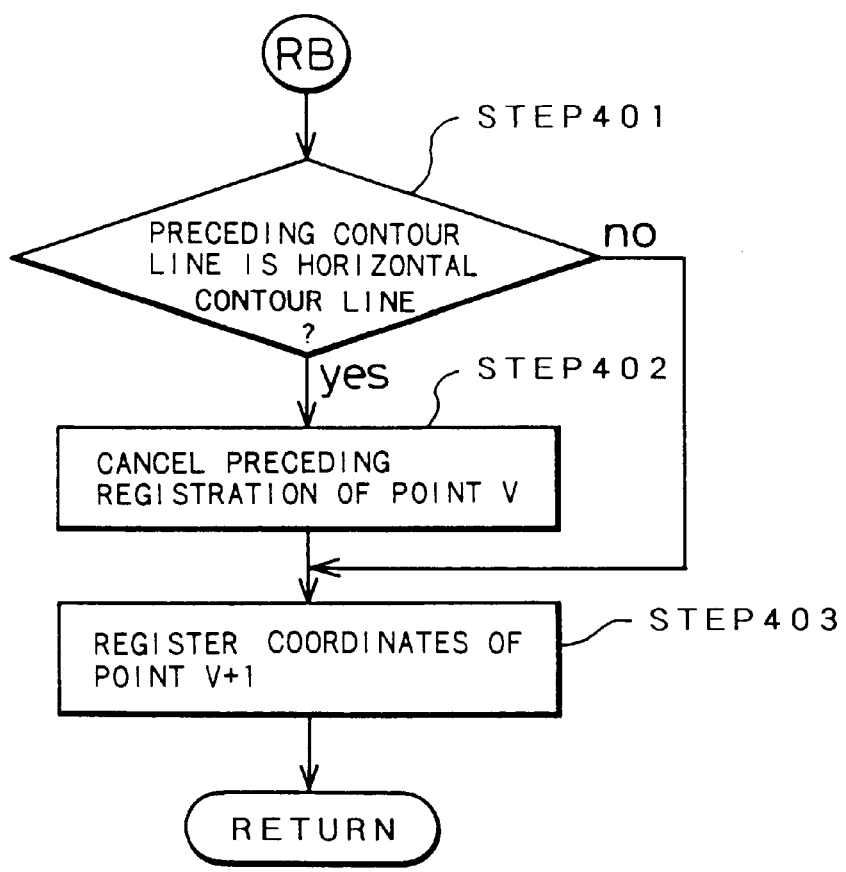
FIG. 34 is a flowchart showing details of the subroutine RB in the flowchart of FIG. 30.

FIG. 34 is a flowchart showing details of the subroutine RB in the flowchart of FIG. 30. The processing of the subroutine RB shown in FIG. 34 is similar to that of the subroutine RA shown in FIG. 31, except that the 'vertical' is replaced by the 'horizontal'.

At step 401 in the flowchart of FIG. 34, it is determined whether a preceding contour line is a horizontal contour line. The negative answer leads the program to step 403, whereas the affirmative answer allows the program to go to step 402.

When the preceding contour line is determined not to be a horizontal contour line at step 401, the coordinates of the terminal point 'v+1' of the currently noted horizontal vector are registered as a component point 'p+1' of vectors constituting the boundary contour at step 403. When the preceding contour line is determined to be a horizontal contour line at step 401, on the contrary, prior registration of the coordinates of the point 'v' as a component point 'p' of vectors constituting the boundary contour is canceled at step 402, and the coordinates of the point 'v+1' are newly registered as the component point 'p' at step 403.

Figure 35:
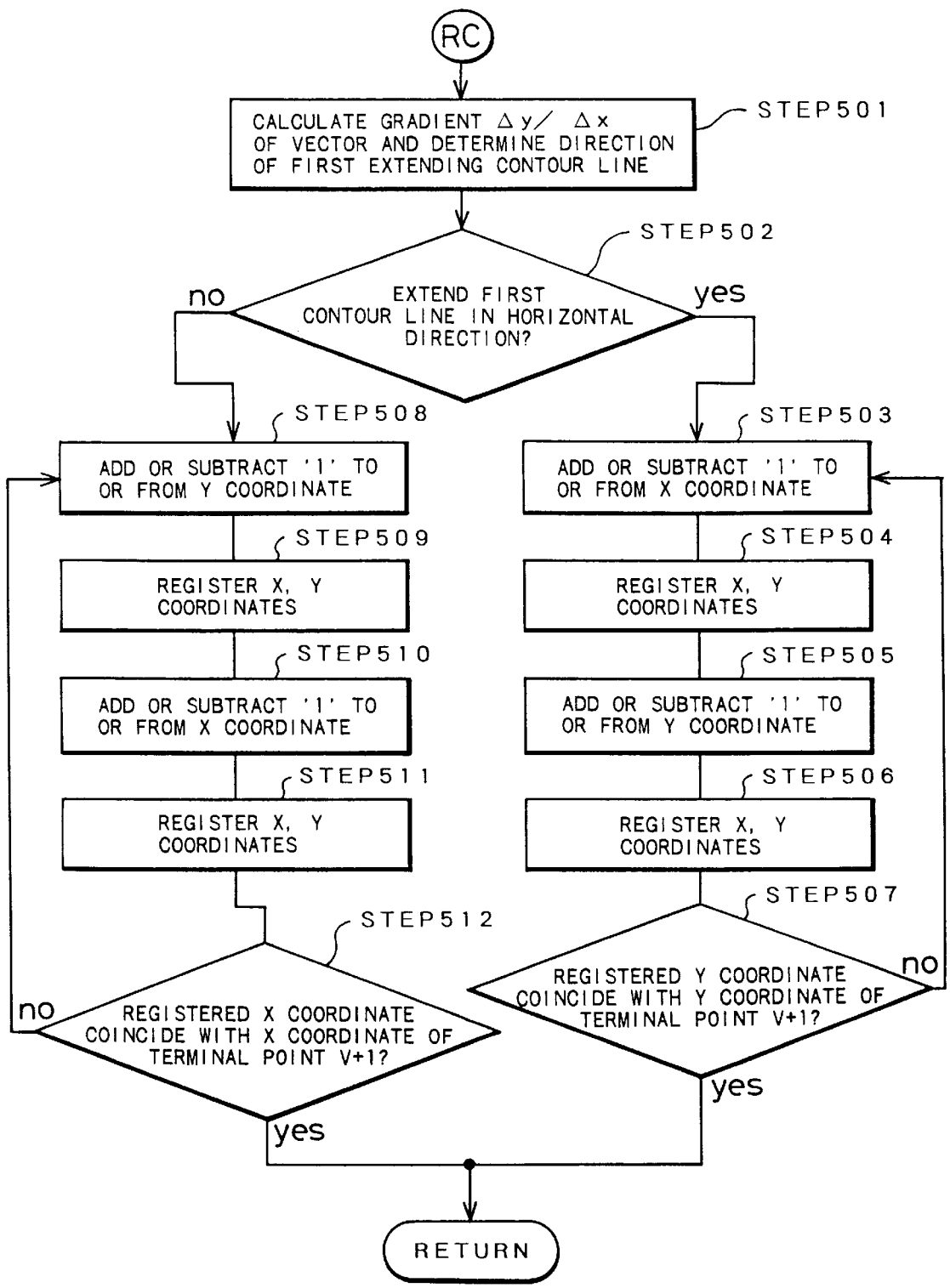
FIG. 35 is a flowchart showing details of the subroutine RC in the flowchart of FIG. 30.

FIG. 35 is a flowchart showing details of the subroutine RC in the flowchart of FIG. 30. Prior to the explanation of processing by the subroutine RC, the method of extending horizontal and vertical contour lines with respect to the currently noted, inclined vector is briefly described.

Figures 36, 37:
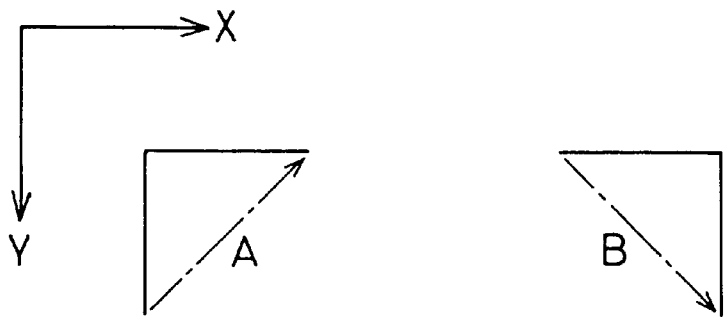
FIG. 36 shows horizontal and vertical contour lines set according to the various types of inclined vectors.
FIG. 37 shows directions of first extending contour lines according to the various types of inclined vectors.

FIG. 36 shows horizontal and vertical contour lines set according to the various types of inclined vectors. Inclined vectors shown by the one-dot chain lines in FIG. 36 are classified by direction into four types A through D.

As described previously, the orthogonal process generates horizontal and vertical contour lines to run outside the outer inclined vector contour but inside the inner inclined vector contour. Horizontal and vertical contour lines shown by the solid lines are set with respect to either the outer inclined vector contour or the inner inclined vector contour according to the four types A through D illustrated in FIG. 36.

FIG. 37 shows directions of first extending contour lines according to the various types of inclined vectors. For the above four types A through D, a gradient of inclined vector $\Delta y/\Delta x$ is calculated from the displacement $\Delta x$ of the inclined vector in the X direction and the displacement $\Delta y$ in the Y direction. This calculation gives the plus (+) sign to the types B and C and the minus (−) sign to the types A and D as clearly seen in FIG. 37.

Horizontal and vertical contour lines are drawn according to the four types A through D shown in FIG. 36. The direction of a first extending contour line is horizontal for the types B and C and vertical for the types A and D.

As shown in FIG. 37, the plus (+) gradient 66 y/$\Delta x$ of the inclined vector allows the contour line to be extended first in the horizontal direction, while the minus (−) gradient $\Delta y/\Delta x$ allows the contour line to be extended first in the vertical direction. This means the direction of the first extending contour line is determined by the sign of the gradient $\Delta y/\Delta x$ of the inclined vector.

Referring again to the flowchart of FIG. 35, the gradient $\Delta y/\Delta x$ of the currently noted inclined vector is calculated at step 501 of the subroutine RC. When the gradient $\Delta y/\Delta x$ has the plus (+) sign, the contour line is to be extended first in the horizontal direction. When the gradient $\Delta y/\Delta x$ has the minus (−) sign, on the other hand, the contour line is to be extended first in the vertical direction.

The program then proceeds to step 502, at which it is determined whether the direction of the first extending contour line is horizontal. The affirmative answer allows the program to proceed to step 503, whereas the negative answer leads the program to step 508.

FIGS. 38(a) through 38(c) and 39(a) through 39(c) show the processing according to the subroutine RC of FIG. 35. FIG. 38 shows the processing when the direction of the first extending contour line is horizontal, and FIG. 39 shows the processing when the direction of the first extending contour line is vertical.

When the direction of the first extending contour line is determined to be horizontal as shown in the example of FIG. 38, at step 503 in the flowchart of FIG. 35, the value '1' is added to or subtracted from the X coordinate $x_v$, which is a coordinate of the point 'v' registered immediately before as a component point 'p' of a boundary contour (that is, a coordinate of the starting point 'v' of the currently noted vector), according to the table of FIG. 40. This addition or subtraction process is described in detail.

FIG. 40 is a table showing rules of addition and subtraction with respect to X,Y coordinates. Inclined vectors are classified by direction into the four types A through D as shown in FIG. 36. The table of FIG. 40 instructs addition or subtraction according to the signs of the displacements $\Delta x$ and $\Delta y$ of these four types of inclined vectors.

When the displacement $\Delta x$ of the inclined vector in the X direction has the plus (+) sign, extension of a contour line in the horizontal direction results in an increase in X coordinate. When the displacement Δx in the X direction has the minus (−) sign, on the contrary, extension in the horizontal direction results in a decrease in X coordinate.

In case of extension of a contour line in the horizontal direction, a predetermined value is added to the X coordinate for the plus displacement Δx of the inclined vector in the X direction and subtracted from the X coordinate for the minus displacement Δx. This rule is also applicable to extension of a contour line in the vertical direction.

The addition or subtraction process adds the predetermined value (=1) to the X coordinate for the plus (+) displacement Δx of the inclined vector in the X direction, and subtracts the predetermined value (=1) from the X coordinate for the minus (−) displacement Δx. In a similar manner, the addition or subtraction process adds the predetermined value (=1) to the Y coordinate for the plus (+) displacement Δy of the inclined vector in the Y direction, and subtracts the predetermined value (=1) from the Y coordinate for the minus (−) displacement Δy. Namely, addition or subtraction is selected according to the types of inclined vectors as shown in the table of FIG. 40.

In the example of FIG. 38, the inclined vector belongs to the type B, and the table of FIG. 40 instructs addition of the predetermined value to both the X and Y coordinates. At step 503 in the flowchart of FIG. 35, the value '1' is added to the X coordinate $x_v$ of the point 'v', so that the new X coordinate becomes equal to $x_v+1$.

At subsequent step 504, the X, Y coordinates obtained by adding the value '1' to the X coordinate of the point 'v' are registered as a point 'p+1'.

The program then goes to step 505, at which the value '1' is added to or subtracted from the Y coordinate $y_v$, previously registered as the point 'p+1', according to the table of FIG. 40. Since the inclined vector belongs to the type B in the example of FIG. 38, the value '1' is added to the Y coordinate $y_v$, so that the new Y coordinate becomes equal to $y_v+1$.

At subsequent step 506, the X, Y coordinates obtained by adding the value '1' to the Y coordinate of the point 'p+1' are registered as a point 'p+2'.

The program proceeds to step 507, at which it is determined whether the Y coordinate $y_v+1$ previously registered as the point 'p+2' coincides with the Y coordinate $y_{v+1}$ of the terminal point 'v+1' of the inclined vector. The affirmative answer (coincident) allows the program to exit from the subroutine RC, whereas the negative answer (not coincident) returns the program to step 503 in the flowchart of FIG. 35. In the example of FIG. 38, the Y coordinate $y_v+1$ of the point 'p+2' does not coincide with the Y coordinate $y_{v+1}$ of the point 'v+1', and the program returns to step 503.

At step 503, the value '1' is added again to the X coordinate $x_v+1$ previously registered as the point 'p+2', so that the new X coordinate becomes equal to $x_v+2$, which is registered as a point 'p+3' at step 504.

The program then goes to step 505, at which the value '1' is added again to the Y coordinate $y_v+1$ previously registered as the point 'p+3', so that the new Y coordinate becomes equal to $y_v+2$, which is registered as a point 'p+4' at step 506.

At step 507, it is determined again whether the Y coordinate $y_v+2$ previously registered as the point 'p+4' coincides with the Y coordinate $y_{v+1}$ of the terminal point 'v+1' of the inclined vector. In the example of FIG. 38, the Y coordinate $y_v+2$ of the point 'p+4' coincides with the Y coordinate $Y_{v+1}$ of the point 'v+1', and the program exits from the subroutine RC.

When the direction of the first extending contour line is determined not to be horizontal at step 502 as shown in the example of FIG. 39, the program proceeds to step 508 in the flowchart of FIG. 35, at which the value '1' is added to or subtracted from the Y coordinate $y_v$, which is a coordinate of the point 'v' registered immediately before as a component point 'p' of a boundary contour, according to the table of FIG. 40. In the example of FIG. 39, the inclined vector belongs to the type A, and the table of FIG. 40 instructs addition of the predetermined value to the X coordinate and subtraction of the predetermined value from the Y coordinate. At step 508, the value '1' is subtracted from the Y coordinate $y_v$ of the point 'v', so that the new Y coordinate becomes equal to $y_v−1$.

The processing at subsequent steps 509 through 512 is similar to that of steps 504 through 507, except that the X coordinate and Y coordinate are exchanged, and explanation is accordingly omitted here.

Figure 41:
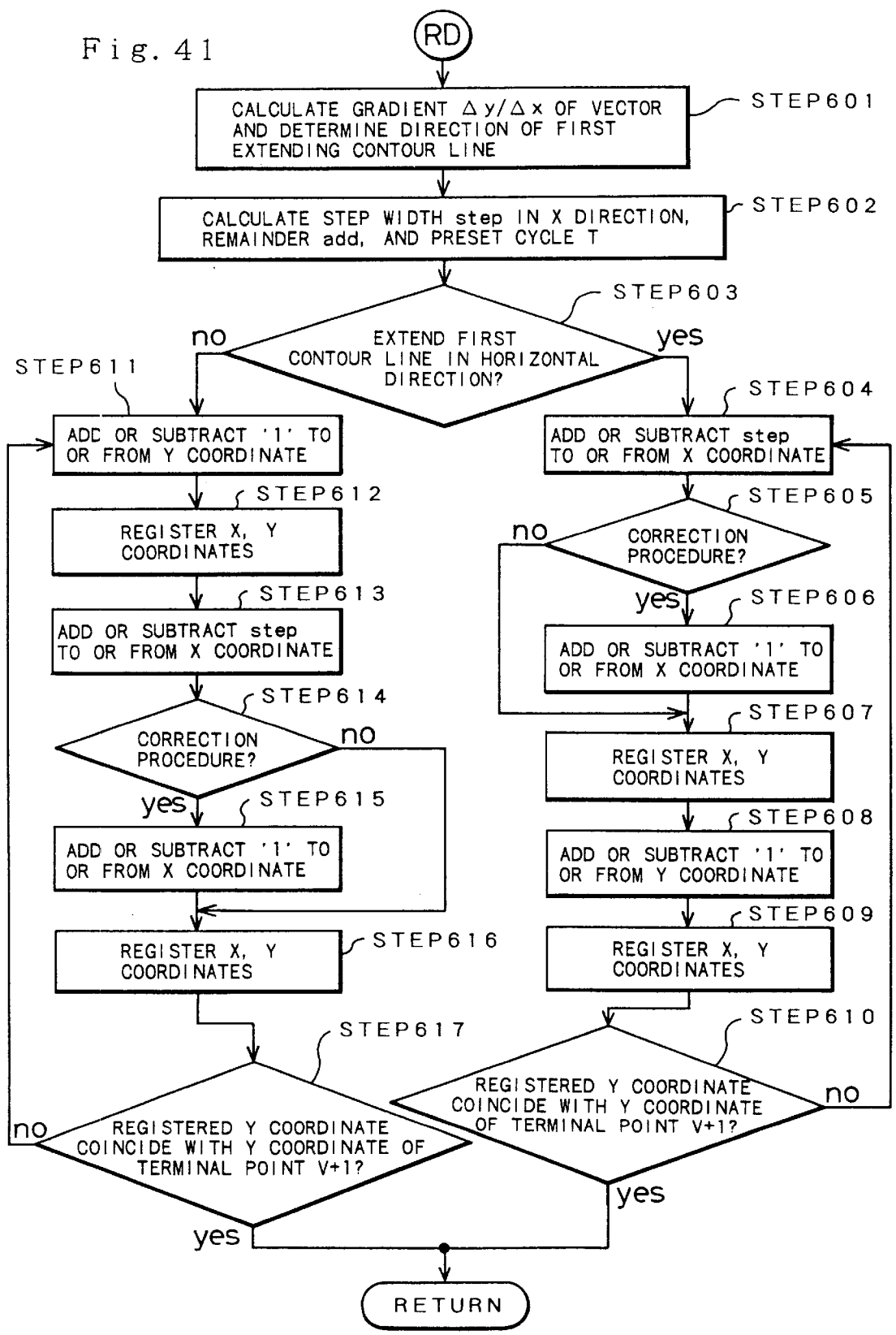
FIG. 41 is a flowchart showing details of the subroutine RD in the flowchart of FIG. 30.

FIG. 41 is a flowchart showing details of the subroutine RD in the flowchart of FIG. 30. At step 601 of the subroutine RD in FIG. 41, the gradient Δy/Δx of the currently noted inclined vector is calculated in the same manner as the subroutine RC shown in FIG. 35. When the gradient Δy/Δx has the plus (+) sign, the contour line is to be extended first in the horizontal direction. When the gradient Δy/Δx has the minus (−) sign, on the other hand, the contour line is to be extended first in the vertical direction.

After determining the direction of the first extending contour line, the program goes to step 602. Since the absolute value of the displacement of the inclined vector in the X direction |Δx| is greater than the absolute value of the displacement in the Y direction |Δy| (|Δx|>|Δy|) in the subroutine RD, the horizontal contour line is extended by a predetermined value of not less than '1', while the vertical contour line is extended by the value '1'. The predetermined value is hereinafter referred to as the step width 'step'. A way of determining the value will be described later in detail.

Figure 42A:
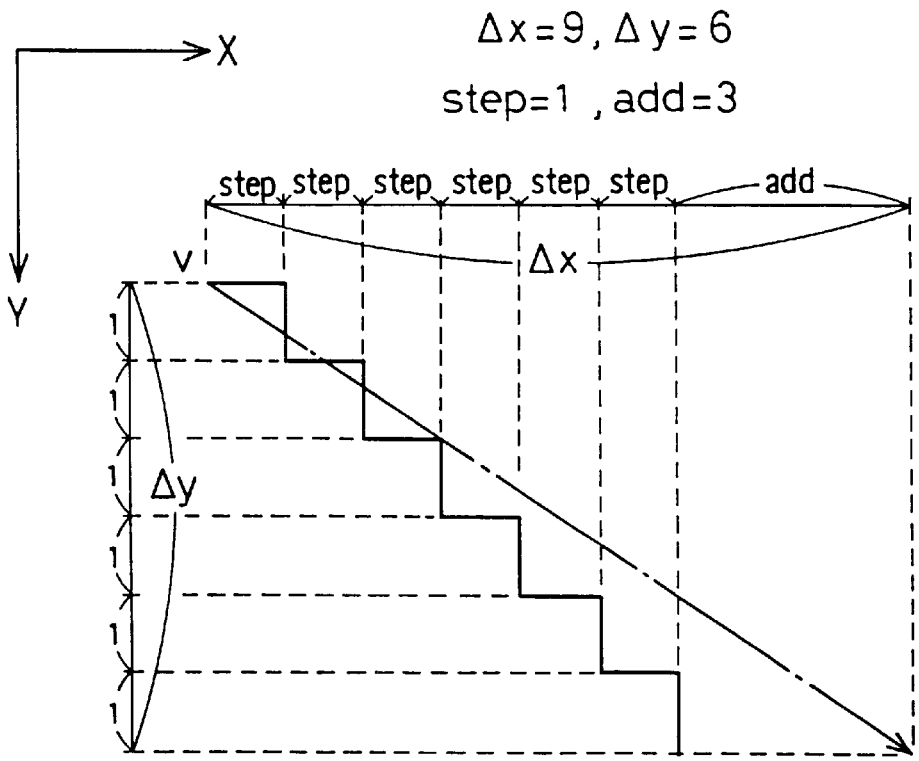
FIGS. 42(a) and 42(b) show extension of horizontal and vertical contour lines.
Figure 42B:
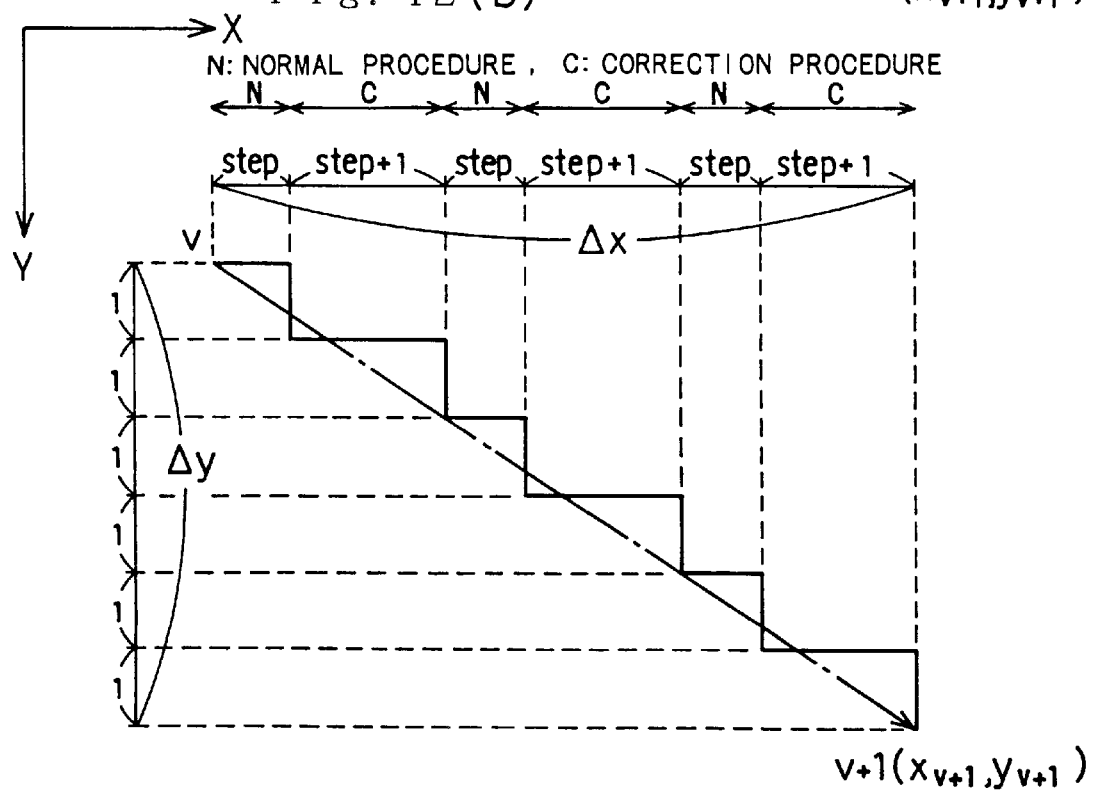

FIGS. 42(a) and 42(b) show extension of horizontal and vertical contour lines. In the drawing of FIG. 42, Δx=9, Δy=6, and step=1.

As shown in FIG. 42(a), the contour line is extended in the vertical direction by one and in the horizontal direction by the step width 'step' from the starting point 'v' of the inclined vector (shown by the one-dot chain line) to the terminal point 'v+1'. The horizontal contour line may not reach the position of the X coordinate $x_{v+1}$ of the terminal point 'v+1', when the vertical contour line reaches the position of the Y coordinate $y_{v+1}$ of the terminal point 'v+1'. In some cases, the horizontal contour line does not reach the position of the X coordinate $x_{v+1}$ of the terminal point 'v+1' but is apart from the X coordinate $x_{v+1}$ by a certain remainder 'add'. In the example of FIG. 42(a), 'add' is equal to 3.

The embodiment corrects the step width 'step', by which the horizontal contour line is extended every time, so that the horizontal contour line always reaches the position of the X coordinate $x_{v+1}$ of the terminal point 'v+1', when the vertical contour line reaches the position of the Y coordinate $Y_{v+1}$ of the terminal point 'v+1'. As shown in FIG. 42(b), the step width 'step' is corrected at every preset cycle T (=2 in the example of FIG. 42(b)). The horizontal contour line is accordingly extended by the step width 'step' during the normal procedure and by the step width 'step' +1 during the correction procedure, so that the remainder 'add' is evenly distributed.

At step 602 in the flowchart of FIG. 41, the step width 'step' is first calculated from the displacements Δx and Δy of the inclined vector according to Equation (4) given below:

$$\text{step}=\text{int}(|\Delta x|/|\Delta y|) \qquad (4)$$

where the function int() gives an integer part of the numeral in parentheses.

The remainder 'add' is then calculated from the displacements Δx and Δy of the inclined vector and the step width 'step' according to Equation (5) given below:

$$\text{add}=|\Delta x|-\text{step}\times|\Delta y| \qquad (5)$$

The remainder 'add' is evenly distributed by extending the horizontal contour line by the width 'step+1' during the correction procedure as described previously, and thus depends upon the number of corrections. The remainder 'add' is then set in a correction time counter (not shown).

The preset cycle T is further determined from the displacement Δy of the inclined vector in the Y direction and the remainder 'add' according to Equation (6) given below:

$$T=|\Delta y|/\text{add} \qquad (6)$$

The preset cycle T is then set in a correction timing counter (not shown).

The program subsequently proceeds to step 603 in the flowchart of FIG. 41, at which it is determined whether the contour line is to be extended first in the horizontal direction, that is, X direction. The affirmative answer (horizontal direction) allows the program to proceed to step 604, whereas the negative answer (not horizontal) leads the program to step 611.

Figures 43A, 43B, 43C:
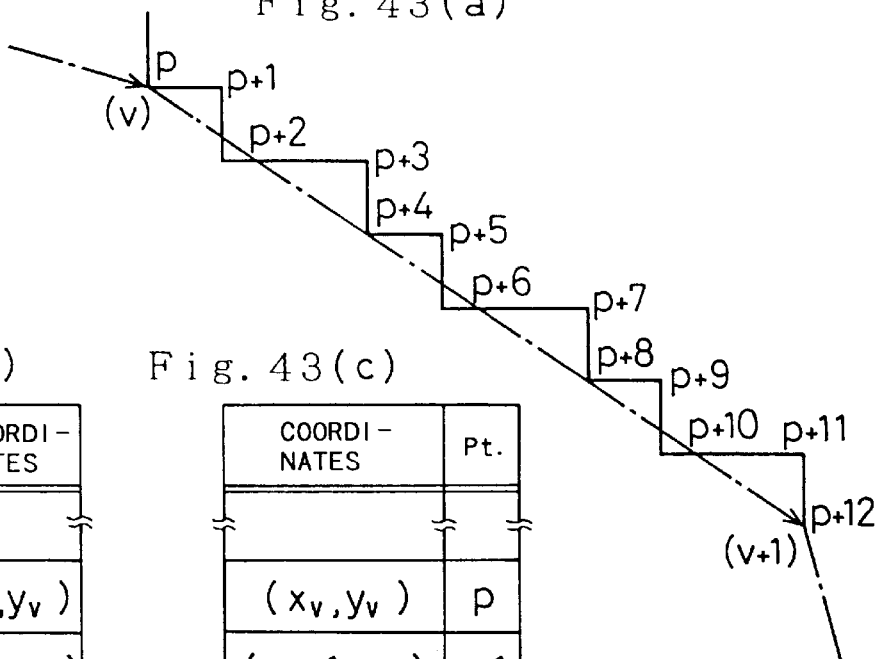
FIGS. 43(a) through 43(c) show the processing according to the subroutine RD of FIG. 41.

FIGS. 43(*a*) through 43(*c*) show the processing according to the subroutine RD of FIG. 41, where the direction of the first extending contour line is horizontal.

When the direction of the first extending contour line is determined to be horizontal at step 603 as shown in the example of FIG. 43, at step 604 in the flowchart of FIG. 41, the step width 'step' is added to or subtracted from the X coordinate $x_v$, which is a coordinate of the point 'v' registered immediately before as a component point 'p' of a boundary contour (that is, a coordinate of the starting point 'v' of the currently noted vector), according to the table of FIG. 40. In the example of FIG. 43, the inclined vector belongs to the type B of FIG. 36, and the table of FIG. 40 instructs addition to both the X and Y coordinates. At step 604, the step width 'step'=1 is added to the X coordinate $x_v$ of the point 'v', so that the new X coordinate becomes equal to $x_v+1$, while the value in the correction timing counter is decreased by one.

At step 605, it is determined whether the correction procedure should be applied this time. The affirmative answer (correction procedure) leads the program to step 606, whereas the negative answer (normal procedure) allows the program to go to step 607. The determination of correction procedure is based on the values in the correction time counter and the correction timing counter.

The correction procedure is selected when the value in the correction time counter is other than zero and the value in the correction timing counter is equal to zero. The normal procedure is selected, on the other hand, when the value in the correction time counter is equal to zero or the value in the correction timing counter is other than zero. In the example of FIG. 43, since the remainder 'add'=3 and the preset cycle T=2, the value '3' is set in the correction time counter and the value '2' is set in the correction timing counter at step 602. The value in the correction timing counter is decreased by one at subsequent step 604. At the time of decision at step 605, the value in the correction timing counter is equal to 1 while the value in the correction time counter is kept 3. The program accordingly selects the normal procedure and proceeds to step 607.

The X, Y coordinates obtained by adding the value '1' to the X coordinate of the point 'v' are registered as a point 'p+1' at step 607.

The program then goes to step 608, at which the value '1' is added to or subtracted from the Y coordinate $y_v$ previously registered as the point 'p+1', according to the table of FIG. 40. Since the inclined vector belongs to the type B as described above, the value '1' is added to the Y coordinate $y_v$, so that the new Y coordinate becomes equal to $y_v+1$.

At subsequent step 609, the X, Y coordinates obtained by adding the value '1' to the Y coordinate of the point 'p+1' are registered as a point 'p+2'.

The program proceeds to step 610, at which it is determined whether the Y coordinate $y_v+1$ previously registered as the point 'p+2' coincides with the Y coordinate $y_{v+1}$ of the terminal point 'v+1' of the inclined vector. The affirmative answer (coincident) allows the program to exit from the subroutine RD, whereas the negative answer (not coincident) returns the program to step 604 in the flowchart of FIG. 41. In the example of FIG. 43, the Y coordinate $y_v+1$ of the point 'p+2' does not coincide with the Y coordinate $y_{v+1}$ of the point 'v+1', and the program returns to step 604.

At step 604, the step width 'step'=1 is added again to the X coordinate $x_v+1$ previously registered as the point 'p+2', so that the new X coordinate becomes equal to $x_v+2$, while the value in the correction timing counter is further decreased by one.

At step 605, it is determined again whether the correction procedure should be applied this time, based on the values in the correction time counter and the correction timing counter. In the example of FIG. 43, the value in the correction timing counter is further decreased by one at step 604. At this time of decision at step 605, the value in the correction timing counter is thus equal to zero while the value in the correction time counter is kept 3. The program accordingly selects the correction procedure and proceeds to step 606.

At step 606, the value '1' is added to or subtracted from the X coordinate $x_v+2$, which is obtained through the addition of the step width 'step' at step 604, according to the table of FIG. 40. In this example, the value '1' is added to the X coordinate. The total 'step'+1(=2) is thus added at steps 604 and 606 to the X coordinate $x_v+1$ previously registered as the point 'p+2', so that the new X coordinate becomes equal to $x_v+3$.

At step 606, the value in the correction time counter is decreased by one, and the correction timing counter is reset to the preset cycle T.

The X, Y coordinates obtained by adding the value '2' to the X coordinate of the point 'p+2' are registered as a point 'p+3' at step 607.

At step 608, the value '1' is added to the Y coordinate $y_v+1$ previously registered as the point 'p+3', so that the new Y coordinate becomes equal to $y_v+2$.

At subsequent step 609, the X, Y coordinates obtained by adding the value '1' to the Y coordinate of the point 'p+3' are registered as a point 'p+4'.

Registration of new coordinates is repeated in the same manner as above. In the example of FIG. 43, the value in the correction time counter becomes equal to zero at step 606 in the sixth cycle of this routine, and the program proceeds via steps 607 and 608 to step 609, at which the coordinates ($x_v+9$, $y_v+6$) are registered as a point 'p+12'. At step 610, it is determined whether the Y coordinate $y_v+6$ previously registered as the point 'p+12' coincides with the Y coordinate $y_{v+1}$ of the terminal point 'v+1' of the inclined vector. The Y coordinate $y_v+6$ of the point 'p+12' coincides with the Y coordinate $y_{v+1}$ of the terminal point 'v+1' in this example, and the program exits from the subroutine RD.

When the direction of the first extending contour line is determined not to be horizontal at step 603, the program proceeds to step 611 in the flowchart of FIG. 41, at which the value '1' is added to or subtracted from the Y coordinate $y_v$, which is a coordinate of the point 'v' registered immediately before as a component point 'p' of a boundary contour, according to the table of FIG. 40.

The processing at subsequent steps 612 through 617 is identical with that of steps 604 through 607, 609, and 610, and explanation is thereby omitted here.

Figure 44:
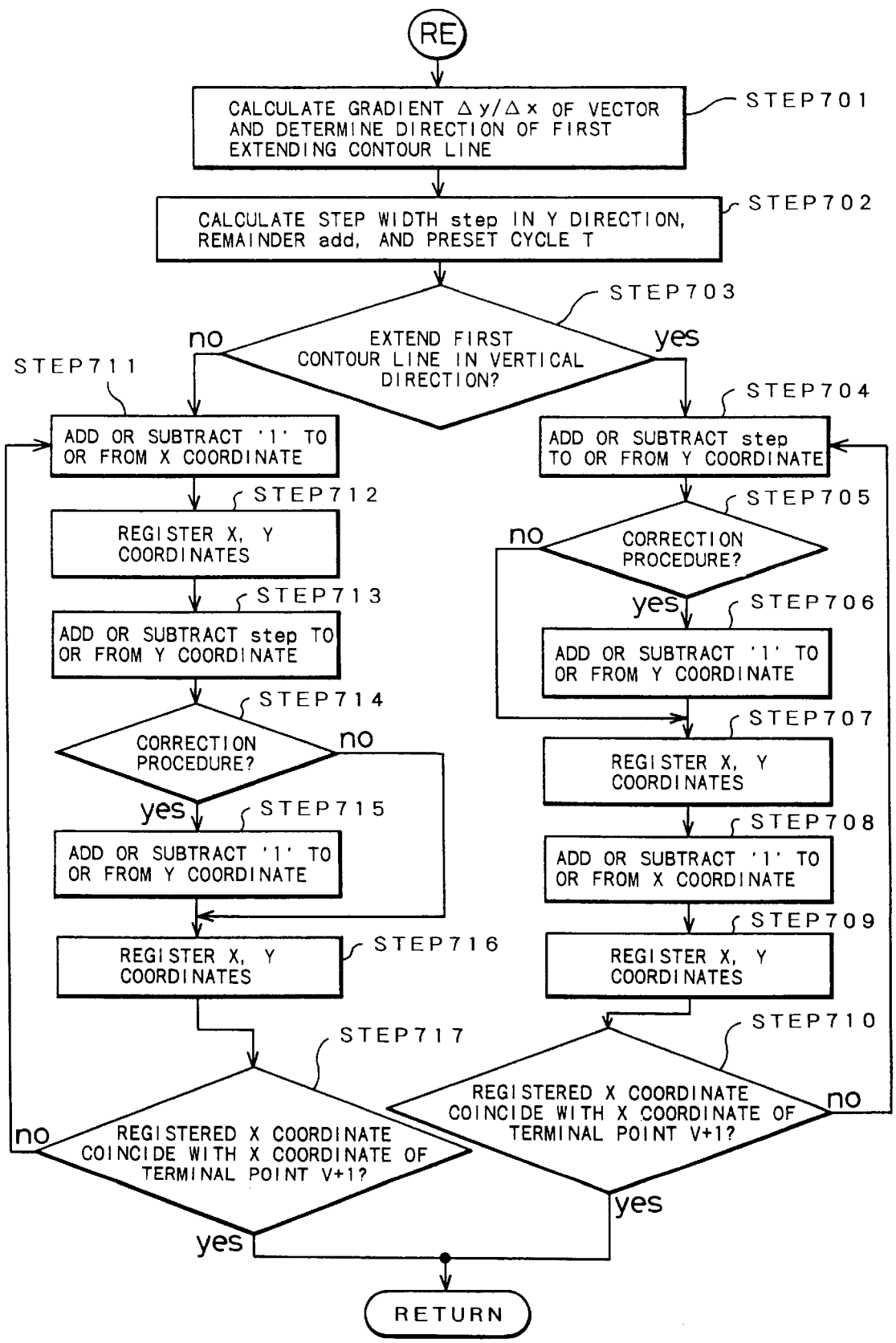
FIG. 44 is a flowchart showing details of the subroutine RE in the flowchart of FIG. 30.

FIG. 44 is a flowchart showing details of the subroutine RE in the flowchart of FIG. 30. The processing of the subroutine RE shown in FIG. 44 is similar to that of the subroutine RD shown in FIG. 41, except that 'horizontal' is replaced by 'vertical' and that the X coordinate and Y coordinate are exchanged, and explanation is accordingly omitted here.

Figure 49:
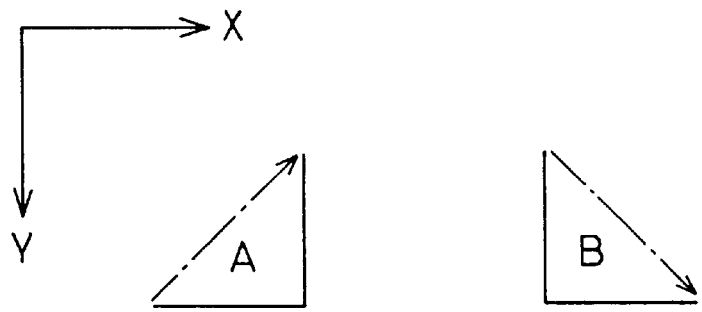
FIG. 49 shows horizontal and vertical contour lines set according to the various types of inclined vectors.
Figure 50:
FIG. 50 shows directions of first extending contour lines according to the various types of inclined vectors.

In the first embodiment described above, the inclined vector process generates inclined vectors to run inside the outer boundary contour but outside the inner boundary contour, whereas the orthogonal process generates horizontal and vertical contour lines to run outside the outer inclined vector contour but inside the inner inclined vector contour. These rules can be inverted; that is, the inclined vector process generates inclined vectors to run outside the outer boundary contour but inside the inner boundary contour, whereas the orthogonal process generates horizontal and vertical contour lines to run inside the outer inclined vector contour but outside the inner inclined vector contour. Only simple modification of the first embodiment is required to realize the alternative rules. In the inclined vector process, 'S>0' of the condition (1) is replaced by 'S<0'. In the orthogonal process, the criteria for determining the direction of the first extending contour line are changed from the contents of FIGS. 36 and 37 to those of FIGS. 49 and 50. The processing of the first embodiment is applicable otherwise.

II. Second Embodiment

A. Outline of Image Processing

Figure 45:
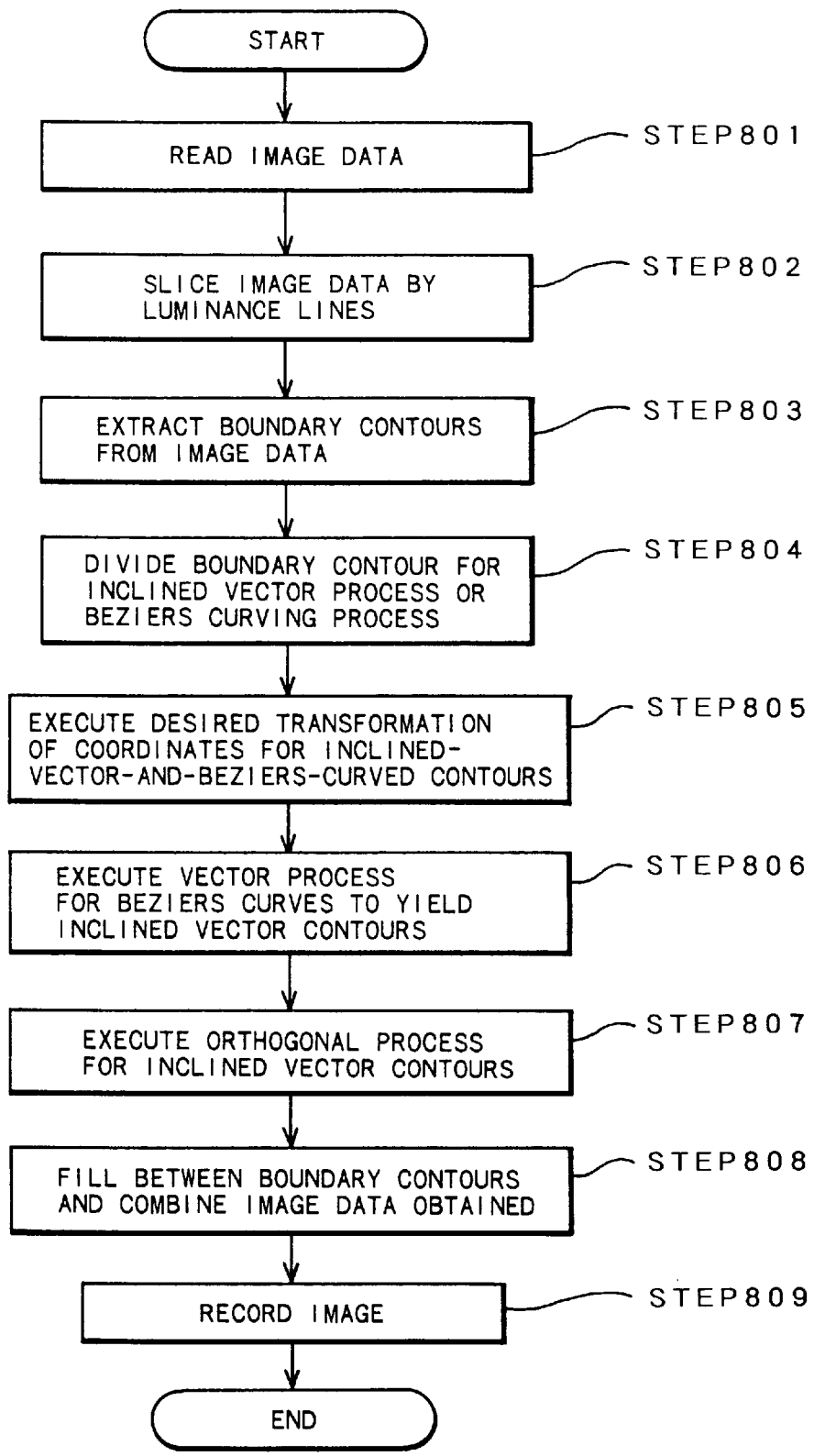
FIG. 45 is a flowchart showing an image processing routine executed in a second embodiment according to the present invention.
Figure 46:
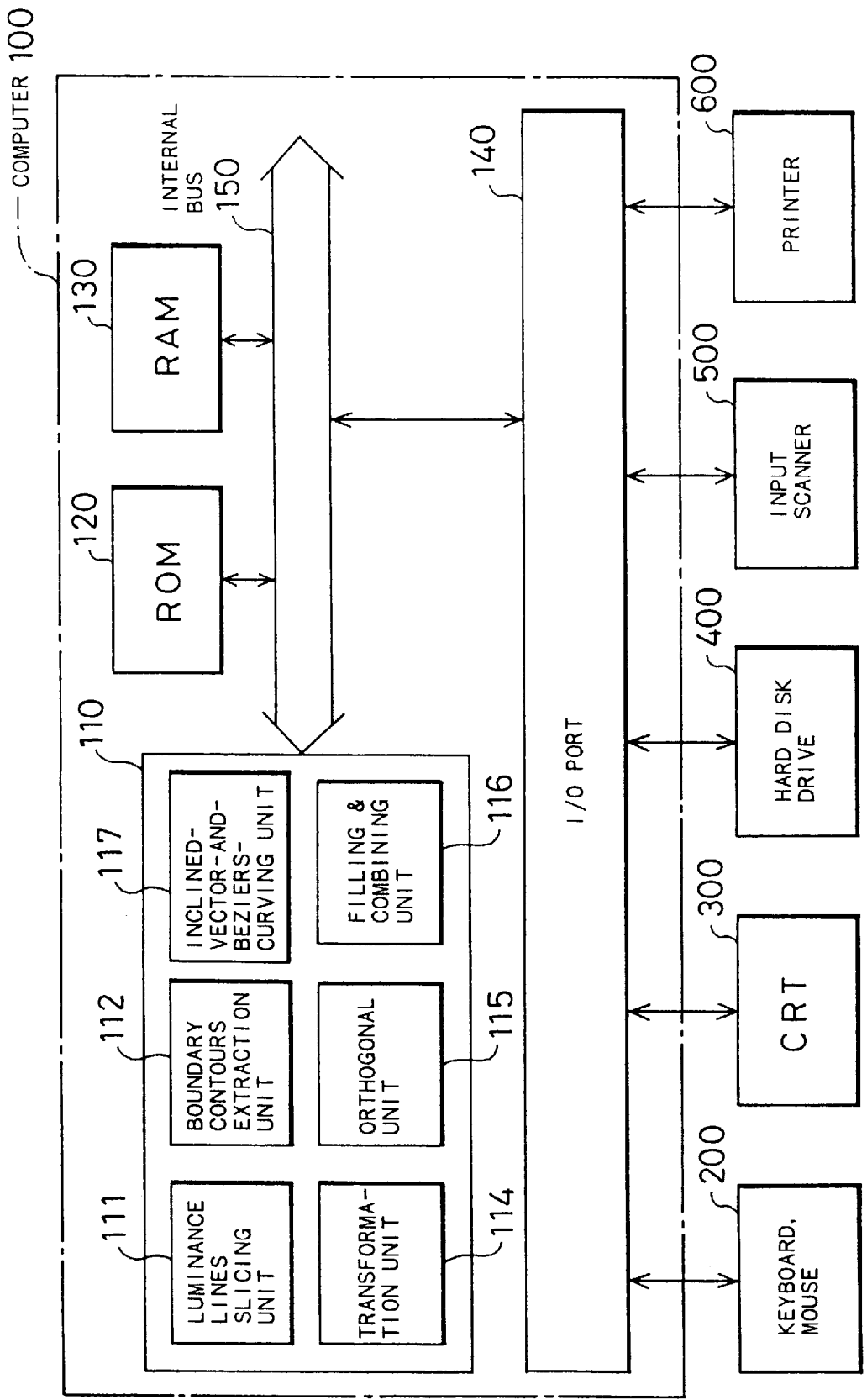
FIG. 46 is a block diagram illustrating an image processing system applied for realizing the image processing routine shown in FIG. 45.

FIG. 45 is a flowchart showing an image processing routine executed in a second embodiment according to the present invention, and FIG. 46 is a block diagram illustrating an image processing system applied for realizing the image processing routine shown in FIG. 45.

The image processing system shown in FIG. 46 has similar structure to that of the image processing system shown in FIG. 2, except that the CPU 110 has a function of an inclined-vector-and-Beziers-curving unit 117 instead of the inclined vector unit 113.

Outline of the image processing executed in the second embodiment is described according to the flowchart of FIG. 45. The processing at steps 801 through 803 in the flowchart of FIG. 45 is identical with that of steps 1 through 3 in the flowchart of FIG. 1, and the processing at steps 807 through 809 is identical with that of steps 6 through 8, and explanation is thereby omitted here.

At step 804 in the flowchart of FIG. 45, the inclined-vector-and-Beziers-curving unit 117 of the CPU 110 divides a boundary contour extracted at step 803 into a straight line portion and a curved portion, and carries out an inclined vector process for the straight line portion and a Beziers curving process for the curved portion. Contour lines obtained as a result of the inclined vector process and the Beziers curving process are hereinafter referred to as inclined-vector-and-Beziers-curved contours.

The inclined-vector-and-Beziers-curving unit 117 first divides the extracted boundary contour into a straight line portion, which can be macroscopically regarded as straight lines, and a remaining curved portion, which can be macroscopically regarded as curves. This divides vectors constituting the boundary contour into segments of the straight line portion and those of the curved portion.

The inclined-vector-and-Beziers-curving unit 117 then replaces specific corners of the straight line portion obtained through the division with inclined vectors in the same manner as the first embodiment, while approximating the remaining curved portion by Beziers curves expressed with a plurality of control points. The Beziers curving process replaces the segments of the curved portion with the control points for defining the Beziers curves. The details of step 804 will be described later.

At step 805 in the flowchart of FIG. 45, the transformation unit 114 of the CPU 110 executes a desirable transformation of coordinates (for example, affine transformation) to expand, contract, or rotate the inclined-vector-and-Beziers-curved contour obtained through the inclined vector process and the Beziers curving process. In the expanding transformation, for example, coordinates of all the vectors and control points constituting the inclined-vector-and-Beziers-curved contour are multiplied by a desired magnification. In other transformations, coordinates are transformed for all the vectors and control points constituting the inclined-vector-and-Beziers-curved contour.

The program subsequently proceeds to step 806, at which the inclined-vector-and-Beziers-curving unit 117 of the CPU 110 executes a vector process for the Beziers curves of the inclined-vector-and-Beziers-curved contour undergoing the desirable transformation of coordinates, so as to give an inclined vector contour.

According to a concrete procedure, while leaving intact the vectors or the straight line portion, which has undergone the inclined vector process prior to the transformation of coordinates, the inclined-vector-and-Beziers-curving unit 117 replaces the Beziers curves or the curved portion, which has undergone the Beziers curving process prior to the transformation of coordinates, with vectors in order to yield an inclined vector contour. The method applicable for such replacement of the Beziers curves with vectors is, for example, disclosed in U.S. Pat. No. 5,214,754, which is incorporated herein by reference for all purposes.

The subsequent processing is equivalent to that of steps 6 through 8 in the flowchart of FIG. 1 as described previously.

As described above, the system of the second embodiment divides a boundary contour into a straight line portion and a curved portion and carries out the inclined vector process for the straight line portion and the Beziers curving process for the curved portion, prior to the image processing, such as expansion, contraction, or rotation. This allows a processed image to be defined by vectors and Beziers curves. The image composed of such vectors and Beziers curves is then processed through the transformation of coordinates. The system of the embodiment accordingly allows the resolution of an image after transformation of coordinates to be independent of the resolution of an input device, that is, the input scanner 500. This effectively prevents the processed image from being undesirably out-of-focus and reduces the occurrence of jaggy portions in curved or inclined straight lines of the obtained image, thereby protecting the image from deterioration. The curved portion undergoing the Beziers curving process includes a less number of coordinates than that of the straight line portion undergoing the inclined vector process. This results in effective data compression and maintains the smooth contour even if the image is expanded by a high magnification.

B. Details of Processing at Step 804 in Flowchart of FIG. 45

Figure 47:
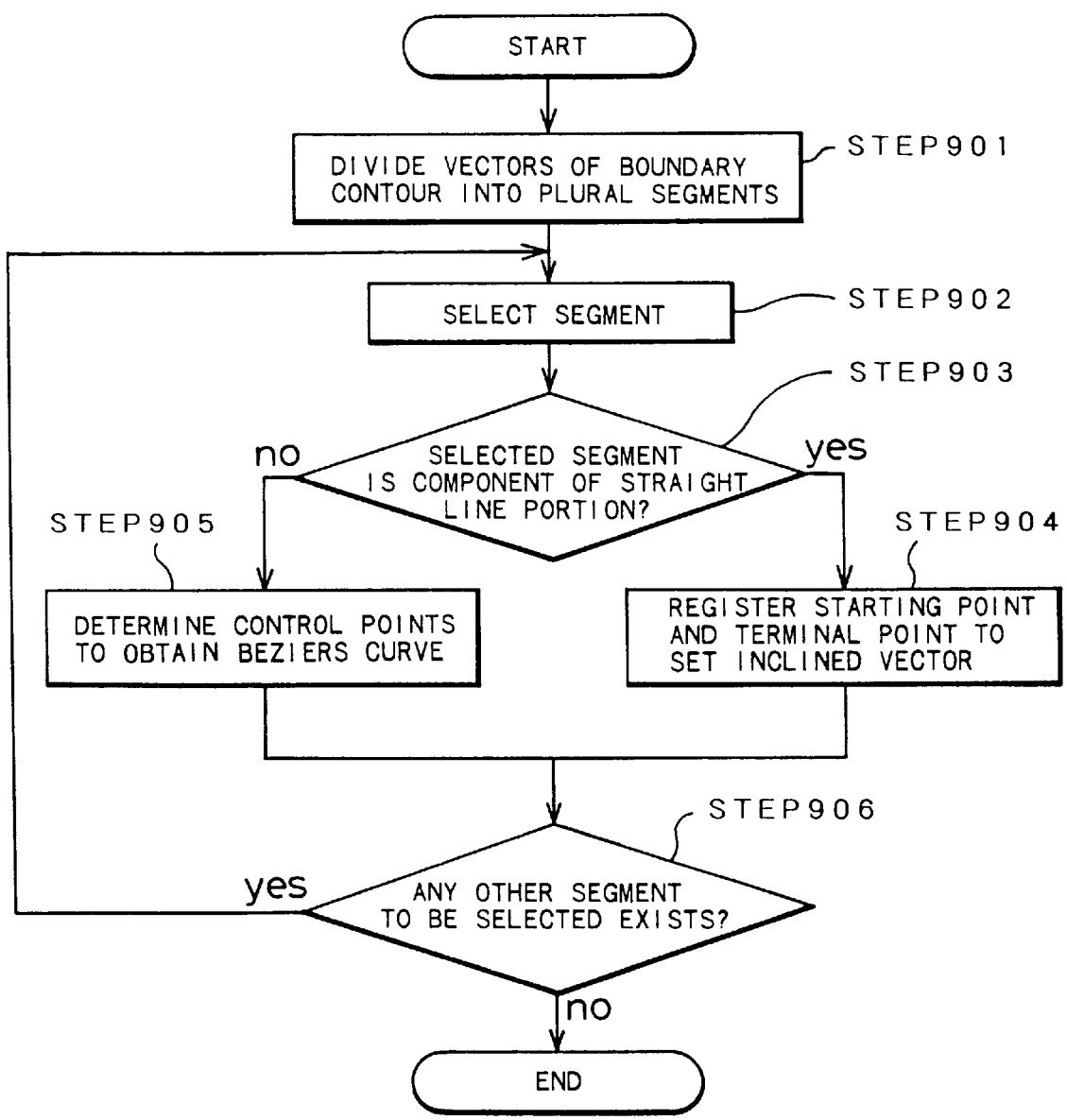
FIG. 47 is a flowchart showing details of step 804 in the flowchart of FIG. 45.
Figure 48:
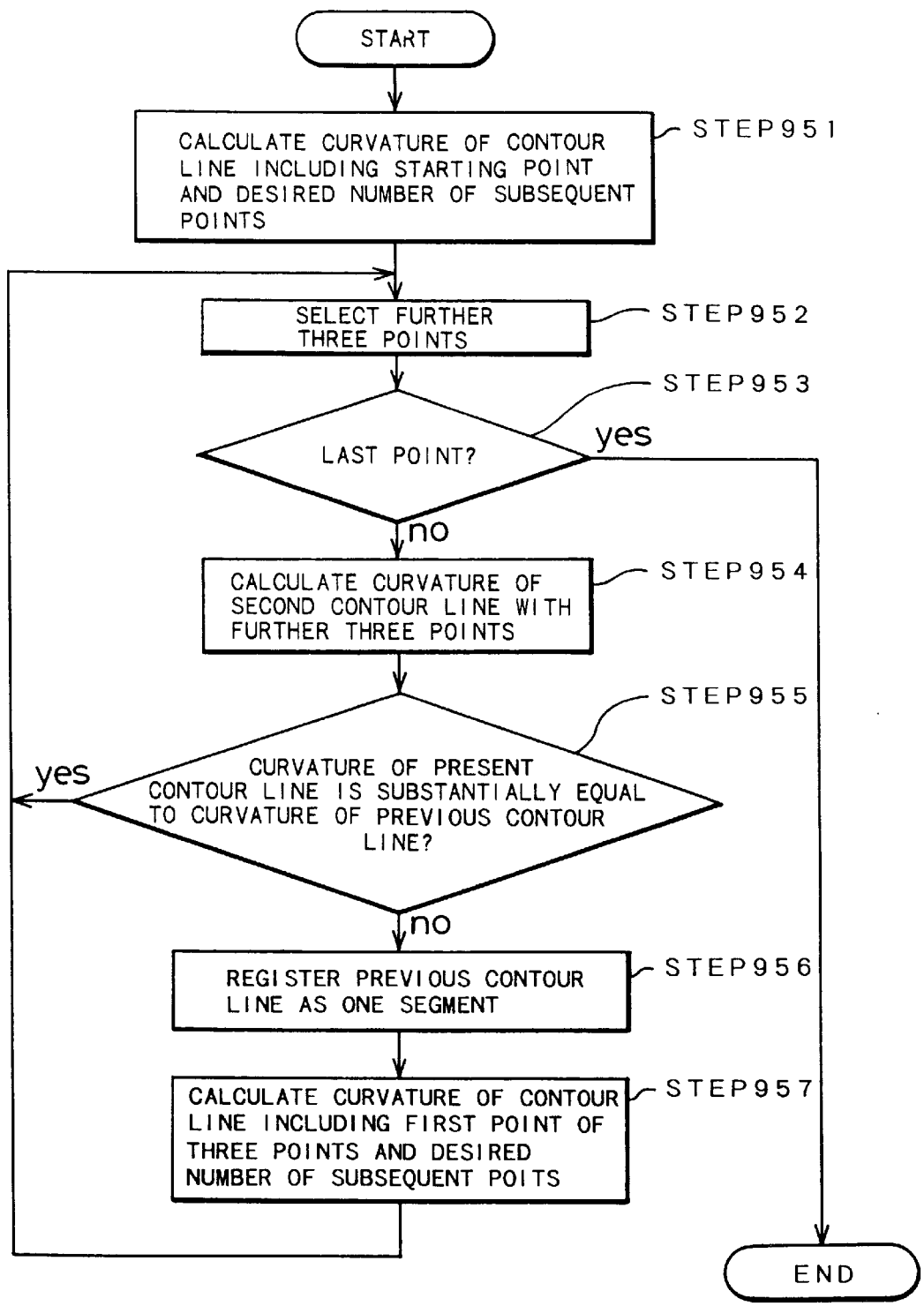
FIG. 48 is a flowchart showing details of step 901 in the flowchart of FIG. 47.

FIG. 47 is a flowchart showing details of step 804 in the flowchart of FIG. 45. At step 901 in the flowchart of FIG. 47, vectors constituting a boundary contour are divided into a plurality of segments according to curvature. FIG. 48 is a flowchart showing details of the processing executed at step 901.

At step 951 in the flowchart of FIG. 48, a starting point (that is, the first point of vectors constituting the boundary contour) and a desired number of subsequent points are selected among the vectors constituting the boundary contour, and a curvature of a first contour line defined by these selected points is calculated. The method applicable to calculate the curvature of a curve defined by discrete points, such as a boundary contour is, for example, described under the title of 'Calculation of Curvature of Curve Defined by Discrete Points' in the Technical Report of Electronic Information and Communications Society (a Japanese society), IE93-74 (1993-11).

At step 952, a further three points, which are after the points selected at step 951, are selected. The program then proceeds to step 953, at which it is determined whether any one of the three points coincides with a terminal point or a last point of vectors constituting the boundary contour. The affirmative answer (coincident) concludes all the processing of FIG. 48, whereas the negative answer (not coincident) leads the program to step 954.

At step 954, a second contour line is generated by adding the further three points to the first contour line, and a curvature of the second contour line is calculated. Three points are noted here since an arbitrary array of continuous three points among vectors constituting the boundary contour construct at least one set of horizontal contour line and vertical contour line.

The program then proceeds to step 955, at which the curvature of the second contour line (the present contour line) with the further three points is compared with that of the first contour line (the previous contour line). When both the curvatures are substantially equal to each other, the program returns to step 952. When the curvatures are substantially not equal to each other, on the contrary, the program goes to step 956.

After the first contour line is registered as one segment at step 956, a curvature of a third contour line defined by the first point of the three points selected at step 952 and a desired number of subsequent points is calculated at step 957. The program then returns to step 952.

The processing of steps 952 through 957 is repeated so as to divide vectors constituting the boundary contour into a plurality of segments.

Referring again to the flowchart of FIG. 47, the program goes to step 902, at which one segment is selected among the plurality of segments obtained by the division at step 901.

At subsequent step 903, it is determined whether the selected segment is a component of the straight line portion. When the selected segment is determined to be a part of the straight line portion (affirmative answer), the program proceeds to step 904. When the selected segment is determined to be a part of the curved portion (negative answer), on the contrary, the program proceeds to step 905.

The determination whether the selected segment is a component of the straight line portion or the curved portion is based on the curvature of the selected segment. When the curvature is substantially equal to zero, the selected segment is determined to be a part of the straight line portion. Otherwise, the selected segment is determined to be a part of the curved portion. The curvature of the selected segment has previously been calculated at step 901, or more concretely, steps 951 and 957 in the flowchart of FIG. 48.

At step 904, the inclined vector process is carried out by registering a first point and a last point of the selected segment as a starting point and a terminal point of an inclined vector. At step 905, on the other hand, the Beziers curving process is carried out for the selected segment by determining control points of a Beziers curve, for example, according to the least squares method.

After either step 904 or step 905, the program proceeds to step 906, at which it is determined whether any other segment to be selected exists. The affirmative answer (exist) returns the program to step 902, whereas the negative answer (not exist) concludes all the processing of FIG. 47.

III. Possible Modifications

The above embodiments are only illustrative and not restrictive in any sense. There may be many modifications, alterations, and changes without departing from the scope or spirit of essential characteristics of the invention.

Some examples of modification are given below.

At steps 6 and 7 in the flowchart of the first embodiment shown in FIG. 1 and at steps 807 and 808 in the flowchart of the second embodiment shown in FIG. 45, the orthogonal unit 115 of the CPU 110 executes the orthogonal process for inclined vector contours undergoing a desired transformation of coordinates to yield boundary contours, and the filling & combining unit 116 fills between the outer boundary contour and the inner boundary contour to give binary image data of a closed figure. Alternatively, binary image data of a closed figure may be generated by directly filling between the outer inclined vector contour and the inner inclined vector contour. The method applicable to generate image data of a closed figure through the direct filling of the inclined vector contours is, for example, disclosed in U.S. Pat. No. 4,853,971, which is incorporated herein by reference for all purposes. This alternative method saves the time and labor required for the orthogonal process, thereby shortening the whole process time.

Although the curved portion of a boundary contour is approximated by Beziers curves in the second embodiment, other approximate curves, such as spline curves and other parametric curves, can also be applicable.

The scope and spirit of the present invention are limited only by the terms of the appended claims.

What is claimed is:

1. A method of processing an image, said method comprising the steps of:

(a) preparing an image to be processed;

(b) extracting a first boundary contour vector from said image, said first boundary contour vector expressing a contour of said image by pixels and being composed of closed loop vectors comprising a plurality of horizontal vectors extending in a horizontal direction and a plurality of vertical vectors extending in a vertical direction; and (c) replacing a sequence of vectors including at least one horizontal vector and at least one vertical vector from said horizontal vectors and said vertical vectors of said first boundary contour vector with an inclined vector extending obliquely if said sequence of vectors satisfies a predetermined condition, said inclined vector connecting a starting point and an end point of said sequence of vectors, so as to yield an inclined contour vector including said inclined vector and expressing a contour of said image, and wherein said predetermined condition is a function of an area of a triangle formed by said horizontal and vertical vectors of said sequence.

2. A method in accordance with claim 1, wherein said predetermined condition is satisfied if the area of the triangle formed by said horizontal and vertical vectors of said sequence is in a predetermined range.

3. A method in accordance with claim 1, said method further comprising the step of:
 (d) executing an affine transformation on said inclined contour vector.

4. A method in accordance with claim 3, said method further comprising the step of:
 (e) replacing said inclined vectors included in the transformed inclined contour vector with horizontal vectors and vertical vectors to generate a second boundary contour vector.

5. A method in accordance with claim 1, wherein said predetermined condition is further a function of a length of at least one of said horizontal and vertical vectors of said sequence.

6. A method in accordance with claim 5, wherein said predetermined condition is satisfied if the area of the triangle formed by said horizontal and vertical vectors of said sequence is in a predetermined range and the length of at least one of said horizontal and vertical vectors of said sequence is in a predetermined range.

7. A method of processing an image, said method comprising the steps of:
 (a) preparing multi-valued image data representing said image to be processed;
 (b) binary-coding said multi-valued image data by a plurality of threshold values to generate binary image data representing at least one first binary image;
 (c) extracting at least one first boundary contour vector from said first binary image, said first boundary contour vector expressing a contour of said first binary image by pixels and being composed of closed loop vectors comprising a plurality of horizontal vectors extending in a horizontal direction and a plurality of vertical vectors extending in a vertical direction; and
 (d) replacing a sequence of vectors including at least one horizontal vector and at least one vertical vector from said horizontal vectors and said vertical vectors of said first boundary contour vector with an inclined vector extending obliquely if said sequence of vectors satisfies a predetermined condition, said inclined vector connecting a starting point and an end point of said sequence of vectors, so as to yield an inclined contour vector including said inclined vector and expressing a contour of said first binary image, and wherein said predetermined condition is a function of an area of a triangle formed by said horizontal and vertical vectors of said sequence.

8. A method in accordance with claim 7, wherein said predetermined condition is satisfied if the area of the triangle formed by said horizontal and vertical vectors of said sequence is in a predetermined range.

9. A method in accordance with claim 7, said method further comprising the step of:
 (e) executing an affine transformation on said inclined contour vector.

10. A method in accordance with claim 9, said method further comprising the step of:
 (f) replacing said inclined vectors included in the transformed inclined contour vector with horizontal vectors and vertical vectors to generate a second boundary contour vector.

11. A method in accordance with claim 10, said method further comprising the step of:
 (g) filling a selected area among two areas divided by said second boundary contour vector, so as to generate a second image represented by binary image data.

12. A method in accordance with claim 11, said method further comprising the step of:
 (h) combining a plurality of said second images to give an image represented by multi-valued image data.

13. A method in accordance with claim 9, said method further comprising the step of:
 (f) filling a selected area among two areas divided by the transformed inclined contour vector, so as to generate a second image represented by binary image data.

14. A method in accordance with claim 13, said method further comprising the step of:
 (g) combining a plurality of said second images to give an image represented by multi-valued image data.

15. A method in accordance with claim 7, wherein said predetermined condition is further a function of a length of at least one of said horizontal and vertical vectors of said sequence.

16. A method in accordance with claim 15, wherein said predetermined condition is satisfied if the area of the triangle formed by said horizontal and vertical vectors of said sequence is in a predetermined range and the length of at least one of said horizontal and vertical vectors of said sequence is in a predetermined range.

17. A method of processing an image, said method comprising the steps of:
 (a) preparing multi-valued image data representing said image to be processed;
 (b) binary-coding said multi-valued image data by a plurality of threshold values to generate binary image data representing at least one first binary image;
 (c) extracting at least one first boundary contour vector from said first binary image, said first boundary contour vector expressing a contour of said first binary image by pixels and being composed of closed loop vectors comprising a plurality of horizontal vectors extending in a horizontal direction and a plurality of vertical vectors extending in a vertical direction;
 (d) replacing a sequence of vectors including at least one horizontal vector and at least one vertical vector from said horizontal vectors and said vertical vectors of said first boundary contour vector with an inclined vector extending obliquely if said sequence of vectors satisfies a predetermined condition, said inclined vector connecting a starting point and an end point of said sequence of vectors, so as to yield an inclined contour vector including said inclined vector and expressing a contour of said first binary image, and approximating each curved portion of said first boundary contour vector by parametric function data;
 (e) executing an affine transformation on said inclined contour vector and said parametric function data;
 (f) converting the transformed parametric function data to vectors, which are included in the transformed inclined contour vector;

(g) replacing said inclined vectors of said inclined contour vector, which includes said vectors converted from said parametric function data, with horizontal vectors and vertical vectors to generate a second boundary contour vector;

(h) filling a selected area among two areas divided by said second boundary contour vector, so as to generate a second image represented by binary image data; and (i) combining a plurality of said second images to give an image represented by multi-valued image data.

18. A method of processing an image, said method comprising the steps of:

(a) preparing multi-valued image data representing said image to be processed;

(b) binary-coding said multi-valued image data by a plurality of threshold values to generate binary image data representing at least one first binary image;

(c) extracting at least one first boundary contour vector from said first binary image, said first boundary contour vector expressing a contour of said first binary image by pixels and being composed of closed loop vectors comprising a plurality of horizontal vectors extending in a horizontal direction and a plurality of vertical vectors extending in a vertical direction;

(d) replacing a sequence of vectors including at least one horizontal vector and at least one vertical vector from said horizontal vectors and said vertical vectors of said first boundary contour vector with an inclined vector extending obliquely if said sequence of vectors satisfies a predetermined condition, said inclined vector connecting a starting point and an end point of said sequence of vectors, so as to yield an inclined contour vector including said inclined vector and expressing a contour of said first binary image, and approximating each curved portion of said first boundary contour vector by parametric function data;

(e) executing an affine transformation on said inclined contour vector and said parametric function data;

(f) converting the transformed parametric function data to vectors, which are included in the transformed inclined contour vector;

(g) filling a selected area among two areas divided by said inclined contour vector including said vectors converted from said parametric function data, so as to generate a second image represented by binary image data; and (h) combining a plurality of said second images to give an image represented by multi-valued image data.

19. An apparatus for processing an image, said apparatus comprising:

boundary contour vector extraction means for extracting a first boundary contour vector from said image to be processed, said first boundary contour vector expressing a contour of said image by pixels and being composed of closed loop vectors comprising a plurality of horizontal vectors extending in a horizontal direction and a plurality of vertical vectors extending in a vertical direction; and inclined vector means for replacing a sequence of vectors including at least one horizontal vector and at least one vertical vector from said horizontal vectors and said vertical vectors of said first boundary contour vector with an inclined vector extending obliquely if said sequence of vectors satisfies a predetermined condition, said inclined vector connecting a starting point and an end point of said sequence of vectors, so as to yield an inclined contour vector including said inclined vector and expressing a contour of said image, and wherein said predetermined condition is a function of an area of a triangle formed by said horizontal and vertical vectors of said sequence.

20. An apparatus in accordance with claim 19, wherein said predetermined condition is satisfied if the area of the triangle formed by said horizontal and vertical vectors of said sequence is in a predetermined range.

21. An apparatus in accordance with claim 19, said apparatus further comprising:

means for executing an affine transformation on said inclined contour vector.

22. An apparatus in accordance with claim 21, said apparatus further comprising:

means for replacing said inclined vectors included in the transformed inclined contour vector with horizontal vectors and vertical vectors to generate a second boundary contour vector.

23. A method in accordance with claim 19, wherein said predetermined condition is further a function of a length of at least one of said horizontal and vertical vectors of said sequence.

24. An apparatus in accordance with claim 23, wherein said predetermined condition is satisfied if the area of the triangle formed by said horizontal and vertical vectors of said sequence is in a predetermined range and the length of at least one of said horizontal and vertical vectors of said sequence is in a predetermined range.

25. An apparatus for processing an image represented by multi-valued image data, said apparatus comprising:

means for binary-coding said multi-valued image data by a plurality of threshold values to generate binary image data representing at least one first binary image;

means for extracting at least one first boundary contour vector from said first binary image, said first boundary contour vector expressing a contour of said first binary image by pixels and being composed of closed loop vectors comprising a plurality of horizontal vectors extending in a horizontal direction and a plurality of vertical vectors extending in a vertical direction; and means for replacing a sequence of vectors including at least one horizontal vector and at least one vertical vector from said horizontal vectors and said vertical vectors of said first boundary contour vector with an inclined vector extending obliquely if said sequence of vectors satisfies a predetermined condition, said inclined vector connecting a starting point and an end point of said sequence of vectors, so as to yield an inclined contour vector including said inclined vector and expressing a contour of said first binary image, and wherein said predetermined condition is a function of an area of a triangle formed by said horizontal and vertical vectors of said sequence.

26. An apparatus in accordance with claim 25, wherein said predetermined condition is satisfied if the area of the triangle formed by said horizontal and vertical vectors of said sequence is in a predetermined range.

27. An apparatus in accordance with claim 25, said apparatus further comprising:

means for executing an affine transformation on said inclined contour vector.

28. An apparatus in accordance with claim 27, said apparatus further comprising:

means for replacing said inclined vectors included in the transformed inclined contour vector with horizontal vectors and vertical vectors to generate a second boundary contour vector.

29. An apparatus in accordance with claim 28, said apparatus further comprising:
means for filling a selected area among two areas divided by said second boundary contour vector, so as to generate a second image represented by binary image data.

30. An apparatus in accordance with claim 29, said apparatus further comprising:
means for combining a plurality of said second images to give an image represented by multi-valued image data.

31. An apparatus in accordance with claim 27, said apparatus further comprising:
means for filling a selected area among two areas divided by the transformed inclined contour vector, so as to generate a second image represented by binary image data.

32. An apparatus in accordance with claim 31, said apparatus further comprising:
means for combining a plurality of said second images to give an image represented by multi-valued image data.

33. A method in accordance with claim 28, wherein said predetermined condition is further a function of a length of at least one of said horizontal and vertical vectors of said sequence.

34. An apparatus in accordance with claim 33, wherein said predetermined condition is satisfied if the area of the triangle formed by said horizontal and vertical vectors of said sequence is in a predetermined range and the length of at least one of said horizontal and vertical vectors of said sequence is in a predetermined range.

35. An apparatus for processing an image represented by multi-valued image data, said apparatus comprising:
means for binary-coding said multi-valued image data by a plurality of threshold values to generate binary image data representing at least one first binary image;
means for extracting at least one first boundary contour vector from said first binary image, said first boundary contour vector expressing a contour of said first binary image by pixels and being composed of closed loop vectors comprising a plurality of horizontal vectors extending in a horizontal direction and a plurality of vertical vectors extending in a vertical direction;
means for replacing a sequence of vectors including at least one horizontal vector and at least one vertical vector from said horizontal vectors and said vertical vectors of said first boundary contour vector with an inclined vector extending obliquely if said sequence of vectors satisfies a predetermined condition, said inclined vector connecting a starting point and an end point of said sequence of vectors, so as to yield an inclined contour vector including said inclined vector and expressing a contour of said first binary image, and approximating each curved portion of said first boundary contour vector by parametric function data;
means for executing an affine transformation on said inclined contour vector and said parametric function data;
means for converting the transformed parametric function data to vectors, which are included in the transformed inclined contour vector;
means for replacing said inclined vectors of said inclined contour vector, which includes said vectors converted from said parametric function data, with horizontal vectors and vertical vectors to generate a second boundary contour vector;
means for filling a selected area among two areas divided by said second boundary contour vector, so as to generate a second image represented by binary image data; and
means for combining a plurality of said second images to give an image represented by multi-valued image data.

36. An apparatus for processing an image represented by multi-valued image data, said apparatus comprising:
means for binary-coding said multi-valued image data by a plurality of threshold values to generate binary image data representing at least one first binary image;
means for extracting at least one first boundary contour vector from said first binary image, said first boundary contour vector expressing a contour of said first binary image by pixels and being composed of closed loop vectors comprising a plurality of horizontal vectors extending in a horizontal direction and a plurality of vertical vectors extending in a vertical direction;
means for replacing a sequence of vectors including at least one horizontal vector and at least one vertical vector from said horizontal vectors and said vertical vectors of said first boundary contour vector with an inclined vector extending obliquely if said sequence of vectors satisfies a predetermined condition, said inclined vector connecting a starting point and an end point of said sequence of vectors, so as to yield an inclined contour vector including said inclined vector and expressing a contour of said first binary image, and approximating each curved portion of said first boundary contour vector by parametric function data;
means for executing an affine transformation on said inclined contour vector and said parametric function data;
means for converting the transformed parametric function data to vectors, which are included in the transformed inclined contour vector;
means for filling a selected area among two areas divided by said inclined contour vector including said vectors converted from said parametric function data, so as to generate a second image represented by binary image data; and
means for combining a plurality of said second images to give an image represented by multi-valued image data.

37. A method of processing an image, said method comprising the steps of:
(a) preparing an image to be processed;
(b) extracting a first boundary contour vector from said image, said first boundary contour vector expressing a contour of said image by pixels and being composed of closed loop vectors comprising a plurality of horizontal vectors extending in a horizontal direction and a plurality of vertical vectors extending in a vertical direction;
(c) obtaining an area of a triangle formed by a sequence of a horizontal vector and a vertical vector of said first boundary contour vector; and
(d) replacing said sequence of horizontal and vertical vectors of said first boundary contour vector with an inclined vector extending obliquely if said area of said triangle is in a predetermined range, so as to yield an inclined contour vector.

38. A method of processing an image, said method comprising the steps of:

(a) preparing an image to be processed;

(b) extracting a first boundary contour vector from said image, said first boundary contour vector expressing a contour of said image by pixels and being composed of closed loop vectors comprising a plurality of horizontal vectors extending in a horizontal direction and a plurality of vertical vectors extending in a vertical direction;

(c) obtaining an area of a triangle formed by a sequence of a horizontal vector and a vertical vector of said first boundary contour vector;

(d) obtaining respective lengths of said horizontal and vertical vectors of said sequence; and (e) replacing said sequence of horizontal and vertical vectors of said first boundary contour vector with an inclined vector extending obliquely if said area of said triangle is in a predetermined range and at least one of said lengths is in a predetermined range, so as to yield an inclined contour vector.

39. A method of processing an image, said method comprising the steps of:

(a) preparing multi-valued image data representing said image to be processed;

(b) binary-coding said multi-valued image data by a plurality of threshold values to generate a plurality of binary image data representing a plurality of first binary images;

(c) extracting a plurality of first boundary contour vectors from said plurality of first binary images, each said first boundary contour vector expressing a contour of said first binary image by pixels and being composed of closed loop vectors comprising a plurality of horizontal vectors extending in a horizontal direction and a plurality of vertical vectors extending in a vertical direction;

(d) obtaining an area of a triangle formed by a sequence of a horizontal vector and a vertical vector of said first boundary contour vector; and (e) replacing said sequence of horizontal and vertical vectors of said each first boundary contour vector with an inclined vector extending obliquely if said area of said triangle is in a predetermined range, so as to yield an inclined contour vector.

40. A method of processing an image, said method comprising the steps of:

(a) preparing multi-valued image data representing said image to be processed;

(b) binary-coding said multi-valued image data by a plurality of threshold values to generate a plurality of binary image data representing a plurality of first binary images;

(c) extracting a plurality of first boundary contour vectors from said plurality of first binary images, each said first boundary contour vector expressing a contour of said first binary image by pixels and being composed of closed loop vectors comprising a plurality of horizontal vectors extending in a horizontal direction and a plurality of vertical vectors extending in a vertical direction;

(d) obtaining an area of a triangle formed by a sequence of a horizontal vector and a vertical vector of said first boundary contour vector;

(e) obtaining respective lengths of said horizontal and vertical vectors of said sequence; and (f) replacing said sequence of horizontal and vertical vectors of said each first boundary contour vector with an inclined vector extending obliquely if said area of said triangle is in a predetermined range and at least one of said lengths is in a predetermined range, so as to yield an inclined contour vector.

41. An apparatus for processing an image, said apparatus comprising:

boundary contour vector extraction means for extracting a first boundary contour vector from said image to be processed, said first boundary contour vector expressing a contour of said image by pixels and being composed of closed loop vectors comprising a plurality of horizontal vectors extending in a horizontal direction and a plurality of vertical vectors extending in a vertical direction;

means for obtaining an area of a triangle formed by a sequence of a horizontal vector and a vertical vector of said first boundary contour vector extracted by said boundary contour vector extraction means; and inclined vector means for replacing said sequence of horizontal and vertical vectors of said first boundary contour vector with an inclined vector extending obliquely if said area of said triangle is in a predetermined range, so as to yield an inclined contour vector.

42. An apparatus for processing an image, said apparatus comprising:

boundary contour vector extraction means for extracting a first boundary contour vector from said image to be processed, said first boundary contour vector expressing a contour of said image by pixels and being composed of closed loop vectors comprising a plurality of horizontal vectors extending in a horizontal direction and a plurality of vertical vectors extending in a vertical direction;

means for obtaining an area of a triangle formed by a sequence of a horizontal vector and a vertical vector of said first boundary contour vector extracted by said boundary contour vector extraction means;

means for obtaining respective lengths of said horizontal and vertical vectors of said sequence; and inclined vector means for replacing said sequence of horizontal and vertical vectors of said first boundary contour vector with an inclined vector extending obliquely if said area of said triangle is in a predetermined range and at least one of said lengths is in a predetermined range, so as to yield an inclined contour vector.

43. An apparatus for processing an image represented by multi-valued image data, said apparatus comprising:

means for binary-coding said multi-valued image data by a plurality of threshold values to generate a plurality of binary image data representing a plurality of first binary images;

means for extracting a plurality of first boundary contour vectors from said plurality of first binary images, each said first boundary contour vector expressing a contour of said first binary image by pixels and being composed of closed loop vectors comprising a plurality of horizontal vectors extending in a horizontal direction and a plurality of vertical vectors extending in a vertical direction;

means for obtaining an area of a triangle formed by a sequence of a horizontal vector and a vertical vector of said each first boundary contour vector; and means for replacing said sequence of horizontal and vertical vectors of said each first boundary contour vector with an inclined vector extending obliquely if said area of said triangle is in a predetermined range, so as to yield an inclined contour vector.

44. An apparatus for processing an image represented by multi-valued image data, said apparatus comprising:

means for binary-coding said multi-valued image data by a plurality of threshold values to generate a plurality of binary image data representing a plurality of first binary images;

means for extracting a plurality of first boundary contour vectors from said plurality of first binary images, each said first boundary contour vector expressing a contour of said first binary image by pixels and being composed of closed loop vectors comprising a plurality of horizontal vectors extending in a horizontal direction and a plurality of vertical vectors extending in a vertical direction;

means for obtaining an area of a triangle formed by a sequence of a horizontal vector and a vertical vector of said each first boundary contour vector;

means for obtaining respective lengths of said horizontal and vertical vectors of said sequence; and means for replacing said sequence of horizontal and vertical vectors of said each first boundary contour vector with an inclined vector extending obliquely if said area of said triangle is in a predetermined range and at least one of said lengths is in a predetermined range, so as to yield an inclined contour vector.

45. A method of processing an image, said method comprising the steps of:

(a) preparing an image to be processed;

(b) extracting a first boundary contour vector from said image, said first boundary contour vector expressing a contour of said image by pixels and being composed of closed loop vectors comprising a plurality of horizontal vectors extending in a horizontal direction and a plurality of vertical vectors extending in a vertical direction; and (c) replacing a sequence of vectors including at least one horizontal vector and at least one vertical vector from said horizontal vectors and said vertical vectors of said first boundary contour vector with an inclined vector extending obliquely as a function of an area of a triangle formed by said sequence of vectors, so as to yield an inclined contour vector.

46. A method of processing an image, said method comprising the steps of:

(a) preparing an image to be processed;

(b) extracting a first boundary contour vector from said image, said first boundary contour vector expressing a contour of said image by pixels and being composed of closed loop vectors comprising a plurality of horizontal vectors extending in a horizontal direction and a plurality of vertical vectors extending in a vertical direction; and (c) replacing a sequence of vectors including at least one horizontal vector and at least one vertical vector from said horizontal vectors and said vertical vectors of said first boundary contour vector with an inclined vector extending obliquely as a function of an area of a triangle formed by said sequence of vectors and also as a function of a length of at least one of said vectors of said sequence, so as to yield an inclined contour vector.

47. A method of processing an image, said method comprising the steps of:

(a) preparing multi-valued image data representing said image to be processed;

(b) binary-coding said multi-valued image data by a plurality of threshold values to generate a plurality of binary image data representing a plurality of first binary images;

(c) extracting a plurality of first boundary contour vectors from said plurality of first binary images, each said first boundary contour vector expressing a contour of said first binary image by pixels and being composed of closed loop vectors comprising a plurality of horizontal vectors extending in a horizontal direction and a plurality of vertical vectors extending in a vertical direction; and (d) replacing a sequence of vectors including at least one horizontal vector and at least one vertical vector from said horizontal vectors and said vertical vectors of said each first boundary contour vector with an inclined vector extending obliquely as a function of an area of a triangle formed by said sequence of vectors, so as to yield an inclined contour vector.

48. A method of processing an image, said method comprising the steps of:

(a) preparing multi-valued image data representing said image to be processed;

(b), binary-coding said multi-valued image data by a plurality of threshold values to generate a plurality of binary image data representing a plurality of first binary images;

(c) extracting a plurality of first boundary contour vectors from said plurality of first binary images, each said first boundary contour vector expressing a contour of said first binary image by pixels and being composed of closed loop vectors comprising a plurality of horizontal vectors extending in a horizontal direction and a plurality of vertical vectors extending in a vertical direction; and (d) replacing a sequence of vectors including at least one horizontal vector and at least one vertical vector from said horizontal vectors and said vertical vectors of said each first boundary contour vector with an inclined vector extending obliquely as a function of an area of a triangle formed by said sequence of vectors and also as a function of a length of at least one of said vectors of said sequence, so as to yield an inclined contour vector.

49. An apparatus for processing an image, said apparatus comprising:

boundary contour vector extraction means for extracting a first boundary contour vector from said image to be processed, said first boundary contour vector expressing a contour of said image by pixels and being composed of closed loop vectors comprising a plurality of horizontal vectors extending in a horizontal direction and a plurality of vertical vectors extending in a vertical direction;

means for obtaining an area of a triangle formed by a sequence of vectors including at least one horizontal vector and at least one vertical vector from said horizontal vectors and said vertical vectors of said first boundary contour vector extracted by said boundary contour vector extraction means; and inclined vector means for replacing said sequence of horizontal and vertical vectors of said first boundary contour vector with an inclined vector extending obliquely as a function of said area of said triangle, so as to yield an inclined contour vector.

50. An apparatus for processing an image, said apparatus comprising:

boundary contour vector extraction means for extracting a first boundary contour vector from said image to be processed, said first boundary contour vector expressing a contour of said image by pixels and being composed of closed loop vectors comprising a plurality of horizontal vectors extending in a horizontal direction and a plurality of vertical vectors extending in a vertical direction;

means for obtaining an area of a triangle formed by a sequence of vectors including at least one horizontal vector and at least one vertical vector from said horizontal vectors and said vertical vectors of said first boundary contour vector extracted by said boundary contour vector extraction means;

means for obtaining respective lengths of said horizontal and vertical vectors of said sequence; and inclined vector means for replacing said sequence of horizontal and vertical vectors of said first boundary contour vector with an inclined vector extending obliquely as a function of said area of said triangle and also as a function of at least one of said lengths, so as to yield an inclined contour vector.

51. An apparatus for processing an image represented by multi-valued image data, said apparatus comprising:

means for binary-coding said multi-valued image data by a plurality of threshold values to generate a plurality of binary image data representing a plurality of first binary images;

means for extracting a plurality of first boundary contour vectors from said plurality of first binary images, each said first boundary contour vector expressing a contour of said first binary image by pixels and being composed of closed loop vectors comprising a plurality of horizontal vectors extending in a horizontal direction and a plurality of vertical vectors extending in a vertical direction;

means for obtaining an area of a triangle formed by a sequence of vectors including at least one horizontal vector and at least one vertical vector from said horizontal vectors and said vertical vectors of said each first boundary contour vector; and means for replacing said sequence of horizontal and vertical vectors of said each first boundary contour vector with an inclined vector extending obliquely as a function of said area of said triangle, so as to yield an inclined contour vector.

52. An apparatus for processing an image represented by multi-valued image data, said apparatus comprising:

means for binary-coding said multi-valued image data by a plurality of threshold values to generate a plurality of binary image data representing a plurality of first binary images;

means for extracting a plurality of first boundary contour vectors from said plurality of first binary images, each said first boundary contour vector expressing a contour of said first binary image by pixels and being composed of closed loop vectors comprising a plurality of horizontal vectors extending in a horizontal direction and a plurality of vertical vectors extending in a vertical direction;

means for obtaining an area of a triangle formed by a sequence of vectors including at least one horizontal vector and at least one vertical vector from said horizontal vectors and said vertical vectors of said each first boundary contour vector;

means for obtaining respective lengths of said horizontal and vertical vectors of said sequence; and means for replacing said sequence of horizontal and vertical vectors of said each first boundary contour vector with an inclined vector extending obliquely as a function of said area of said triangle and also as a function of at least one of said lengths, so as to yield an inclined contour vector.

* * * * *